United States Patent
Chung et al.

(10) Patent No.: US 9,870,639 B2
(45) Date of Patent: Jan. 16, 2018

(54) GRAPHIC PROCESSING UNIT AND METHOD OF PERFORMING, BY GRAPHIC PROCESSING UNIT, TILE-BASED GRAPHICS PIPELINE

(71) Applicant: SAMSUNG ELECTRONICS CO., LTD., Suwon-si (KR)

(72) Inventors: Mookyoung Chung, Hwaseong-si (KR); Keshavan Varadarajan, Karnatake (IN); Soojung Ryu, Hwaseong-si (KR); Jeongae Park, Seoul (KR); Seokyoon Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 148 days.

(21) Appl. No.: 14/791,626

(22) Filed: Jul. 6, 2015

(65) Prior Publication Data

US 2016/0148424 A1    May 26, 2016

(30) Foreign Application Priority Data

Nov. 26, 2014  (KR) .......................... 10-2014-0166628

(51) Int. Cl.
*G06T 15/00*  (2011.01)
*G06T 11/40*  (2006.01)

(52) U.S. Cl.
CPC ............ *G06T 15/005* (2013.01); *G06T 11/40* (2013.01)

(58) Field of Classification Search
None
See application file for complete search history.

(56) References Cited

U.S. PATENT DOCUMENTS

| | | |
|---|---|---|
| 6,359,619 B1 | 3/2002 | Waters et al. |
| 8,089,486 B2 | 1/2012 | Anderson et al. |
| 8,730,236 B2 | 5/2014 | Fishwick |
| 2011/0221743 A1* | 9/2011 | Keall .................... G06T 15/005 345/419 |

(Continued)

FOREIGN PATENT DOCUMENTS

KR    10-2011-0093404 A    8/2011

OTHER PUBLICATIONS

Unreal Engine, "Tessellation Camera Distance LOD?" https://answers.unrealengine.com/questions/11704/tessellation-camera-distance-lod.html, Mar. 11, 2014.*

(Continued)

*Primary Examiner* — Nicholas R Wilson
(74) *Attorney, Agent, or Firm* — Harness, Dickey & Pierce, P.L.C.

(57) ABSTRACT

Computing apparatus and methods are provided for performing a tile-based graphics pipeline. The graphics pipeline includes a binning pipeline configured to generate a tile list of objects indicating which tile vertices, primitives, or patches the objects belong to; and a rendering pipeline configured to render an object, per tile, based on the tile list generated in the binning pipeline. Each of the binning pipeline and the rendering pipeline is configured to implement a tessellation pipeline. The graphics pipeline may be configured to operate in an efficiency mode to defer or lower tessellation by performing tessellation in one of the binning and rendering pipelines or by setting a new lower tessellation factor.

16 Claims, 35 Drawing Sheets

(56) References Cited

U.S. PATENT DOCUMENTS

2011/0267346 A1  11/2011  Howson
2013/0120380 A1   5/2013  Kallio et al.
2014/0267259 A1*  9/2014  Frascati ................ G06T 15/005
                                                          345/423

OTHER PUBLICATIONS

Smedberg, Niklas, and Timothy Lottes. "Next-Gen Mobile Rendering." Game Developer Conference. Mar. 17-21, 2014. Lecture. (64 pages, in English).
Zioma, Renaldas. "Unity: IOS and Android—Cross-platform Challenges and Solutions." Siggraph 2012—The 39th International Conference and Exhibition of Computer Graphics and Interactive Techniques. Aug. 13, 2012. Lecture. (54 pages, in English).
European Search Report dated Jun. 7, 2016 for corresponding European Patent Application No. 15176624.3.

* cited by examiner

FIG. 22
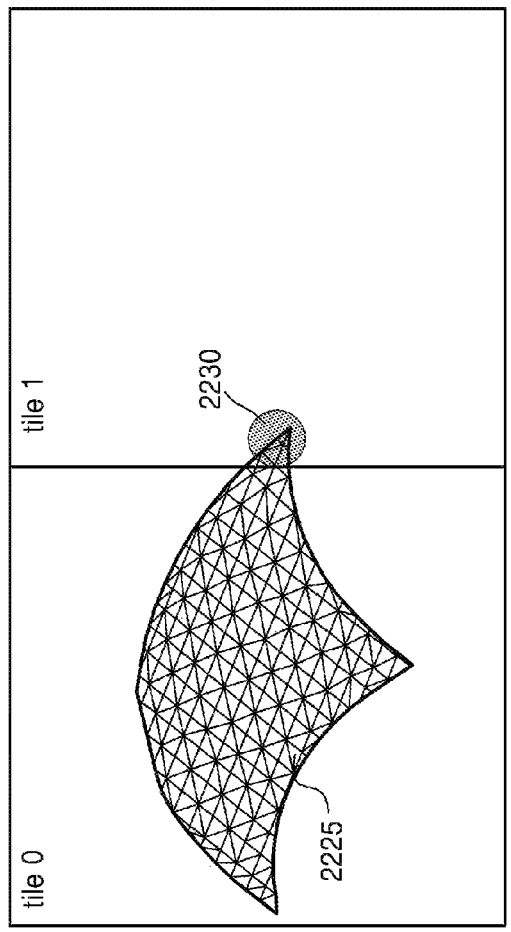
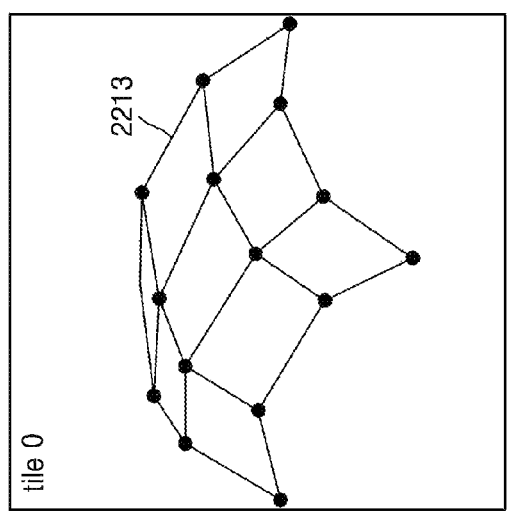

FIG. 26A
FIG. 26B
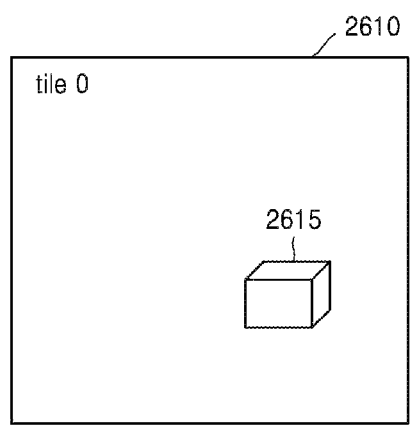
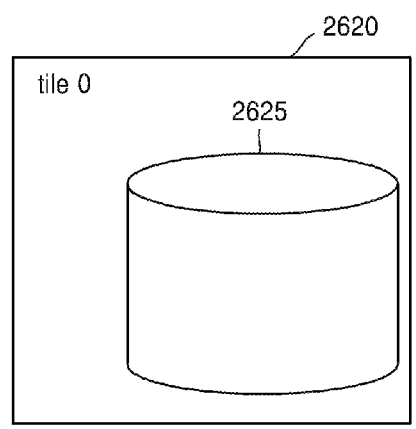

FIG. 27A
FIG. 27B
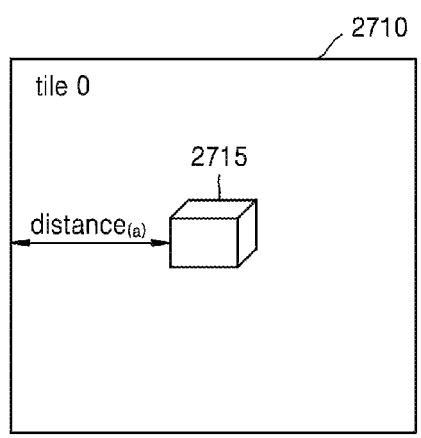
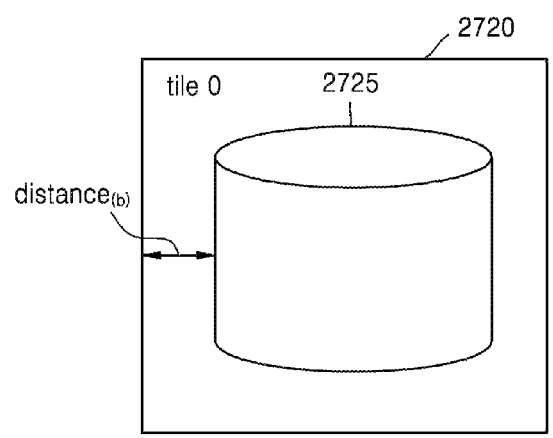

US 9,870,639 B2

GRAPHIC PROCESSING UNIT AND METHOD OF PERFORMING, BY GRAPHIC PROCESSING UNIT, TILE-BASED GRAPHICS PIPELINE

CROSS-REFERENCE TO RELATED APPLICATION(S)

This application claims the benefit of Korean Patent Application No. 10-2014-0166628, filed on Nov. 26, 2014, in the Korean Intellectual Property Office, the disclosure of which is incorporated herein in its entirety by reference.

BACKGROUND

1. Field

The present disclosure relates to graphic processing units and methods of performing, by graphic processing units, a tile-based graphics pipeline.

2. Description of Related Art

A graphic processing unit (GPU) renders graphics data in a computing apparatus. Generally, the GPU generates a frame for display by converting graphics data corresponding to 2-dimensional (2D) or 3-dimensional (3D) objects to a 2D pixel expression. Examples of the computing apparatus include a PC, a laptop, a video game console, a smart phone, a tablet device, and a wearable device, to name but a few. It is difficult to provide the same graphic processing performance delivered by workstations, such as a PC, a laptop, and a video game console, which have sufficient memory spaces and processing power, in devices where the GPU is embedded, such as a smart phone, a tablet device, and a wearable device, due to the relatively low processing capability and high power consumption of the embedded devices. However, due to the recent widespread, worldwide supply of portable devices, such as smart phones or tablet devices, and the frequency which of users of these devices are employing them for graphics intense applications, such as playing games or viewing content, such as movies or series, manufacturers of GPUs are conducting many studies to increase the performance and throughput of the GPUs even in embedded devices to keep up with user demand and expectations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Provided are graphic processing units and methods of performing, by graphic processing units, a tile-based graphics pipeline.

In one general aspect, a method performing a graphics pipeline, by a graphic processing unit, on a frame including an object partitioned into one or more tiles comprises: performing a binning pipeline including: generating an output patch; determining the number of tiles that include the output patch; determining whether to perform tessellating on the output patch based on the determined number of tiles; and binning a tile list of one of the output patch or tessellated primitives of the output patch based on whether tessellating is performed; and performing a rendering pipeline per tile based on the binned tile list.

The performing of the binning pipeline may comprise determining no tessellating is performed on the output patch when the number of tiles that include the output patch is one.

The performing of the binning pipeline may further comprise: generating the output patch by a hull shader performing hull shading on an input patch; binning the tile list of the output patch; and determining whether the output patch is included in one tile.

The performing of the rendering pipeline may further comprise performing rasterizing using the binned tile list of the output patch when the output patch is included in one tile.

The performing of the binning pipeline may further comprise: tessellating, by a tessellator, the output patch to generate tessellating primitives when it is determined that the output patch is included in at least two tiles; domain shading, by a domain shader, the tessellated primitives; binning a tile list of the tessellated primitives; and the performing of the rendering pipeline may further comprise: performing the rasterizing using the binned tile list of the tessellated primitives.

The performing of the binning pipeline may comprise: storing a visibility stream of the output patch when the output patch is included in one tile; and storing a visibility stream of the tessellated primitives when the output patch is included in at least two tiles.

In another general aspect, a computing apparatus that performs a graphics pipeline on a frame including an object partitioned into one or more tiles comprises: a graphic processing unit (GPU) configured to perform a binning pipeline including: generating an output patch; determining the number of tiles that include the output patch; determining whether to perform tessellating on the output patch based on the determined number of tiles; and binning a tile list of one of the output patch or of tessellated primitives of the output patch based on whether tessellating is performed; store the binned tile list; access the stored binned tile list; and a rendering pipeline per tile based on the binned tile list; and a memory configured to store the binned tile list.

The binning pipeline performed by the GPU may further comprise determining no tessellating is performed on the output patch when the number of tiles that include the output patch is one.

The computing GPU may further include: a hull shader and the binning pipeline performed by the GPU may further comprise: generating the output patch performing hull shading on an input patch; binning the tile list of the output patch; and determining whether the output patch is included in one tile.

The rendering pipeline performed by the GPU may further comprise performing rasterizing using the binned tile list of the output patch when GPU determines the output patch is included in one tile.

The GPU may further include: a domain shader and a tessellator and the binning pipeline performed by the GPU may further comprise: tessellating the output patch to generate tessellating primitives when the GPU determines that the output patch is included in at least two tiles; domain shading the tessellated primitives; binning a tile list of the tessellated primitives; and the rendering pipeline performed by the GPU may further comprise: performing the rasterizing using the binned tile list of the tessellated primitives.

The binning pipeline performed by the GPU may comprise: storing a visibility stream of the output patch when the GPU determines the output patch is included in one tile; and storing a visibility stream of the tessellated primitives when the GPU determines the output patch is included in at least two tiles; and the memory is further configured to store the visibility stream.

In another general aspect, a method of performing a graphics pipeline, by a graphic processing unit (GPU), on a frame including an object partitioned into one or more tiles, comprises: performing a binning pipeline including: generating an output patch by a hull shader; tessellating the output patch with a second tessellation factor that is different from a first tessellation factor determined by the hull shader; determining by the GPU whether to perform tessellating with the first tessellation factor, based on the number of tiles including primitives tessellated with the second tessellation factor; and binning a tile list of one of primitives tessellated with the first tessellation factor or the output patch output from the hull shader based on a result of the determining; and performing a rendering pipeline per tile based on the binned tile list.

The performing of the binning pipeline may comprise binning the tile list of the output patch when the primitives tessellated with the second tessellation factor are included in one tile.

The second tessellation factor may be lower than the first tessellation factor.

The performing of the binning pipeline may comprise: performing hull shading that generates the output patch by the hull shader; determining the first tessellation factor; generating the primitives tessellated with the second tessellation factor by performing, on the output patch, tessellating using the second tessellation factor that is lower than the first tessellation factor by a tessellator and domain shading by a domain shader; and determining by the GPU whether the primitives tessellated with the second tessellation factor are included in one tile; and the performing of the rendering pipeline may further comprise performing rasterizing using the binned tile list of the output patch when the primitives tessellated with the second tessellation factor are included in one tile.

The performing of the binning pipeline may further comprise generating the primitives tessellated with the first tessellation factor by performing, on the output patch, tessellating using the first tessellation factor by the tessellator and the domain shading by the domain shader when the primitives tessellated with the second tessellation factor are included in at least two tiles, and the performing of the rendering pipeline may further comprise performing the rasterizing by using the binned tile list of the primitives tessellated with the first tessellation factor.

The performing of the binning pipeline may further comprise, storing a visibility stream of the output patch when the primitives tessellated with the second tessellation factor are included in one tile, and storing a visibility stream of the primitives tessellated with the first tessellation factor when the primitives tessellated with the second tessellation factor are included in at least two tiles.

In another general aspect, a computing apparatus that performs a graphics pipeline on a frame including an object partitioned into one or more tiles comprises: a graphic processing unit (GPU) including a hull shader, the GPU configured to perform: a binning pipeline including: generating an output patch by the hull shader; tessellating the output patch with a second tessellation factor that is different from a first tessellation factor determined by the hull shader; determining whether to perform tessellating with the first tessellation factor based on the number of tiles including primitives tessellated with the second tessellation factor; and binning a tile list of one of primitives tessellated with the first tessellation factor or the output patch output from the hull shader based on a result of the determining; and a rendering pipeline per tile based on the binned tile list; and a memory configured to store the binned tile list.

The binning pipeline may comprise binning the tile list of the output patch when the primitives tessellated with the second tessellation factor are included in one tile.

The second tessellation factor may be lower than the first tessellation factor.

In another general aspect, a method of performing a graphics pipeline by a graphic processing unit (GPU) comprises: performing a binning pipeline including: binning an output patch from a hull shader; determining whether the output patch output from the hull shader is included in a plurality of tiles; scheduling a rendering order of the plurality of tiles when the GPU determines that the output patch is included in the plurality of tiles; and performing a per tile rendering pipeline on the plurality of tiles based on the scheduled rendering order including: performing binning on a first tile that is scheduled in the rendering order that generates a visibility stream of a neighboring tile adjacent to the first tile.

The performing of the binning pipeline may comprise no tessellating of the output patch.

The performing of the binning pipeline further may comprise: generating the output patch as the hull shader performs hull shading on an input patch; binning a tile list of the output patch; determining whether the output patch is included in the plurality of tiles; and determining the first tile corresponding to the first tile in the rendering order when the GPU determines that the output patch is included in the plurality of tiles.

The performing of the rendering pipeline may further comprise: performing a first rendering pipeline on the first tile; and performing a second rendering pipeline on the neighboring tile comprising performing rendering on at least one of a visible vertex, a visible primitive, and a visible patch of the neighboring tile using the visibility stream generated in the first rendering pipeline.

In another general aspect, a computing apparatus that performs a graphics pipeline comprises: a graphic processing unit (GPU) including a hull shader, the GPU configured to perform: a binning pipeline including: binning an output patch from the hull shader, determining whether the output patch output from the hull shader is included in a plurality of tiles, scheduling a rendering order of the plurality of tiles when the GPU determines that the output patch is included in the plurality of tiles; and a per tile rendering pipeline on the plurality of tiles based on the scheduled rendering order including: performing binning, on a first tile that is scheduled in the rendering order, that generates a visibility stream of a neighboring tile adjacent to the first tile; and a memory that stores the visibility stream of the neighboring tile adjacent to the first tile.

The GPU may further comprise a tessellator and the binning pipeline comprises no tessellating of the output patch.

While the binning pipeline is performed, the GPU may generate the output patch as the hull shader performs hull shading on an input patch; bin a tile list of the output patch; determines whether the output patch is included in the plurality of tiles; and determine the first tile of the rendering order when the GPU determines that the output patch is included in the plurality of tiles.

The GPU may performs a first rendering pipeline on the first tile and performs a second rendering pipeline on the neighboring tile, the second rendering pipeline comprising performing rendering on at least one of a visible vertex, a visible primitive, and a visible patch of the neighboring tile using the visibility stream generated in the first rendering pipeline.

In another general aspect, a method of performing a graphics pipeline by a graphic processing unit (GPU) comprises: performing a binning pipeline including: binning, by a hull shader, primitives tessellated with a second tessellation factor that is different from a first tessellation factor; determining whether the primitives tessellated with the second tessellation factor are included in a plurality of tiles, scheduling a rendering order of the plurality of tiles when the GPU determines that the primitives tessellated with the second tessellation factor are included in the plurality of tiles; and performing a per tile rendering pipeline on the plurality of tiles based on the scheduled rendering order including: performing binning, on a first tile scheduled in the rendering order that generates a visibility stream of a neighboring tile adjacent to the first tile.

The performing of the binning pipeline may comprise no tessellating based on the first tessellation factor.

The second tessellation factor may be lower than the first tessellation factor.

The performing of the binning pipeline may further comprise: performing, by the hull shader, hull shading to generate an output patch; determining the first tessellation factor; generating the primitives tessellated with the second tessellation factor by performing, on the output patch, tessellating by a tessellator and domain shading by a domain shader, based on the second tessellation factor that is lower than the first tessellation factor; binning a tile list of the primitives tessellated with the second tessellation factor; determining whether the primitives tessellated with the second tessellation factor are included in the plurality of tiles; and determining the first tile corresponding to the rendering order when it is determined that the primitives tessellated with the second tessellation factor are included in the plurality of tiles.

The performing of the rendering pipeline may comprises: performing a first rendering pipeline on the first tile; and performing a second rendering pipeline on the neighboring tile comprising performing rendering on at least one of a visible vertex, a visible primitive, and a visible patch of the neighboring tile based on the visibility stream generated in the first rendering pipeline.

In another general aspect, a computing apparatus that performs a graphics pipeline comprises: a graphic processing unit (GPU) including a hull shader, the GPU configured to perform: a binning pipeline including: binning, by the hull shader, primitives tessellated with a second tessellation factor that is different from a first tessellation factor, determining whether the primitives tessellated with the second tessellation factor are included in a plurality of tiles, and scheduling a rendering order of the plurality of tiles when the GPU determines that the primitives tessellated with the second tessellation factor are included in the plurality of tiles; and a per tile rendering pipeline on the plurality of tiles based on the scheduled rendering order including performing binning, on a first tile scheduled in the rendering order, that generates a visibility stream of a neighboring tile adjacent to the first tile; and a memory that stores the visibility stream of a neighboring tile adjacent to a first tile scheduled as a first rendering order.

The binning pipeline may include tessellating based on the first tessellation factor.

The second tessellation factor may be lower than the first tessellation factor.

While the binning pipeline is performed, the GPU may perform, by the hull shader, hull shading to generate an output patch; determines the first tessellation factor; generate the primitives tessellated with the second tessellation factor by performing, on the output patch, tessellate by a tessellator and domain shading by a domain shader, based on the second tessellation factor that is lower than the first tessellation factor; bin a tile list of the primitives tessellated with the second tessellation factor; determines whether the primitives tessellated with the second tessellation factor are included in the plurality of tiles; and determines the first tile corresponding to the rendering order when it is determined that the primitives tessellated with the second tessellation factor are included in the plurality of tiles.

The GPU may perform a first rendering pipeline on the first tile and may perform a second rendering pipeline on the neighboring tile including performing rendering on at least one of a visible vertex, a visible primitive, and a visible patch on the neighboring tile based on the visibility stream generated in the first rendering pipeline.

In another general aspect, a non-transitory computer-readable recording medium having recorded thereon a program, which when executed by a computer, performs the method described above.

In another general aspect, a computing apparatus performing a tile-based graphics pipeline comprises: a graphic processing unit (GPU) including: a binning pipeline configured to generate a tile list of objects indicating which tile vertices, primitives, or patches the objects belong to; and a rendering pipeline configured to render an object, per tile, based on the tile list generated in the binning pipeline; and a memory to store the tile list, wherein each of the binning pipeline and the rendering pipeline is configured to implement a tessellation pipeline and the GPU is configured to operate in an efficiency mode to defer or lower tessellation by performing tessellation in one of the binning and rendering pipelines.

The efficiency mode may cause the GPU to operating in an efficient mode that reduces data throughput of a pipeline by performing one of: tessellating on the output patch in the binning pipeline; tessellating on an output patch in the binning pipeline using one of a first tessellating factor and a second tessellating factor that is lower than a first tessellating factor; tessellating in the rendering pipeline using the first tessellating factor; and rendering a first tile in the rendering pipeline and rendering a tile neighboring the first by rendering on at least one of a visible vertex, a visible primitive, and a visible patch of the neighboring tile using a visibility stream generated during rendering of the first tile.

The efficiency mode may cause the GPU determine one of: the number of tiles that include the output patch; and the number of tiles including primitives tessellated with a second tessellation factor that is lower than a first tessellating factor.

In another general aspect, a method of performing a tile-based graphics pipeline by a graphic processing unit (GPU) comprises: operating the GPU in an efficiency mode to defer or lower tessellation by performing tessellation in one of a binning and a rendering pipelines; performing a binning pipeline according to the efficiency mode generating a tile list of objects indicating which tile vertices, primitives, or patches the objects belong to; and performing a rendering pipeline according to the efficiency mode rendering an object, per tile, based on the tile list generated in the binning pipeline.

Operating in the efficiency mode may further comprise causing the GPU to operate in an efficient mode that reduces data throughput of a pipeline by performing one of: tessellating on the output patch in the binning pipeline; tessellating on an output patch in the binning pipeline using one of a first tessellating factor and a second tessellating factor that is lower than a first tessellating factor; tessellating in the rendering pipeline using the first tessellating factor; and rendering a first tile in the rendering pipeline and rendering a tile neighboring the first by rendering on at least one of a visible vertex, a visible primitive, and a visible patch of the neighboring tile using a visibility stream generated during rendering of the first tile.

Operating in the efficiency mode may further comprise causing the GPU to determine one of: the number of tiles that include the output patch; and the number of tiles including primitives tessellated with a second tessellation factor that is lower than a first tessellating factor.

Other features and aspects will be apparent from the following detailed description, the drawings, and the claims.

BRIEF DESCRIPTION OF THE DRAWINGS

FIG. 22 is a diagram illustrating an example of a case when a tile list to which a patch belongs and a tile list to which tessellated primitives belong are different based on a result of tessellating the patch.

FIGS. 26A and 26B are diagrams illustrating examples of conditions for selecting a type of a graphics pipeline to be processed in a GPU.

FIGS. 27A and 27B are diagrams illustrating examples for describing of conditions for selecting a type of graphics pipeline to be processed in a GPU.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

All terms including descriptive or technical terms which are used herein should be construed as having meanings that are consistent with those understood by one of ordinary skill in the art. However, various terms also may have different meanings, for example, according to the intent of one of ordinary skill in the art, precedent cases, or the appearance of new technologies. Also, some terms may be selected by the applicant to have a particular meaning as described in the following detailed description of the invention.

In the following description, when an element is described as being "connected" to another element, the elements may not be "directly connected", but may be "electrically connected" via another device or devices located there between. Also, when a part "includes" an element, the part may include additional elements without excluding the element, unless otherwise stated. In the following description, terms such as "unit" and "module" indicate an element for processing at least one function or operation, wherein the unit and the block may be embodied as hardware or combination of hardware and software.

In the following description, it is to be understood that the terms such as "including" or "having" are intended to be open terms and indicate the existence of the features or components; however, they are not intended to preclude the possibility that one or more additional features or components may exist or may be added.

It will be understood that although the terms "first", "second", etc. may be used herein to differentiate between various components; however, these components are not intended to connote order or otherwise be limited by these terms unless specifically states.

Expressions such as "at least one of," when preceding a list of elements, modify the entire list of elements and do not modify the individual elements of the list.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
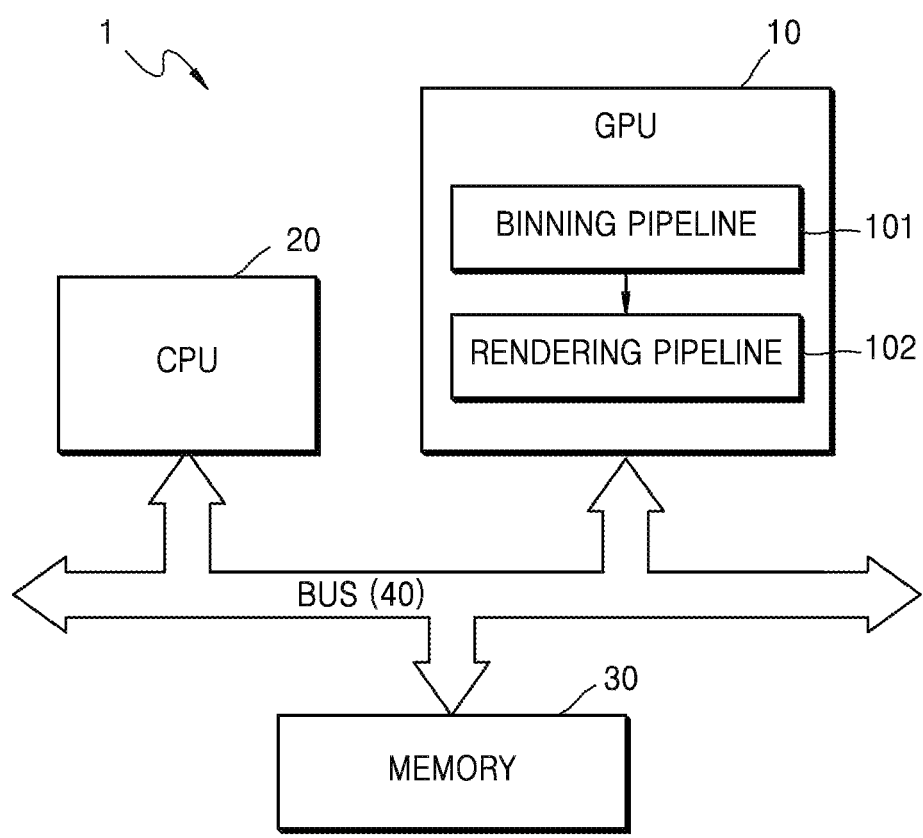
FIG. 1 is a diagram illustrating an example of a computing apparatus.

FIG. 1 is a diagram illustrating an example of a computing apparatus according to one exemplary embodiment.

Referring to FIG. 1, the computing apparatus 1 includes a graphics processing unit (GPU) 10, a central processing unit (CPU) 20, a memory 30, and a bus 40. The components of the computing apparatus 1 are exemplary, and the computing apparatus 1 may include additional general-purpose components other than those shown in FIG. 1, as understood by one skilled in the art.

Examples of various devices that may be implemented using the computing apparatus 1 include a desktop computer, a laptop computer, a smart phone, a personal digital assistant (PDA), a portable media player, a video game console, a television set-top box, a tablet device, an e-book reader, and a wearable device, but are not limited thereto. In addition, the computing apparatus 1 may be implemented as any device or apparatus having a graphics processing function providing the display of content, and the category of the computing apparatus 1 may include various apparatuses.

The CPU 20 is hardware that controls overall operations and functions of the computing apparatus 1. For example, the CPU 20 implements an operating system (OS), invokes a graphics application programming interface (API) for the GPU 10, and executes a driver of the GPU 10. Also, the CPU 20 may execute various other applications stored in the memory 30, such as, for example, a web-browsing application, a game application, and a video application, among others.

The GPU 10 is a graphic-exclusive processor that performs a graphics pipeline. In one example, the GPU 10 may be implemented as hardware that executes a 3-dimensional (3D) graphics pipeline in order to display 3D objects of a 3D image as a 2D image for display. For example, the GPU 10 may perform various functions, such as shading, blending, illuminating, and generating pixel values of pixels to be displayed.

In one example, the GPU 10 may perform a tile-based graphics pipeline or a tile-based rendering (TBR). In this context, the term "tile-based" means that each frame of a moving image is divided or partitioned into a plurality of tiles, and rendering is performed per tile. Since a tile-based architecture may have a low throughput when compared to processing a frame per pixel, a mobile device or other embedded device that has a low processing performance, such as a smart phone or a tablet device, may use the tile-based architecture as a graphics rendering method.

Referring to FIG. 1, the GPU 10 performs a graphics pipeline including a binning pipeline 101 and a rendering pipeline 102. The binning pipeline 101 is a process of generating a tile list indicating to which tile vertices, primitives, or patches making up 2D or 3D objects are included. Accordingly, other terms, such as a tiling pipeline or a binning phase are within the meaning of binning pipeline. The rendering pipeline 102 is a process of rendering an object per tile, based on the tile list generated in the binning pipeline 101. When the rendering pipeline 102 is completed, pixel expressions of 2D or 3D objects to be displayed on a 2D display screen may be determined. Other terms, such as a rendering phase, are within the meaning of rendering pipeline 102.

Each of the binning pipeline 101 and the rendering pipeline 102 may include a tessellation pipeline. In other words, the GPU 10 may perform deferred tessellation. Some graphics pipelines including DirectX11 (DX11) API or OpenGL 4.0 API of Microsoft include additional processing stages for tessellating graphics primitives (or graphics patches). Tessellation is a process of partitioning graphics patches to graphics primitives, which are smaller than the graphics patches, such that an image having finer details is displayable. The graphics pipeline, including the binning pipeline 101 and the rendering pipeline 102 that are performed by the GPU 10 of the computing apparatus 1, may support such tessellation. One or more exemplary embodiments described hereinafter may be performed by the GPU 10.

The memory 30 is hardware that stores various types of data processed in the computing apparatus 1. For example, the memory 30 may store data processed or data to be processed by the GPU 10 and the CPU 20. Also, the memory 30 may store applications and drivers to be executed by the GPU 10 and the CPU 20. The memory 30 may include a random access memory (RAM), such as dynamic random access memory (DRAM) or static random access memory (SRAM), read-only memory (ROM), electrically erasable programmable read-only memory (EEPROM), a CD-ROM, a Blu-ray or another optical disk storage device, a hard disk drive (HDD), a solid state drive (SSD), or a flash memory, and moreover, the memory 30 may include an external storage device accessible by the computing apparatus 1.

The bus 40 is hardware that connects various pieces of hardware in the computing apparatus 1 allowing the pieces of hardware to transmit or receive data to or from each other. Examples of the bus 40 include a peripheral component interconnect (PCI) bus and a PCI express bus.

The binning pipeline 101 described herein includes a binning pipeline 101-1, 101-2, 101-3, or 101-4 (shown in FIG. 7 and described in further detail below). For example, the binning pipeline 101 may correspond to any one of the binning pipelines 101-1 through 101-4. Also, the rendering pipeline 102 (also shown in FIG. 7 and described in further detail below) includes a rendering pipeline 102-1, 102-2, 102-3, or 102-4. The rendering pipeline 102 may correspond to any one of the rendering pipelines 102-1 through 102-4.

Figure 2:
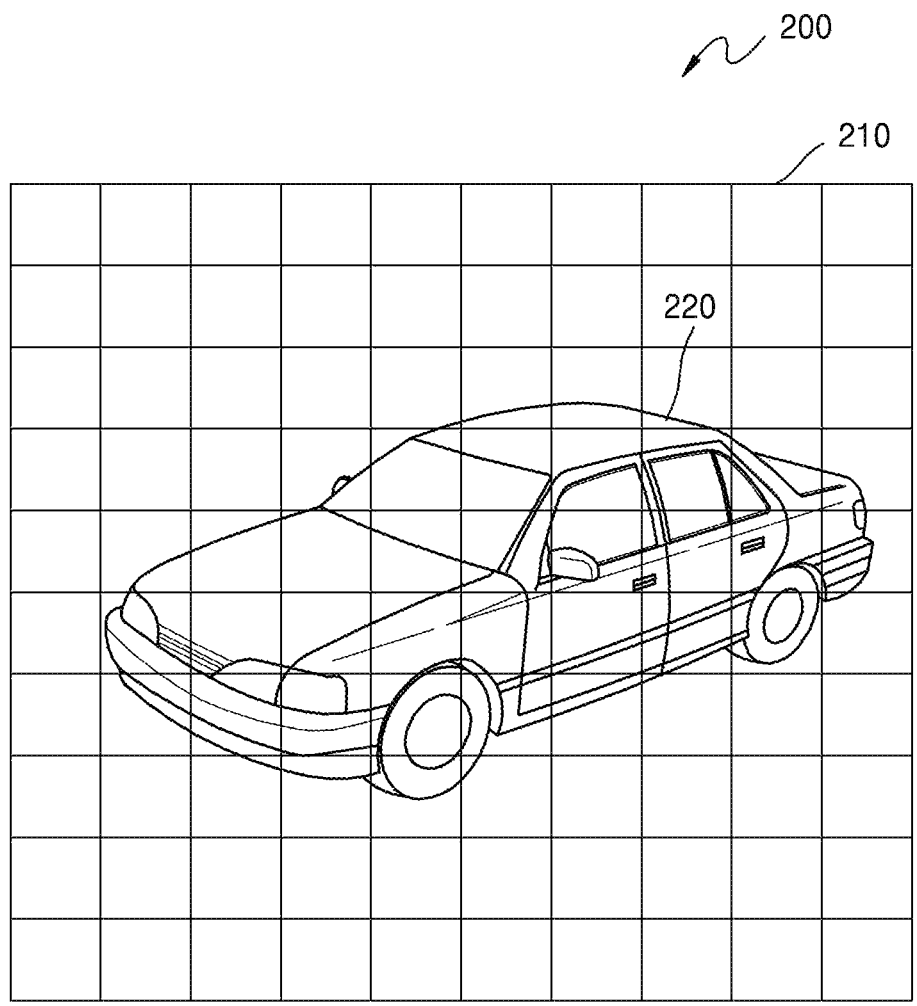
FIG. 2 is a diagram illustrating an example of a tile-based rendering (TBR).

FIG. 2 is a diagram including an example for describing TBR. FIG. 2 includes a frame 200 presenting an object 220 including a plurality of tiles 210. In one example, the object 220 may be a 3D object, such as a car object 220 which is presented in one frame 200 of a moving image. The GPU 10 partitions the frame 200 including the 3D car object 220 into N×M tiles 210, wherein N and M are each natural numbers. In this example, the binning pipeline 101 partitions the frame including the car object 220 into the tiles 210 and determines which tiles 210 include the car object 220. The GPU 10 renders the car object 220 per tile to convert the car object 220 to pixel expressions. For example, the rendering pipeline 102 renders the car object 220 per tile to convert the car object 220 to pixel expressions. As such, in TBR, the car object 220 included in one frame is not rendered per pixel but is rendered per tile using the tiles 210.

Figure 3:
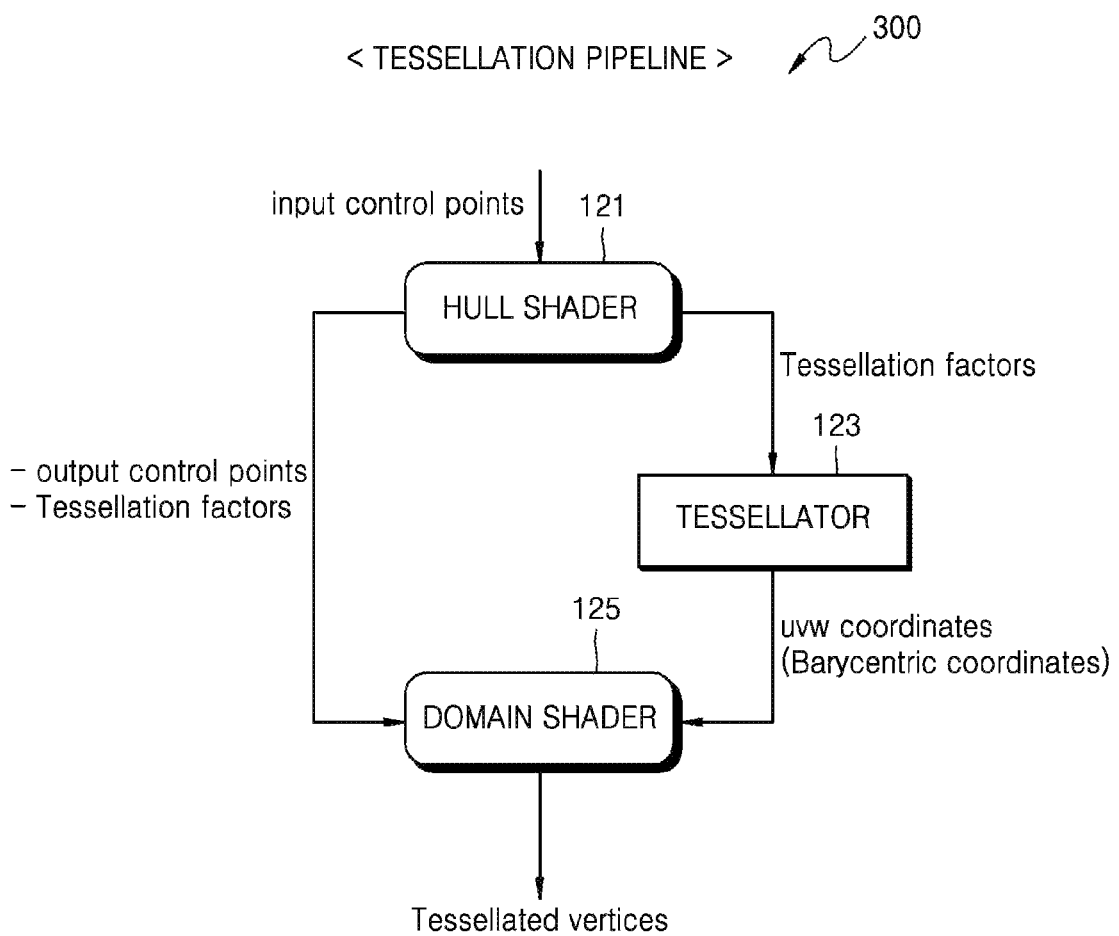
FIGS. 3, 4, and 5 are diagrams illustrating an example of a tessellation pipeline.
Figure 4:
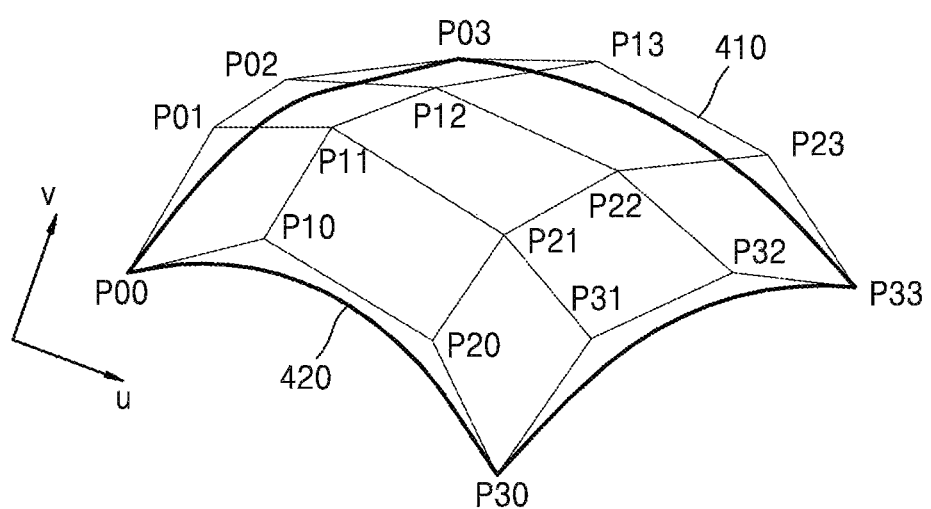
Figure 5:
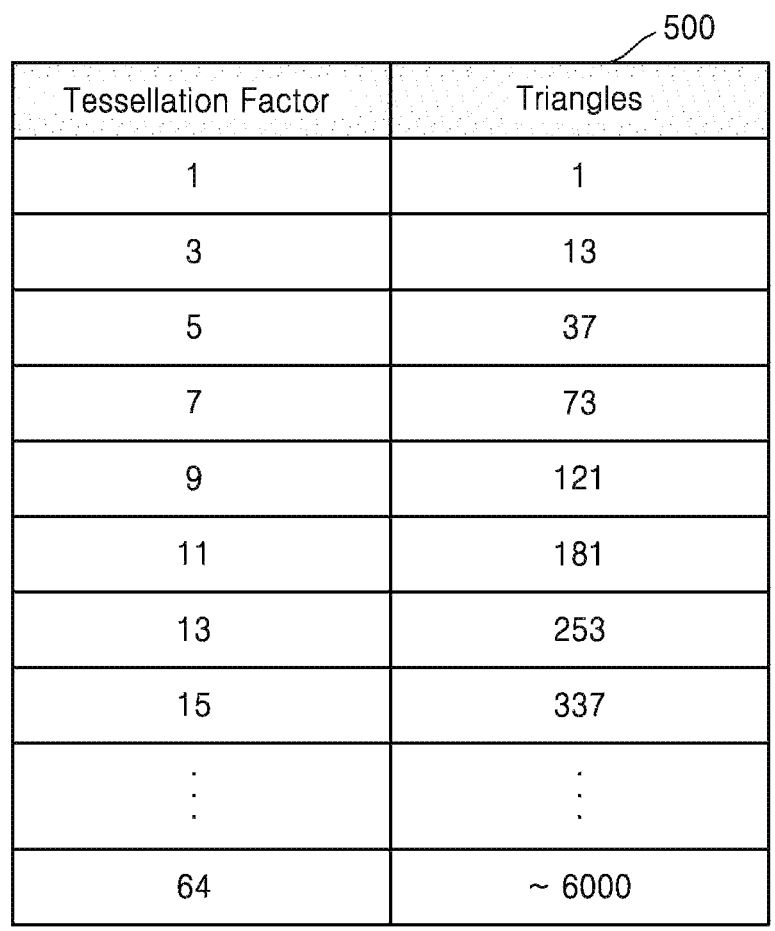

FIGS. 3, 4, and 5 provide examples to help illustrate a tessellation pipeline. FIGS. 3, 4, and 5 are in conjunction with each other. The tessellation pipeline 300 described with reference to FIGS. 3, 4, and 5 may include the binning pipeline 101 and the rendering pipeline 102 of FIG. 1 described above, or various modified examples of the binning pipeline 101 and the rendering pipeline 102.

Referring to FIG. 3, the tessellation pipeline 300 is performed by a hull shader 121, a tessellator 123, and a domain shader 125. In other words, the tessellation pipeline 300 described herein may include at least one stage from among processes (or stages) of hull shading performed by the hull shader 121, tessellating performed by the tessellator 123, and domain shading performed by the domain shader 125.

The hull shader 121 converts input control points expressing a surface of a low order to output control points forming patches. For example, the hull shader 121 may convert input control points to generate an output patch 410 having a mesh shape, which includes control points P00, P01, P02, P03, P10, P11, P12, P13, P20, P21, P22, P23, P30, P31, P32, and P33 shown in FIG. 4. Here, the output patch 410 has a polygonal shape, such as a triangular shape, a rectangular shape, or an isoline shape.

The hull shader 121 may generate output control points making up patches. At the same time, the hull shader 121 also may determine a tessellation factor TF or a tessellation level TL. The tessellation factor TF or the tessellation level TL is an index indicating how much of a patch is to be partitioned and how the patch is to be partitioned. An exemplary table 500, shown in FIG. 5, defines a relationship between the tessellation factor TF and the number of triangles to be partitioned. According to the table 500, when a tessellation factor TF is 1, the number of triangles is 1, and thus tessellation may not be performed on a patch. However, as a tessellation factor TF increases, the number of triangles geometrically increases. When the number of triangles to be partitioned increases as the tessellation factor TF increases, throughput to be performed by the GPU 10 on a patch also increases. When a tessellation factor TF increases, an expression of a patch of an object may be smoother. In the example provided by table 500 of FIG. 5, the polygon to be partitioned is a triangle, but a patch may be partitioned using other polygons, such as rectangles or isolines.

The hull shader 121 transmits information about output control points of an output patch and a tessellation factor TF to the tessellator 123 and the domain shader 125.

The tessellator 123 calculates uvw coordinates and weights of the output control points with respect to barycentric coordinates using the tessellation factor TF received from the hull shader 121.

The domain shader 125 produces tessellated vertices using the information received from the hull shader 121, the uvw coordinates (of which the w coordinate is optional), and the weights calculated by the tessellator 123. Referring to FIG. 4, locations of the tessellated vertices form a boundary 420. By performing the tessellation pipeline 300, the output patches 410 may be converted to vertices (or primitives) to form a smoother boundary 420.

Figure 6:
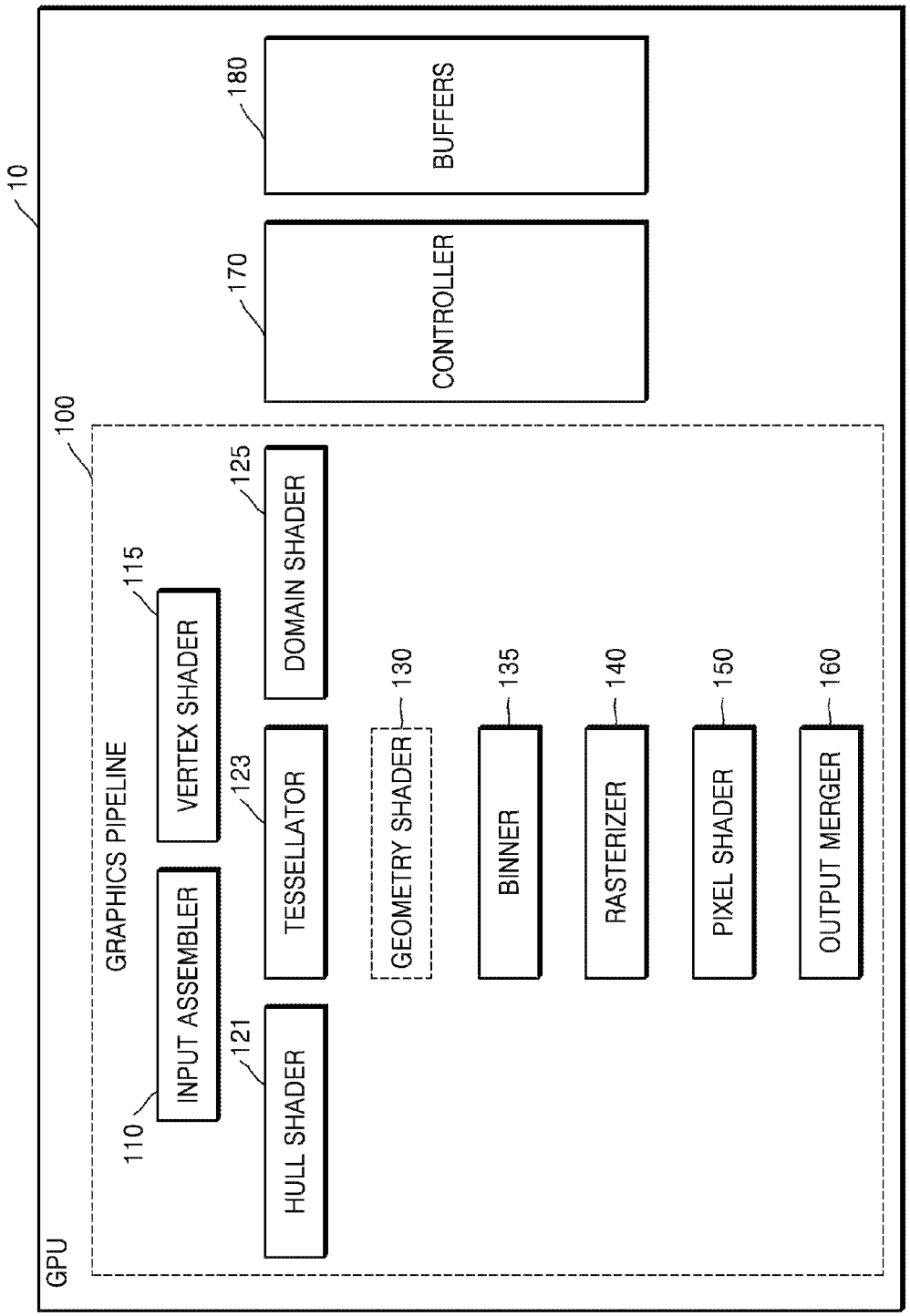
FIG. 6 is a block diagram illustrating an example of a detailed hardware structure of the GPU of FIG. 1.

FIG. 6 is a block diagram showing an example of a detailed hardware structure of the GPU 10 of FIG. 1.

Referring to FIG. 6, the GPU 10 includes a graphics pipeline 100, a controller 170, and buffers 180. The graphics pipeline includes an input assembler 110, a vertex shader 115, the hull shader 121, the tessellator 123, the domain shader 125, a geometry shader 130, a binner 135, a rasterizer 140, a pixel shader 150, and an output merger 160. The components performing the graphics pipeline 100 in the GPU 10 may be classified based on function that are described in further detail below. Each of the components performing the graphics pipeline 100 are realized as program logic or software modules that are executed by the GPU 10 to perform certain functions. In another example, the components performing the graphics pipeline 100 may be implemented as sub-processing units or processor cores included in the GPU 10. In other words, the various configurations of the components performing the graphics pipeline 100 provided herein are examples and are not to be considered limited thereto. Moreover, terms of the components performing the graphics pipeline 100 have been assigned based on the functions they perform, but it will be appreciated by one of ordinary skill in the art that these terms may vary. For example, according to one exemplary embodiment, the binner 135 and the controller 170 may be individual components, but according to another exemplary embodiment, the binner 135 may be included as part of the controller 170, such that the controller 170 is provided by the GPU 10 without a separate binner.

For convenience of description, the following examples of the components performing the graphics pipeline 100 in the GPU 10 use terms found in association with application programming interfaces (APIs) provided by DirectX of Microsoft, for example DX11: however, the terms used in conjunction with the components described herein are not limited thereto. In other words, the components performing the graphics pipeline 100 in the GPU 10 also may correspond to similar components found in another API, such as the Open Graphics Library (OpenGL) 4.0 or the Compute Unified Device Architecture (CUDA) 6.0. For example, the domain shader 125 may correspond to a tessellation evaluation shader described in OpenGL 4.0, and it is understood by one of ordinary skill in the art that other components of the GPU 10 may correspond to components used in other APIs, such as OpenGL 4.0 or CUDA 6.0.

The input assembler 110 supplies data of vertices about objects stored in the memory 30 to the graphics pipeline 100. The vertices supplied to the graphics pipeline 100 may correspond to a patch, for example, a mesh or surface expression, but are not limited thereto.

The vertex shader 115 transmits the vertices supplied by the input assembler 110 as input control points of the hull shader 121. For example, vertex shading defined in DX9 performs world-view-projection on vertices. However, vertex shading defined in DX11, to which a tessellation pipeline is introduced does not perform world-view-projection on vertices and only transmits the vertices to a next stage. The vertex shader 115, according to the current embodiment, may operate in the similar manner. In other words, the vertex shader 115 only transmits the input control points corresponding to the vertices supplied by the input assembler 110 to the hull shader 121, and does not generate new control points.

The hull shader 121, the tessellator 123, and the domain shader 125 may perform the tessellation pipeline 300 described above with reference to FIG. 3. In other words, the input control points input to the hull shader 121 may be output by the domain shader 125 as tessellated vertices (or tessellated primitives) bounding an output patch.

The geometry shader 130 is an optional component that may be used to produce additional vertices (or primitives) from the tessellated vertices (or tessellated primitives) received from the domain shader 125.

The binner 135 performs binning or tiling using output primitives from the domain shader 125 or the geometry shader 130. In other words, the binner 135 generates (bins) a tile list indicating information about each of tiles to which the output primitives belong, by performing a depth test (or a tile Z test). According to another example, the binner 135 may be a component included in the controller 170.

The rasterizer 140 converts the output primitives from the domain shader 125 or the geometry shader 130 to pixel values in a 2D space, based on the generated tile list. The pixel shader 150 may perform additional operations on pixels, such as a depth test, clipping, scissoring, and blending. A result of pixel-shading performed by the pixel shader 150 may be stored in the buffers 180 by the output merger 160 and displayed as a frame of a moving image.

The controller 170 controls overall functions and operations of the components performing the graphics pipeline 100 and the buffers 180. Also, the controller 170 may control modes of the graphics pipeline 100, as described below with reference to FIG. 7.

Figure 7:
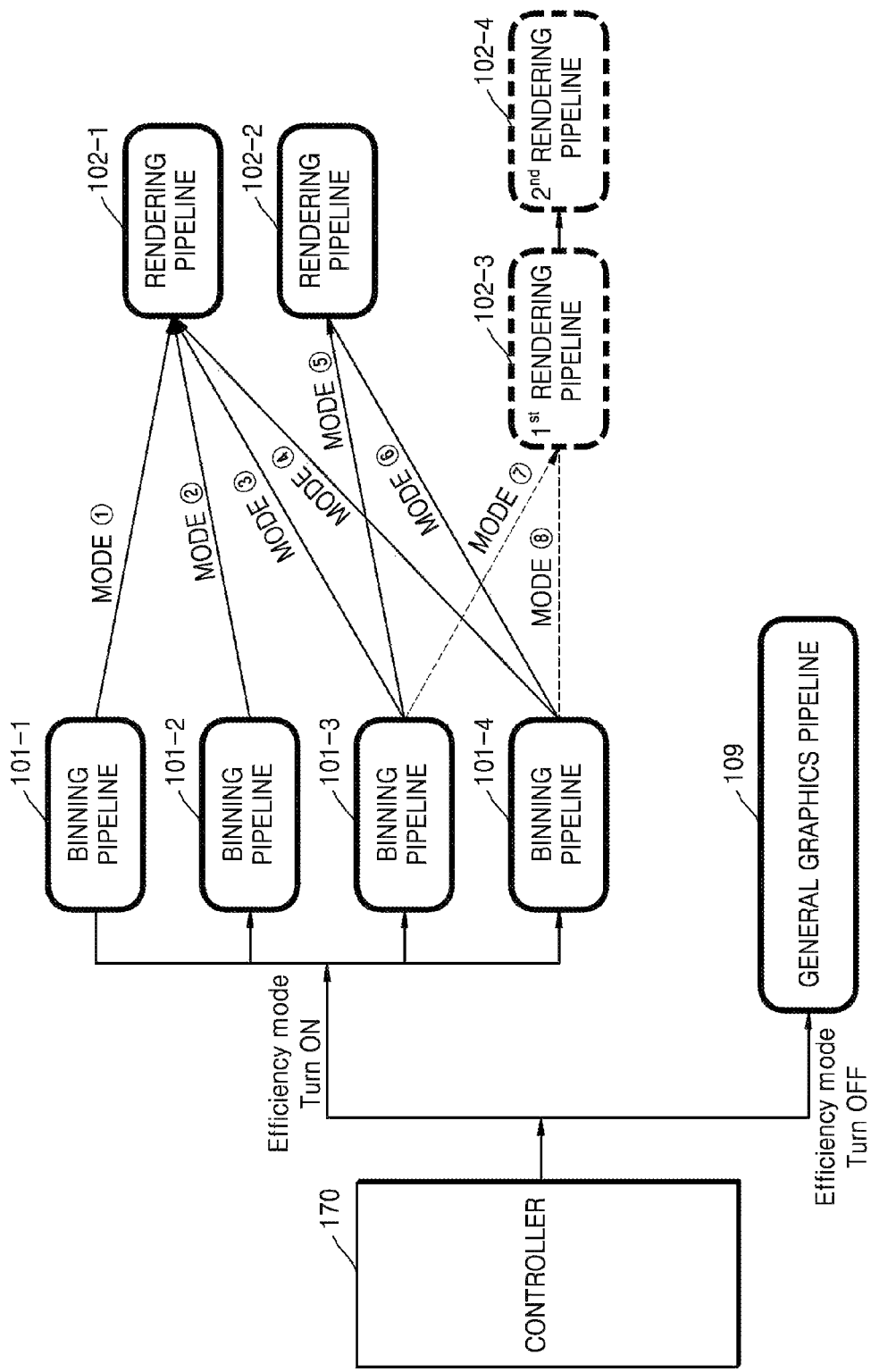
FIG. 7 is a diagram illustrating an example of selecting various types of graphics pipelines performed by a GPU.

FIG. 7 is a diagram of an example illustrating the selection of various types of graphics pipelines performed by the GPU 10.

Referring to FIG. 7, the graphics pipelines may operate in mode $\hat{1}$ through mode $\hat{8}$ according to various embodiments that are described hereinafter, and the controller 170 may control which one of the pipelines is to be performed by the GPU In detail, the controller 170 may turn off or turn on an efficiency mode providing one or more of the pipelines which operate in mode $\hat{1}$ through mode $\hat{8}$. The turning on or off of the efficiency mode may be set by a user of the computing apparatus or may depend upon a processing environment (for example, resolution, capacity, or a performance of the computing apparatus 1) of a moving image to be processed by a graphics pipeline.

When the efficiency mode is turned off, the controller 170 performs a general graphics pipeline 109. Here, the general graphics pipeline 109 may be implemented using any of the well-known graphics pipelines, such as those provided by DX9, DX10, DX11, CUDA 6.0, or OpenGL 4.0, and therefore is not described in further detail.

When the efficiency mode is turned on, the controller 170 may perform any one of the graphics pipelines in mode $\hat{1}$ through mode $\hat{8}$. Mode $\hat{1}$ through mode $\hat{8}$ may be selected in a number of ways. For example, the mode may be set by the user of the computing apparatus 1, or the mode selected may depend upon a processing environment of a moving image to be processed by a graphics pipeline, for example, a tile size, a resolution, a capacity, or a performance of the computing apparatus 1. In mode $\hat{1}$, the controller 170 controls a graphics pipeline including the binning pipeline 101-1 and the rendering pipeline 102-1 performed by the GPU 10. In mode $\hat{2}$, the controller 170 controls a graphics pipeline including the binning pipeline 101-2 and the rendering pipeline 102-1 performed by the GPU 10. In mode $\hat{3}$, the controller 170 controls a graphics pipeline including the binning pipeline 101-3 and the rendering pipeline 102-1 performed by the GPU 10. In mode $\hat{4}$, the controller 170 controls a graphics pipeline including the binning pipeline 101-4 and the rendering pipeline 102-1 performed by the GPU 10. In mode $\hat{5}$, the controller 170 controls a graphics pipeline including the binning pipeline 101-3 and the rendering pipeline 102-2 performed by the GPU 10. In mode $\hat{6}$, the controller 170 controls a graphics pipeline including the binning pipeline 101-4 and the rendering pipeline 102-2 performed by the GPU 10. In mode $\hat{7}$, the controller 170 controls a graphics pipeline including the binning pipeline 101-3, the first rendering pipeline 102-3, and the second rendering pipeline 102-4 performed by the GPU 10. In mode $\hat{8}$, the controller 170 controls a graphics pipeline including the binning pipeline 101-4, the first rendering pipeline 102-3, and the second rendering pipeline 102-4 performed by the GPU 10. Hereinafter, various exemplary embodiments of the graphics pipelines operating in mode $\hat{1}$ through mode $\hat{8}$ are described in detail.

Figure 8B:
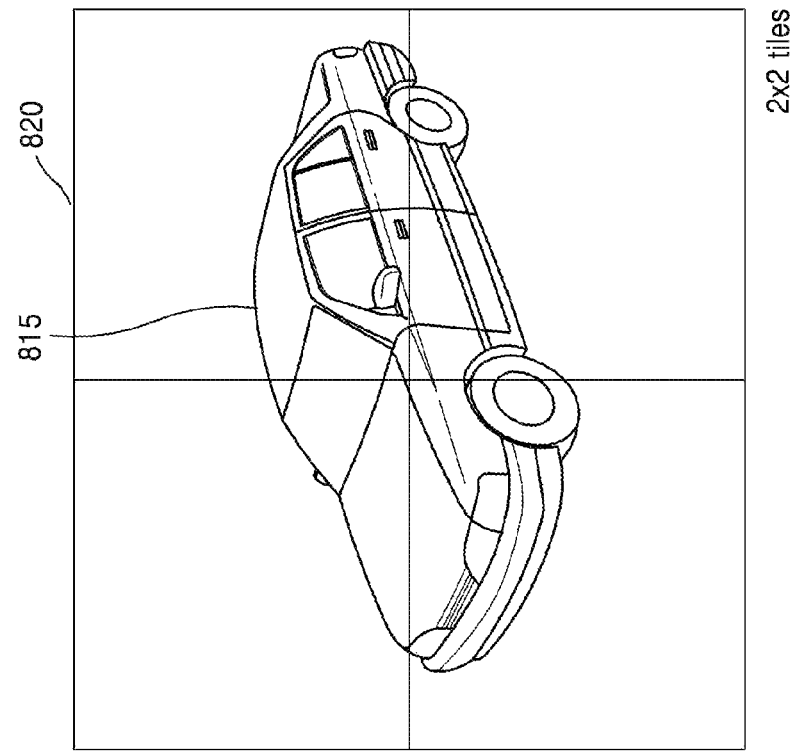
FIGS. 8A and 8B are diagrams illustrating an example of a relationship between graphics processing performance and the number of tiles for partitioning a 3D object, according to exemplary embodiments.
Figure 8A:
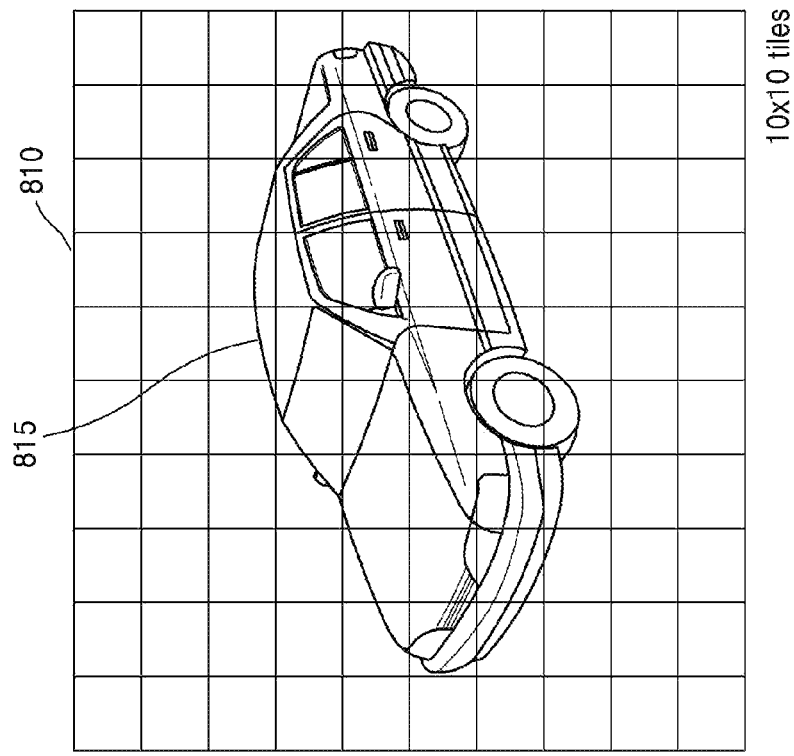

FIGS. 8A and 8B are diagrams illustrating examples of a relationship between graphics processing performance (or efficiency) and a number of tiles partitioning a 3D object.

FIG. 8A illustrates an example of when the 3D object 815 is partitioned into 10×10 tiles 810, and FIG. 8B illustrates an example of when the 3D object 815 is partitioned into 2×2 tiles 820. Since the GPU 10 performs a tile-based rendering or tile-based graphics pipeline per tile, rendering with respect to the 3D object 815 of FIG. 8A may be performed on 100 tiles. On the other hand, rendering with respect to the 3D object 815 of FIG. 8B may be performed on 4 tiles. In FIG. 8A, only about ⅓ of the tiles 810 overlap the 3D object 815. As a result, rendering may be skipped on the other ⅔ of the tiles 810; however, binning (or tiling) has to be pre-performed on the 100 tiles 810. On the other hand, since the 4 tiles 820 of FIG. 8B all overlap the 3D object 815, parallel graphics processes may be performed on the 4 tiles 820.

Currently, many GPUs are manufactured having a single instruction, multiple thread (SIMT) architecture. The SIMT architecture is one of methods for implementing a single program multiple data (SPMD) processor for processing massive amounts of data with one program. The SIMT architecture is able to process a large amount of data using little control hardware, but processing efficiency may be decreased since thread divergence is difficult to process.

Comparing the examples provided in FIGS. 8A and 8B, the SIMT architecture may complete an operation after generating and processing 100 threads with respect to the 100 tiles 810 of FIG. 8A; however, the SIMT architecture may complete an operation after generating and processing only 4 threads with respect to the 4 tiles 820 of FIG. 8B. Since a size of one tile and a size of an object included in one tile in FIG. 8A are smaller than those in FIG. 8B, the graphic data to be processed in FIG. 8A may be less than that processed in FIG. 8B. However it may not be necessarily advantageous to partition the 3D object 815 into many tiles 810, as shown in FIG. 8A, as compared to the fewer tiles 820 shown in FIG. 8B, since thread divergence increases. More recently developed GPUs that are implemented using the SIMT architecture tend to use a big tile size.

Figure 9:
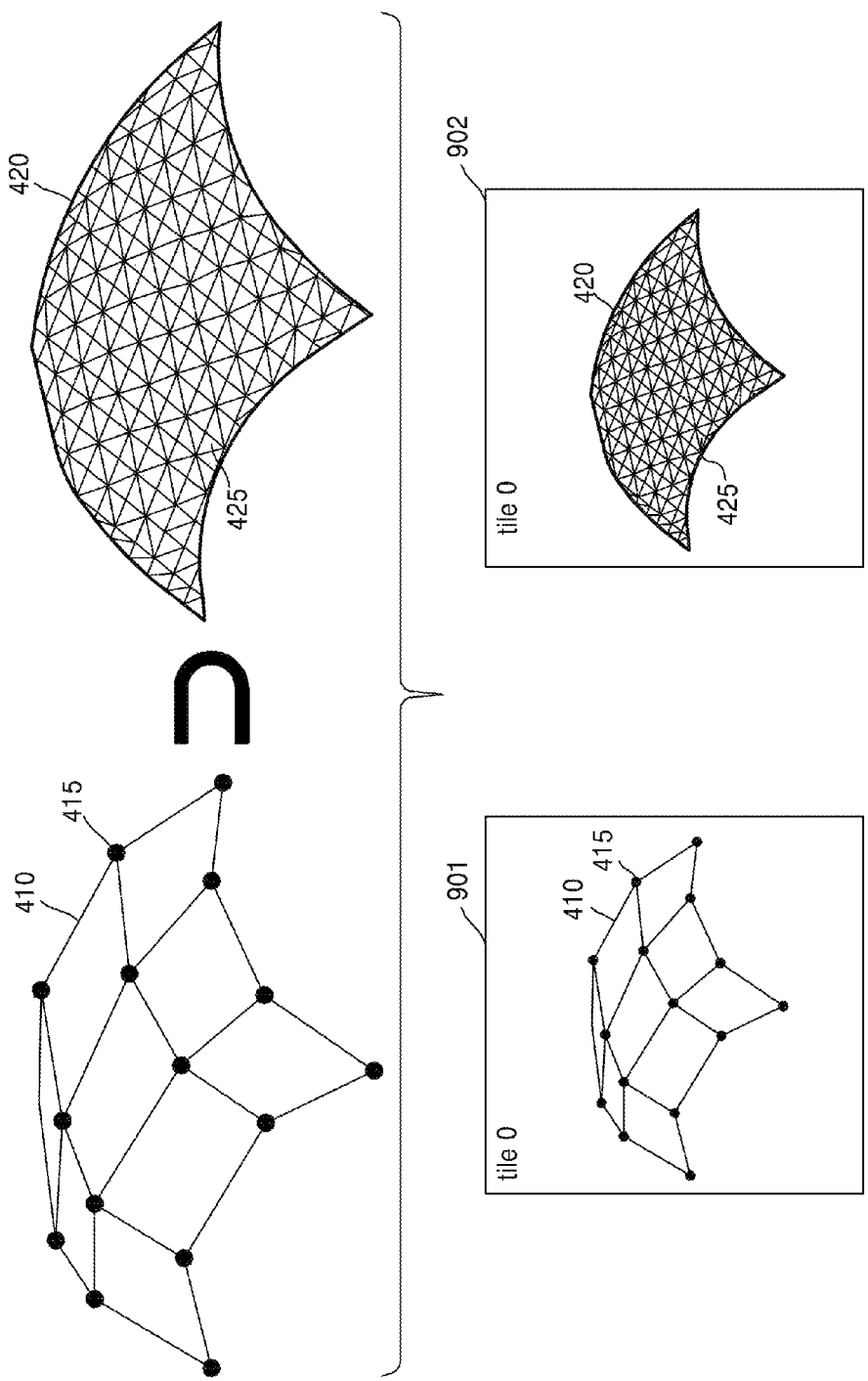
FIG. 9 is a diagram illustrating an example of a relationship between output control points of an output patch and tessellated primitives.

FIG. 9 is a diagram illustrating an example of a relationship between output control points of the output patch and tessellated primitives.

As described above with reference to FIG. 8, when the GPU 10 uses a big tile size, a probability that the output patch 410 of a 3D object is included in a tile 901 (e.g., tile 0) may increase. A tessellation pipeline, in the binning pipeline 101 of FIG. 1, produces a greater number of the tessellated primitives 425 by tessellating the output patch 410 including the output control points 415 and performs binning (or tiling) on the tessellated primitives 425. As shown in FIG. 9, even if the output patch 410 including the output control points 415 provided in the tile 901 is processed in the tessellation pipeline, the boundary 420 formed by the tessellated primitives 425 may be located within a tile 902 similar to the boundary formed by the output patch 410, because a graphics pipeline of the GPU 10 may be programmed such that the boundary 420 formed by the tessellated primitives 425 is located within the boundary formed by the output patch 410. If not, the graphics pipeline may be debugged by a compiler.

The tile 901, which is the result of performing binning (or tiling) on the output patch 410 including the output control points 415, may be the same as the tile 902 (tile 0), which is the result of performing binning on the tessellated primitives 425. Thus, even if the tessellator 123 skips tessellating of the tessellation pipeline in the binning pipeline 101, it may be assumed that the final result of the binning pipeline 101 is the same as when the tessellator 123 does not skip the tessellating.

The same assumption is valid for the tessellation factor TF or the tessellation level TL of the output patch 410 for the output control points 415. For example, a boundary formed by tessellated primitives that are produced by a lower tessellation factor (for example, TF=3) are included in a boundary formed by tessellated primitives produced by a higher tessellation factor (for example, TF=13). Accordingly, even if the binning pipeline 101 is set to perform a tessellation pipeline using a new, lower tessellation factor (for example, TF=3) instead of using the higher tessellation factor (for example, TF=13) that was determined by the hull shader 121, the binning (or tiling) resulting from the newly set lower tessellation factor may be the same as that resulting from the higher tessellation factor.

Meanwhile, a compiler that designs and examines a graphics pipeline to be driven in the GPU 10 may debug any graphics pipeline that does not operate as described in FIG. 9 and compile the graphics pipeline to operate as described in FIG. 9.

The following embodiments described hereinafter with reference to FIGS. 10 through 21 may operate based on the above description, but are not limited thereto.

Figure 10:
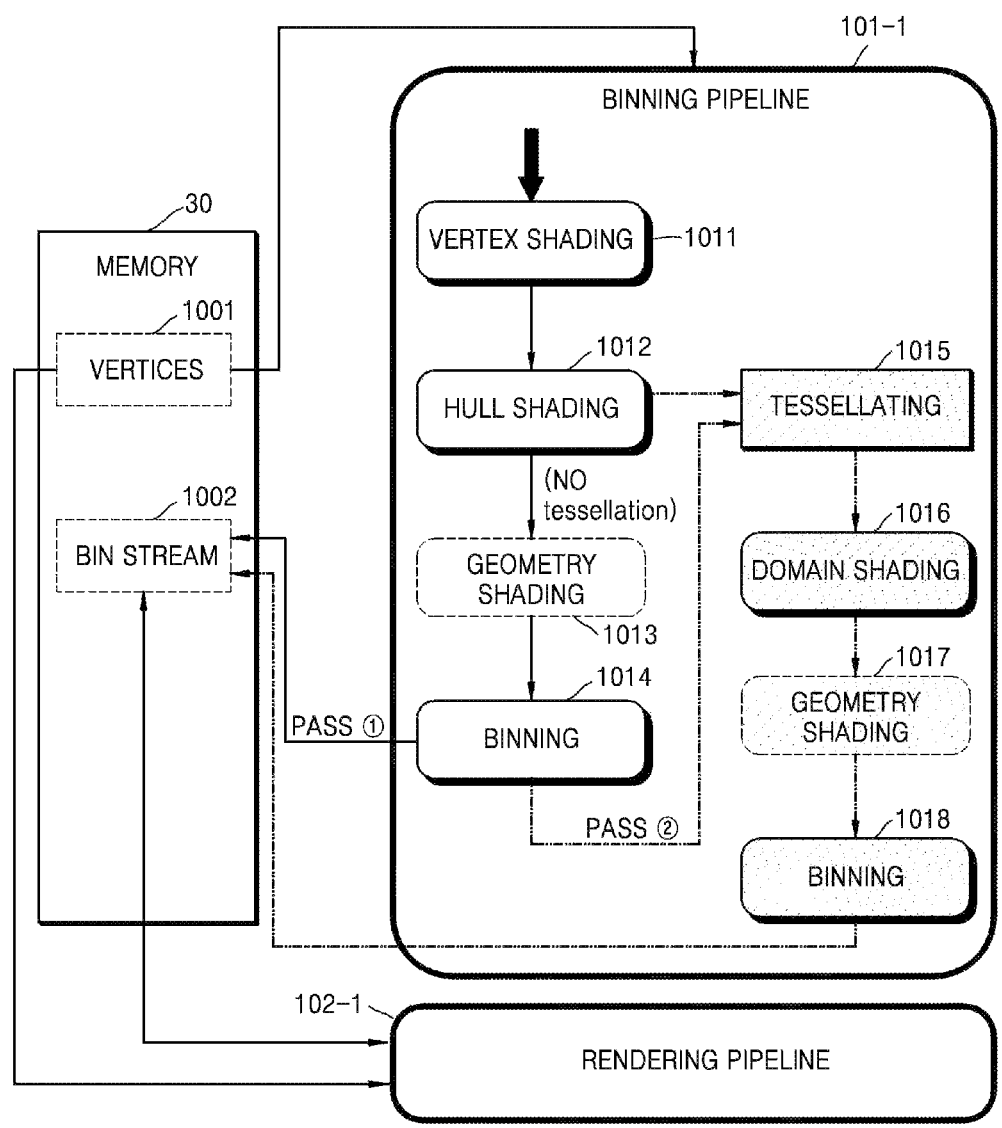
FIG. 10 is a diagram illustrating an example of a graphics pipeline performed in a GPU.

FIG. 10 is a diagram illustrating an example of a graphics pipeline performed in the GPU 10.

Referring to FIG. 10, the graphics pipeline, including the binning pipeline 101-1 and the rendering pipeline 102-1, operate in mode $\hat{1}$, which is described above with reference to FIG. 7. The graphics pipeline of FIG. 10 is described with reference to the hardware components of the GPU 10 described above for FIG. 6; however, only the components and the pipeline stages relevant to the current example are described in detail. Thus, one of ordinary skill in the art will appreciate that general-purpose components and pipeline stages other than those described with reference to FIG. 10 also may be included.

The vertex shader 115 performs vertex shading 1011 using vertices 1001 stored in the memory 30. The vertex shader 115 converts the vertices 1001 to control points which are input to the hull shader 121.

The hull shader 121 performs hull shading 1012 to convert the input control points expressing a surface of a low order to output control points that form patches. The hull shader 121 may determine a tessellation factor TF while producing the output control points. The hull shader 121 transmits information about the output control points of the output patch to the geometry shader 130 or the binner 135.

As described above with reference to FIG. 3, the tessellation pipeline 300 includes all stages of the hull shader 121, the tessellator 123, and the domain shader 125, but as shown in FIG. 10, the stages of the tessellator 123 and the domain shader 125 may be skipped because, as described above with reference to FIG. 9, the binning result of the output patch 410 may be the same as the binning result of the tessellated primitives 425.

The geometry shader 130 is an optional component that performs geometry shading 1013 to produce additional vertices (or primitives) aside from output control points of an output patch that is output from the hull shader 121. Thus, the geometry shading 1013 also may be skipped.

When the geometry shading 1013 is skipped, the binner 135 performs binning 1014 or tiling using the output primitives of an output patch this is received from the hull shader 121. If the geometry shading 1013 is performed, the binner 135 performs the binning 1014 or tiling using the output primitives of an output patch that is received from the geometry shader 130. For example, the binner 135 performs the binning 1014 using a depth test (or a tile Z test) to predict a tile list. The tile list indicates information about tiles to which the output primitives of an output patch belong. Here, the binned tile list may be stored in a bin stream 1002 of the memory 30 as a visibility stream. A visibility stream is a stream that indicates whether an input patch, an input control point, an input primitive, an output patch, an output control point, or an output primitive is viewable from a tile. A visibility stream of an input patch, an input control point, or an input primitive may be defined as an input visibility stream, and a visibility stream of an output patch, an output control point, or an output primitive may be defined as an output visibility stream.

The binner 135 determines whether output primitives of an output patch output from the hull shader 121 are included in one tile based on the result of performing the binning 1014. When it is determined that the output primitives are included in one tile, the binner 135 stores a visibility stream in the bin stream 1002. The stored visibility stream indicates that the output primitives are included in a tile according to a pass $\hat{1}$, and the binning pipeline 101-1 performed on an output patch is complete. As a result, tessellating 1015 performed by the tessellator 123 and domain shading 1016 performed by the domain shader 125 may be skipped in the pass $\hat{1}$.

On the other hand, when it is determined that the output primitives are not included in one tile, according to pass $\hat{2}$, the binner 135 controls the tessellator 123 to perform the tessellating 1015 on the output patch. The binner 135 also controls the domain shader 125 to perform the domain shading 1016 on the output patch. In other words, the pass $\hat{2}$ is performed only when the binner 1014 determines that the output primitives are not included in one tile.

The tessellator 123 performs tessellating 1015 to calculate uvw coordinates and weights of the output control points in barycentric coordinates using a tessellation factor TF received from the hull shader 121.

The domain shader 125 performs domain shading 1016 to produce tessellated vertices (or tessellated primitives) using the uvw coordinates (of which the w coordinate is optional) and the weights received from the tessellator 123, in addition to information about the output control points and the tessellation factor TF received from the hull shader 121.

The geometry shader 130 is an optional component that may be used to perform geometry shading 1017 to produce additional vertices (or primitives) from the tessellated vertices (or the tessellated primitives) received from the domain shader 125. The geometry shading 1017 also may be skipped in pass $\hat{2}$.

According to pass $\hat{2}$, the binner 135 performs binning 1018 or tiling using the tessellated primitives (or the tessellated vertices) output from the domain shader 125 or the geometry shader 130. In other words, the binner 135 performs the binning 1018 to predict a tile list indicating information about tiles to which the tessellated primitives (or the tessellated vertices) belong by performing a depth test (or a tile Z test). In this example, the binned tile list may be stored in the bin stream 1002 of the memory 30 as a visibility stream.

When the binning pipeline 101-1 is completed, the GPU 10 performs the rendering pipeline 102-1 per tile. The rendering pipeline 102-1 may include stages performed by the input assembler 110, the vertex shader 115, the hull shader 121, the tessellator 123, the domain shader 125, the geometry shader 130, the rasterizer 140, the pixel shader 150, and the output merger 160 of the graphics pipeline 100, which have been described above with reference to FIG. 6.

The binning pipeline 101-1 of FIG. 10 operating according to mode $\hat{1}$ described above may not produce tessellated vertices (or tessellated primitives) since the tessellating 1015 by the tessellator 123 may be skipped if output primitives of an output patch are included in one tile. Thus, the throughput of graphic data is lower when compared to that of the tessellation pipeline 300 shown in FIG. 3, wherein the tessellator 123 necessarily performs the tessellating.

Figure 11:
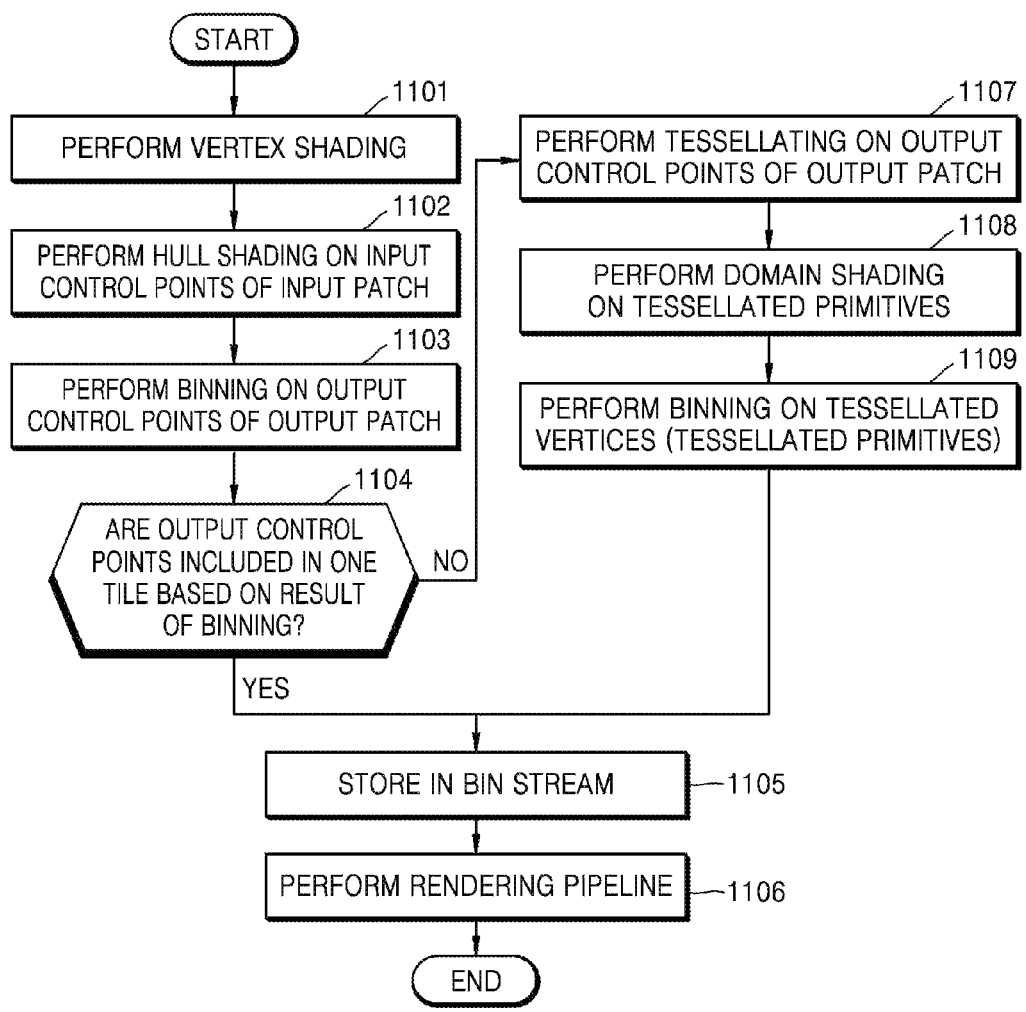
FIG. 11 is a flowchart showing an example of a method for a graphics pipeline performed in a GPU.

FIG. 11 is a flowchart of an example of a method for a graphics pipeline performed by the GPU 10. The graphics pipeline implementing the method shown in FIG. 11 is the graphics pipeline of FIG. 10 that includes the binning pipeline 101-1 and the rendering pipeline 102-1 operating according to mode $\hat{1}$. Thus, descriptions of FIG. 10 may apply to those of FIG. 11, even if omitted in the following description.

In operation 1101, the vertex shader 115 performs the vertex shading 1011 using the vertices 1001 stored in the memory 30.

In operation 1102, the hull shader 121 performs the hull shading 1012 to convert input control points to output control points to form an output patch. The hull shader 121 produces the output control points and, may determine a tessellation factor TF at the same time. The hull shader 121 transmits information about the output control points of the output patch to the binner 135.

In operation 1103, the binner 135 performs the binning 1014 or tiling using output primitives of the output patch.

In operation 1104, the binner 135 determines whether the output primitives output from the hull shader 121 are included in one tile based on a result of the performed binning 1014. The binning 1014 predicts a tile list indicating information about tiles to which the output primitives belong. Operation 1105 is performed directly when it is determined that the output primitives are included in one tile, and operations 1107, 1108, and 1109 are performed when it is determined that the output primitives are not included in one tile before performing operation 1105.

In operation 1105 of (pass $\hat{1}$), a visibility stream of the binned tile list is stored in the bin stream 1002 of the memory 30

In operation 1106, the rasterizer 140, the pixel shader 150, and the output merger 160 perform the rendering pipeline 102-1. Here, like the binning pipeline 101-1, the rendering pipeline 102-1 may include the stages performed by the input assembler 110, the vertex shader 115, the hull shader 121, the tessellator 123, the domain shader 125, and the geometry shader 130.

In operation 1107 (pass $\hat{2}$), the tessellator 123 performs the tessellating 1015 and calculates uvw coordinates and weights of the output control points in barycentric coordinates using the tessellation factor TF received from the hull shader 121.

In operation 1108, the domain shader 125 performs the domain shading 1016 to produce tessellated vertices (or tessellated primitives) using the information about the output control points, the tessellation factor TF received from the hull shader 121, the uvw coordinates (of which the w coordinate is optional), and the weights received from the tessellator 123.

In operation 1109, the binner 135 performs the binning 1018 or tiling using the tessellated primitives (the tessellated vertices). The binning 1018 predicts a tile list indicating information about tiles to which the tessellated primitives (tessellated vertices) belong by performing a depth test (or a tile Z test). After operation 1109, a visibility stream of the binned tile list is stored in the bin stream 1002 of the memory 30 in operation 1105, and in operation 1106, the rasterizer 140, the pixel shader 150, and the output merger 160 perform the rendering pipeline 102-1 (as described above).

Figure 12:
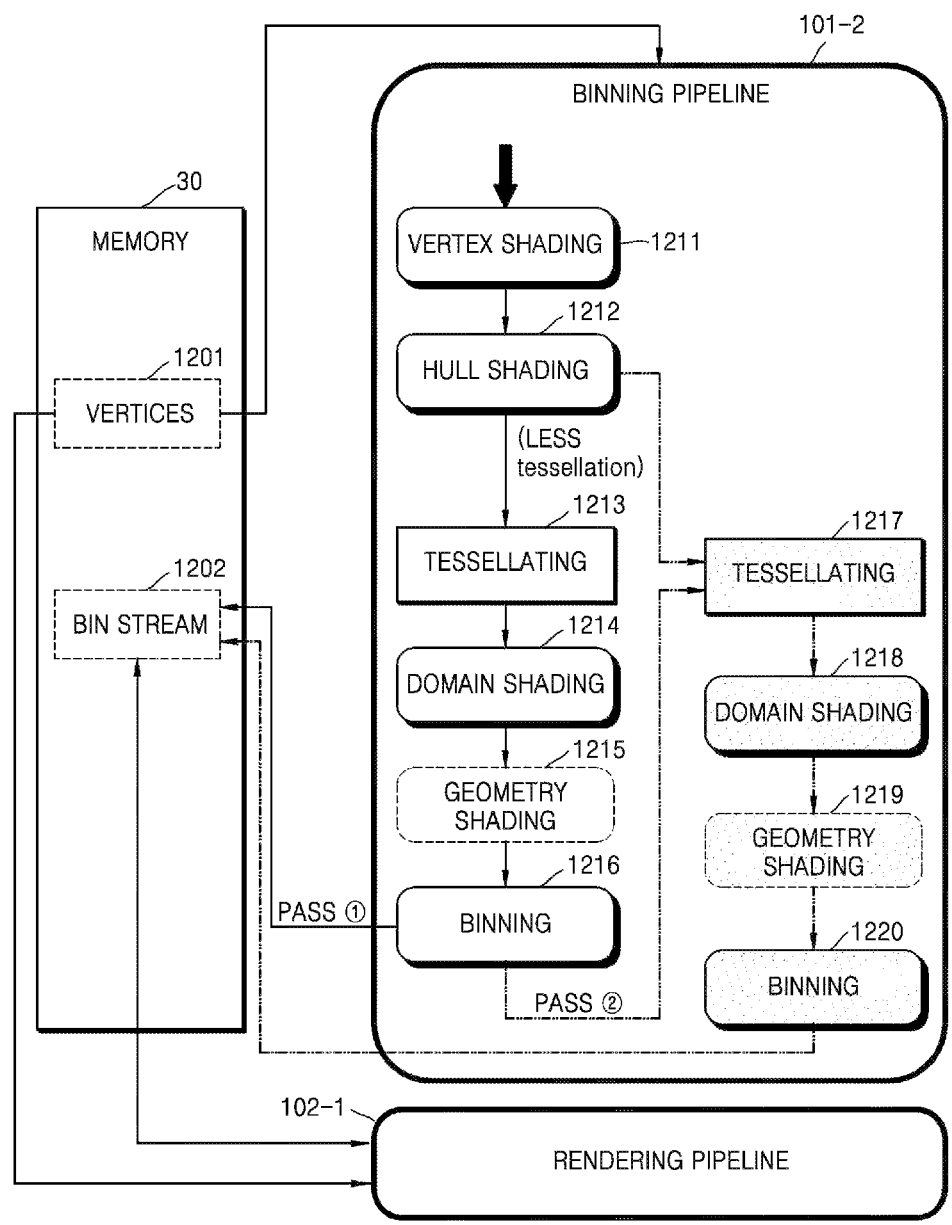
FIG. 12 is a diagram illustrating another example of a graphics pipeline performed in a GPU.

FIG. 12 is a diagram illustrating another example of a graphics pipeline performed in the GPU 10.

Referring to FIG. 12, the graphics pipeline, including the binning pipeline 101-2 and the rendering pipeline 102-1, operate according to a mode $\hat{2}$, which is described above with reference to FIG. 7. The graphics pipeline of FIG. 12 is described in relation to the hardware components of the GPU 10 shown in FIG. 6, wherein only the components and the pipeline stages related to the exemplary embodiment are described. Thus, one of ordinary skill in the art will appreciate that general-purpose components and pipeline stages other than those described in relation to FIG. 12 may be included.

The vertex shader 115 performs vertex shading 1211 using vertices 1201 stored in the memory 30. The vertex shader 115 converts the vertices 1201 and inputs the converted the vertices 1201 to the hull shader 121 as control points.

The hull shader 121 performs hull shading 1212 to convert the input control points, which express a surface of a low order, to output control points that form an output patch. The hull shader 121 may generate the output control points and determine a first tessellation factor at the same time.

The tessellator 123 receives the first tessellation factor from the hull shader 121, and sets a new, second tessellation factor that is lower than the first tessellation factor. Then the tessellator 123 performs tessellating 1213 to calculate uvw coordinates and weights of the output control points in barycentric coordinates using the second tessellation factor.

As described above, with reference to the tessellation pipeline 300 shown in FIG. 3, the tessellator 123 uses the tessellation factor TF determined by the hull shader 121. However, as described above with reference to FIG. 9, the tessellator 123 may obtain the same binning result even if the tessellator 123 uses the second tessellation factor that is lower than the first tessellation factor determined by the hull shader 121. In other words, the GPU 10 may obtain the same binning result even though throughput of the GPU 10 is decreased when a lower tessellation factor is used, since a lower number of primitives (triangles) is produced.

The domain shader 125 performs domain shading 1214 to produce tessellated vertices (or tessellated primitives) using information about the output control points, the second tessellation factor, the uvw coordinates (where the w coordinate is optional), and the weights received from the tessellator 123.

The geometry shader 130 is an optional component that may be used to perform geometry shading 1215 to produce additional vertices (primitives) from the tessellated vertices (or the tessellated primitives) received from the domain shader 125. Thus, the geometry shading 1215 may be skipped.

The binner 135 performs binning 1216 or tiling using the tessellated primitives (or the tessellated vertices) that are tessellated with the second tessellation factor. The binning 1216 includes a depth test (or a tile Z test) that predicts a tile list indicating information about tiles to which the tessellated primitives (the tessellated vertices) that are tessellated with the second tessellation factor belong.

Based on a result of the binning 1216, the binner 135 determines whether the tessellated primitives (the tessellated vertices) that are tessellated with the second tessellation factor are included in one tile.

When it is determined that the tessellated primitives (the tessellated vertices) are included in one tile, the binner 135 stores a visibility stream with information indicating that the tessellated primitives (the tessellated vertices) that are tessellated with the second tessellation factor are included in one tile in a bin stream 1202 according to pass $\hat{1}$), and the binning pipeline 101-2 using the second tessellation factor is completed. In other words, since the binning pipeline 101-2 is completed using the second tessellation factor that is lower than the first tessellation factor determined by the hull shader 121, the GPU 10 completes the binning pipeline 101-2 with a lower throughput than possible with the first tessellation factor.

When it is determined that the tessellated primitives (the tessellated vertices) are not included in one tile, the binner 135 performs tessellating 1217 according to pass $\hat{2}$.

According to pass $\hat{2}$, the tessellator 123 performs the tessellating 1217 to calculate the uvw coordinates and the weights of the output control points in barycentric coordinates using the first tessellator factor, determined by the hull shader 121, instead of the second tessellation factor.

The domain shader 125 performs domain shading 1218 to produce tessellated vertices (or tessellated primitives) using the uvw coordinates (of which the w coordinate is optional), the weights received from the tessellator 123, information about the output control points, and the first tessellation factor.

The geometry shader 130 is an optional component that may perform geometry shading 1219 to produce additional vertices (or primitives) from the tessellated vertices (or the tessellated primitives) that are received from the domain shader 125. Thus, the geometry shading 1219 may be skipped.

The binner 135 performs binning 1220 or tiling using the tessellated primitives (the tessellated vertices) that are tessellated with the first tessellation factor. The binning 1220 performs a depth test (or a tile Z test) to predict a tile list indicating information about tiles to which the tessellated primitives (or the tessellated vertices) that are tessellated with the first tessellation factor belong. Then, the binner 135 stores a visibility stream of the tessellated primitives (the tessellated vertices) in the bin stream 1202 to complete the binning pipeline 101-2 using the first tessellation factor.

Once the binning pipeline 101-2 is completed, the GPU 10 performs the rendering pipeline 102-1 per tile. The rendering pipeline 102-1 may include the stages performed by the input assembler 110, the vertex shader 115, the hull shader 121, the tessellator 123, the domain shader 125, the geometry shader 130, the rasterizer 140, the pixel shader 150, and the output merger 160 of the graphics pipeline 100, which have been described above with reference to FIG. 6.

The binning pipeline 101-2 shown in FIG. 12, operating according to mode $\hat{2}$ described above, may produce a lower number of tessellated vertices (or tessellated primitives) since the tessellator 123 performing the tessellating 1213 uses a low tessellator factor. Thus, the throughput of graphic data may be lower when compared to that of the tessellation pipeline 300 shown in FIG. 3.

Figure 13:
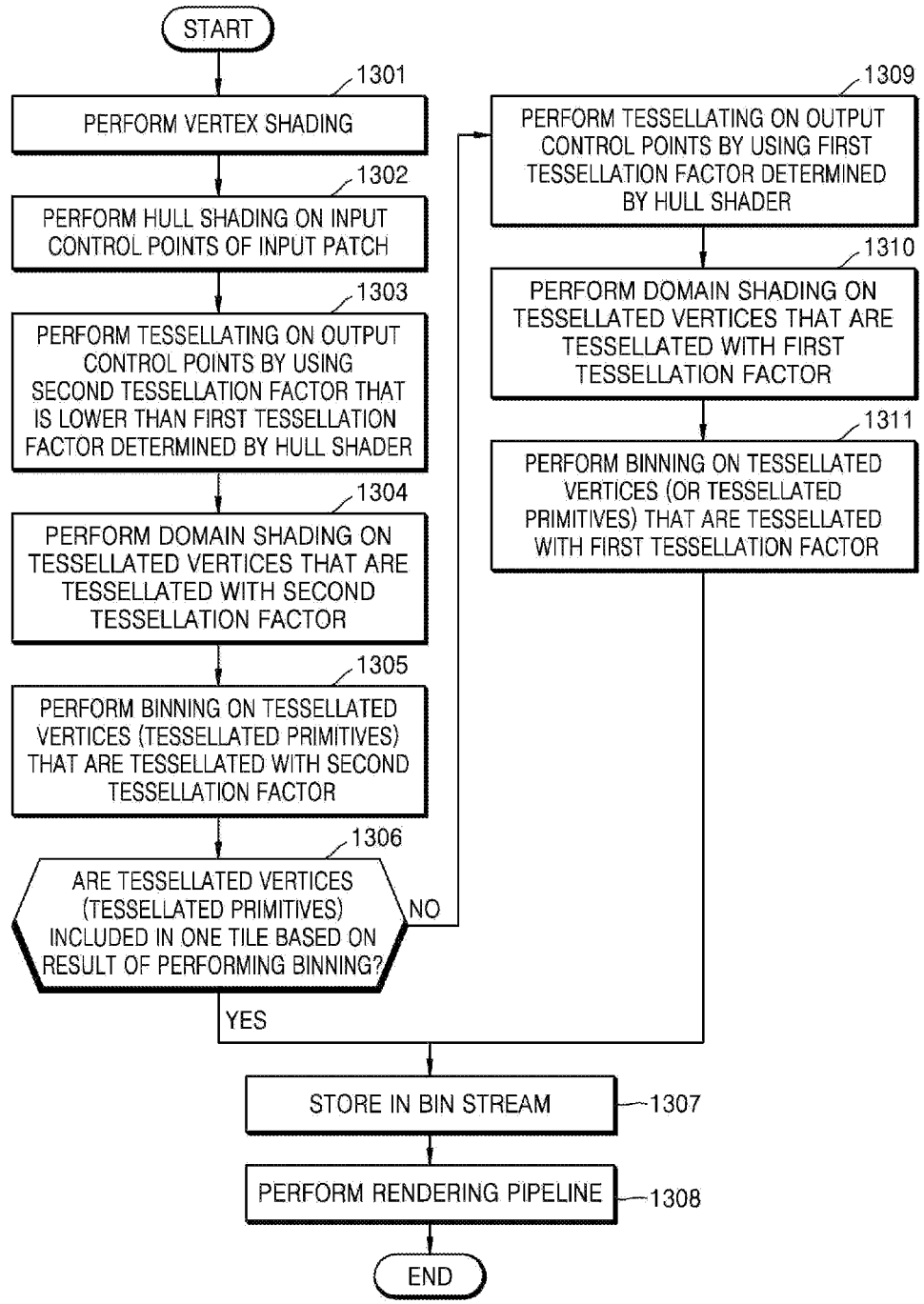
FIG. 13 is a flowchart of showing an example of method for a graphics pipeline performed in a GPU.

FIG. 13 is a flowchart of an example of another method for a graphics pipeline performed in the GPU 10. The method shown in FIG. 13 may be used to implement the graphics pipeline shown in FIG. 12 that includes the binning pipeline 101-2 and the rendering pipeline 102-1 operating according to mode $\hat{2}$. Thus, descriptions of FIG. 12 may apply to those of FIG. 13, even if omitted.

In operation 1301, the vertex shader 115 performs the vertex shading 1211 using the vertices 1201 stored in the memory 30.

In operation 1302, the hull shader 121 performs the hull shading 1212 to convert input control points to output control points to form an output patch. The hull shader 121 produces the output control points and determines a first tessellation factor at the same time.

In operation 1303, the tessellator 123 performs the tessellating 1213 on the output control patch using a second tessellation factor that is lower than the first tessellation factor determined by the hull shader 121.

In operation 1304, the domain shader 125 performs the domain shading 1214 to produce tessellated vertices (or tessellated primitives) using information about the output control points, the second tessellation factor, uvw coordinates (of which the w coordinate is optional), and weights received from the tessellator 123.

In operation 1305, the binner 135 performs the binning 1216 or tiling using the tessellated primitives (the tessellated vertices) that are tessellated with the second tessellation factor.

In operation 1306, the binner 135 determines whether the tessellated primitives (the tessellated vertices) that are tessellated with the second tessellation factor are included in one tile based on the result of the performed binning 1216. When the binner 135 determines that the tessellated primitives (the tessellated vertices) are included in one tile, operation 1307 is performed, and when the binner 135 determines that the tessellated primitives (the tessellated vertices) are not included in one tile, operation 1309 is performed.

In operation 1307, the binner 135 stores a visibility stream indicating information that the tessellated primitives (the tessellated vertices) that are tessellated with the second tessellation factor are included in one tile in the bin stream 1201.

In operation 1308, the rasterizer 140, the pixel shader 150, and the output merger 160 perform the rendering pipeline 102-1. Here, like the binning pipeline 101-2, the rendering pipeline 102-1 may include the stages performed by the input assembler 110, the vertex shader 115, the hull shader 121, the tessellator 123, the domain shader 125, and the geometry shader 130.

In operation 1309, the tessellator 123 performs the tessellating 1217 on the output control points using the first tessellation factor determined by the hull shader 121 instead of the second tessellation factor.

In operation 1310, the domain shader 125 performs the domain shading 1218 to produce tessellated vertices (or tessellated primitives) using information about the output control point, the first tessellation factor, the uvw coordinates (of which the w coordinate is optional), and the weights received from the tessellator 123.

In operation 1311, the binner 135 performs the binning 1220 or tiling using the tessellated primitives (or the tessellated vertices) that are tessellated with the first tessellation factor. After operation 1311, the binner 135 stores a visibility stream of the tessellated primitives (the tessellated vertices) in the bin stream 1201 in operation 1307.

Figure 14:
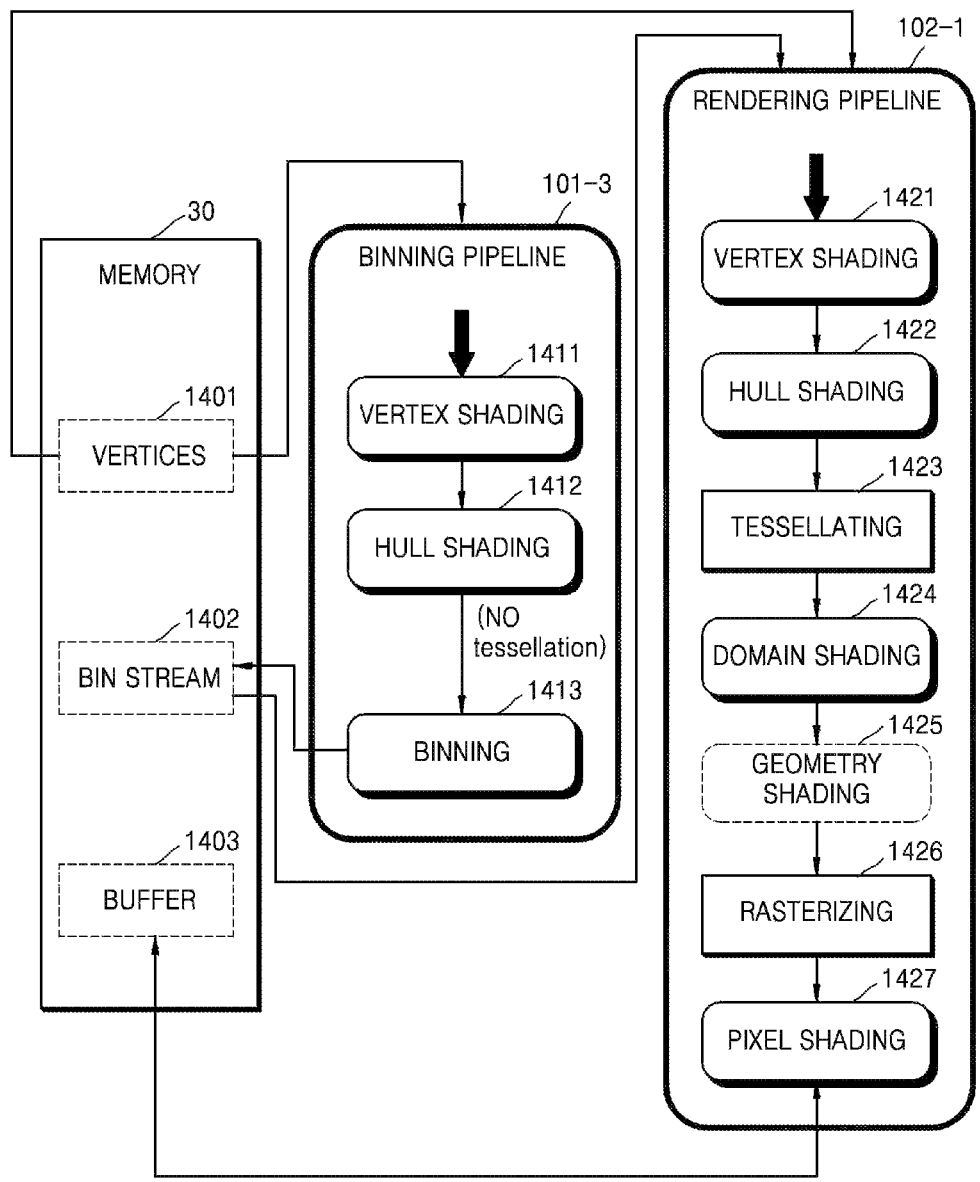
FIG. 14 is a diagram illustrating another example of a graphics pipeline performed in a GPU.

FIG. 14 is a diagram illustrating another example of a graphics pipeline performed in the GPU 10.

Referring to FIG. 14, the graphics pipeline, including the binning pipeline 101-3 and the rendering pipeline 102-1, operate according to the mode $\hat{3}$, which is described above with reference to FIG. 7. The graphics pipeline of FIG. 14 is described in relation to the hardware components of the GPU 10 shown in FIG. 6, wherein only components and pipeline stages related to this exemplary embodiment are described. Thus, one of ordinary skill in the art will appreciate that general-purpose components and pipeline stages other than those described in association with FIG. 14 also may be included.

The vertex shader 115 performs vertex shading 1411 using vertices 1401 stored in the memory 30. The vertex shader 115 converts the vertices 1401, and inputs the converted vertices to the hull shader 121 as input control points expressing a surface of a low order.

The hull shader 121 performs hull shading 1412 that converts the input control points to output control points that form an output patch. The hull shader 121 transmits information about the output control points to the binner 135.

As described above with reference to FIG. 3, the tessellation pipeline 300 includes all stages of the hull shader 121, the tessellator 123, and the domain shader 125, but according to pipeline described in association with FIG. 14, the stages of the tessellator 123 and the domain shader 125 may be skipped because, as described above with reference to FIG. 9, the binning result of the output patch 410 and the binning result of the tessellated primitives 425 may be the same. However, even if the binning results are not the same, final pixel rendering results may be the same since stages, such as curling, clipping, and hidden surface removal (HSR) are performed in the rendering pipeline 102-1.

The binner 135 performs binning 1413 or tiling using output primitives of the output patch output from the hull shader 121. In other words, the binner 135 performs a depth test (or a tile Z test) to predict a tile list indicating information about tiles to which the output primitives belong. Here, the binned tile list may be stored in a bin stream 1402 of the memory 30 as a visibility stream.

Unlike the examples described above with reference to FIGS. 10, 11, 12, and 13, the binner 135 does not determine whether the output primitives of the output patch output from the hull shader 121 are included in one tile. In other words, in this example, the output primitives may be included in one or more tiles.

When the binning pipeline 101-3 is completed, the GPU 10 performs the rendering pipeline 102-1 per tile. The rendering pipeline 102-1 may include stages of vertex shading 1421 performed by the vertex shader 115, hull shading 1422 performed by the hull shader 121, tessellating 1423 performed by the tessellator 123, domain shading 1424 performed by the domain shader 125, geometry shading 1425 optionally performed by the geometry shader 130, rasterizing 1426 performed by the rasterizer 140, and pixel shading 1427 performed by the pixel shader 150. A result of performing the pixel shading 1427 by the pixel shader 150 may be stored in a buffer 1403.

Since the graphics pipeline shown in FIG. 14 operates according to the mode $\hat{3}$ described above, the tessellating performed by the tessellator 123 in the binning pipeline 101-3 may be skipped and the tessellated vertices (or tessellated primitives) not be produced. Accordingly, the throughput of graphic data using the graphics pipeline shown in FIG. 14 may be reduced as compared to the tessellation pipeline 300 shown in FIG. 3, which has to perform tessellating using the tessellator 123.

Figure 15:
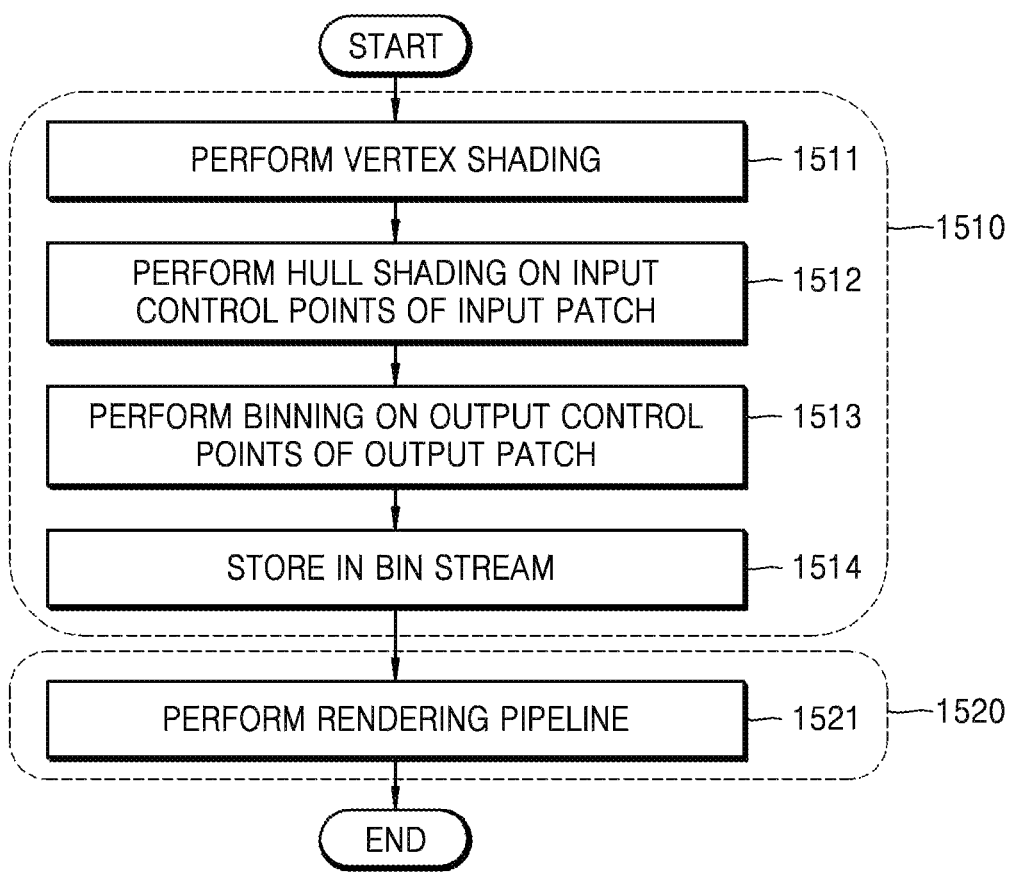
FIG. 15 is a flowchart showing an example of a method for a graphics pipeline performed in a GPU.

FIG. 15 is a flowchart showing another example of a method of implementing a graphics pipeline performed in the GPU 10. In this example, the method shown in FIG. 15 may be used to implement the graphics pipeline shown in FIG. 14, which includes the binning pipeline 101-3 and the rendering pipeline 102-1 operating according to mode $\hat{3}$. Thus, the descriptions of FIG. 14 may apply to FIG. 15, even if omitted.

A pipeline 1510 including operations 1511 through 1514 corresponds to the binning pipeline 101-3 and a pipeline 1520 including operation 1521 corresponds to the rendering pipeline 102-1.

In operation 1511, the vertex shader 115 performs the vertex shading 1411 using the vertices 1401 stored in the memory 30.

In operation 1512, the hull shader 121 performs the hull shading 1412 that converts input control points to output control points to form an output patch.

In operation 1513, the binner 135 performs the binning 1413 or tiling on the output control points of the output patch.

In operation 1514, the binner 135 stores a tile list indicating information about tiles to which output primitives of the output patch belong. The tile list is stored in the bin stream 1402 of the memory 30 as a visibility stream, based on a result of the binning 1413. Unlike the examples described above with reference to FIGS. 10 through 13, the binner 135 does not determine whether the output primitives of the output patch output from the hull shader 121 are included in one tile. In other words, the output primitives may be included in one or more tiles.

In operation 1521, the GPU 10 performs the rendering pipeline 102-1 per tile. The rendering pipeline 102-1 may include stages of vertex shading 1421 performed by the vertex shader 115, hull shading 1422 performed by the hull shader 121, tessellating 1423 performed by the tessellator 123, domain shading 1424 performed by the domain shader 125, geometry shading 1425 optionally performed by the geometry shader 130, rasterizing 1426 performed by the rasterizer 140, and pixel shading 1427 performed by the pixel shader 150.

Figure 16:
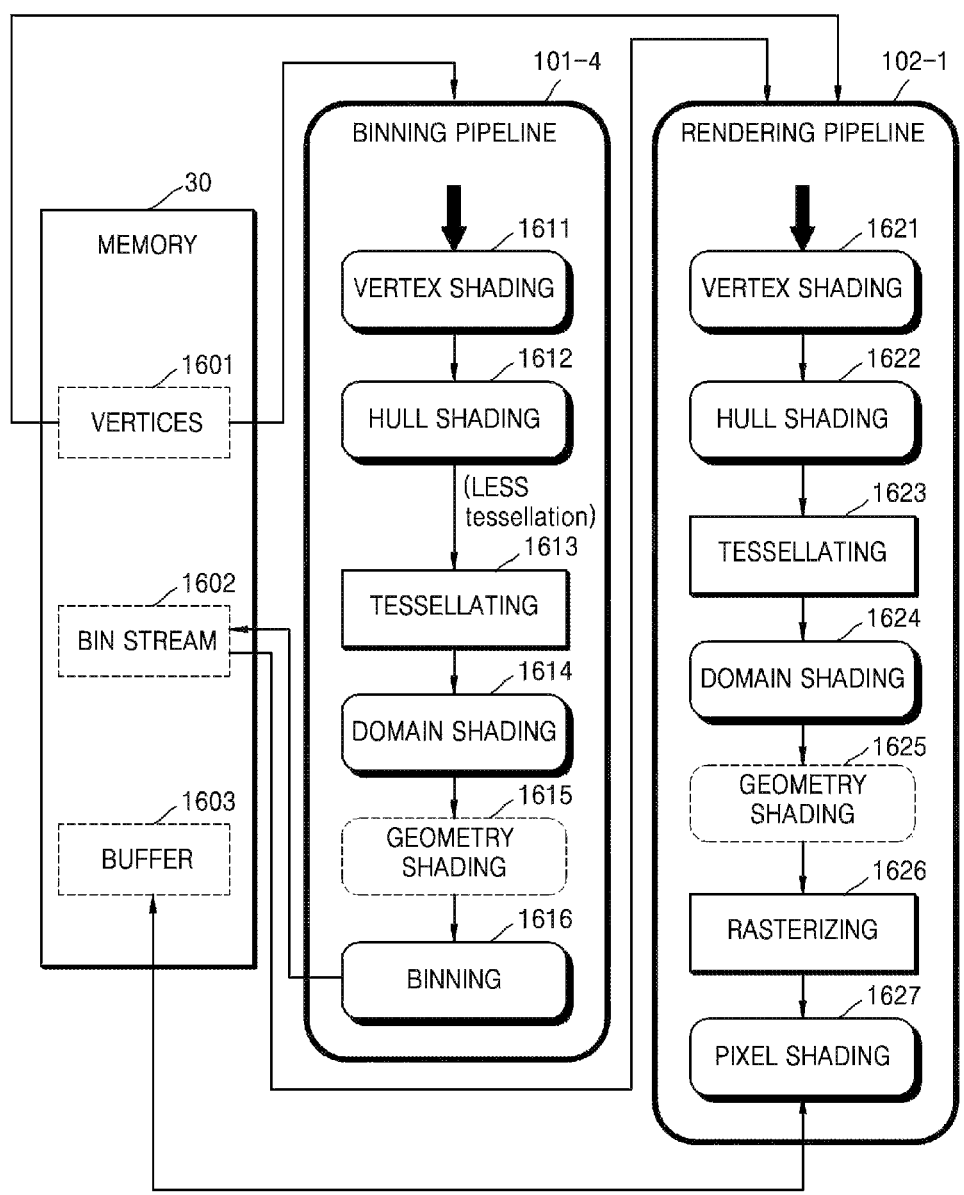
FIG. 16 is a diagram illustrating another example of a graphics pipeline performed in a GPU.

FIG. 16 is a diagram illustrating an example of a graphics pipeline performed in the GPU 10.

Referring to FIG. 16, the graphics pipeline, including the binning pipeline 101-4 and the rendering pipeline 102-1, operates in the mode $\hat{4}$, described above with reference to FIG. 7. The graphics pipeline of FIG. 16 is described in relation to hardware components of the GPU 10 shown in FIG. 6, wherein only components and pipeline stages related to this example are described. Thus, one of ordinary skill in the art will appreciate that general-purpose components and pipeline stages other than those described in association with FIG. 16 may be included.

The vertex shader 115 performs vertex shading 1611 using vertices 1601 stored in the memory 30. The vertex shader 115 converts the vertices 1601 and transmits the converted vertices 1601 to the hull shader 121 as input control points expressing a surface of a low order.

The hull shader 121 performs hull shading 1612 that converts the input control points to output control points forming an output patch. The hull shader 121 produces the output control points and determines a first tessellation factor at the same time.

The tessellator 123 receives the first tessellation factor from the hull shader 121, and sets a new, second tessellation factor that is lower than the first tessellation factor. Also, the tessellator 123 performs tessellating 1613 that calculates uvw coordinates and weights of the output control points in barycentric coordinates using the newly set second tessellation factor.

In the tessellation pipeline 300 shown and described above with reference to FIG. 3, the tessellator 123 uses the tessellation factor TF determined by the hull shader 12. Yet, as described above with reference to FIG. 9, the binning results may be the same even if the tessellator 123 uses the second tessellation factor that is lower than the first tessellation factor determined by the hull shader 121. However, even if the binning results are not the same, final pixel rendering results may still be the same since stages, such as curling, clipping, and HSR, are performed in the rendering pipeline 102-1.

The domain shader 125 performs domain shading 1614 to produce tessellated vertices (or tessellated primitives) using information about the output control points of the output patch, the second tessellation factor, the uvw coordinates (of which the w coordinate is optional), and the weights received from the tessellator 123.

The geometry shader 130 is an optional component that may be used to perform geometry shading 1615 to produce additional vertices (or primitives) from the tessellated vertices (or the tessellated primitives) received from the domain shader 125. Accordingly, the geometry shading 1615 may be skipped.

The binner 135 performs binning 1616 or tiling using the tessellated primitives (or the tessellated vertices) that are tessellated with the second tessellation factor. In other words, the binner 135 performs a depth test (or a tile Z test) to predict a tile list indicating information about tiles to which the tessellated primitives (the tessellated vertices) that are tessellated with the second tessellation factor belong. Here, the binned tile list may be stored in a bin stream 1602 of the memory 30 as a visibility stream.

Unlike the examples described above with reference to FIGS. 10 through 13, the binner 135 does not determine based on a result of performing the binning 1616 whether the tessellated primitives (the tessellated vertices) that are tessellated with the second tessellation factor are included in one tile. In other words, the tessellated primitives (the tessellated vertices) that are tessellated with the second tessellation factor may be included in one or more tiles.

When the binning pipeline 101-4 is completed, the GPU 10 performs the rendering pipeline 102-1 per tile. The rendering pipeline 102-1 may include stages of vertex shading 1621 performed by the vertex shader 115, hull shading 1622 performed by the hull shader 121, tessellating 1623 performed by the tessellator 123, domain shading 1624 performed by the domain shader 125, geometry shading 1625 optionally performed by the geometry shader 130, rasterizing 1626 performed by the rasterizer 140, and pixel shading 1627 performed by the pixel shader 150. A result of performing the pixel shading 1627 by the pixel shader 150 may be stored in a buffer 1603.

Since the binning pipeline 101-4 shown in FIG. 16 operates according to the mode $\hat{4}$ described above, tessellating 1613 may be performed by the tessellator 123 using a lower tessellation factor to produce a fewer number of tessellated vertices (or tessellated primitives). Accordingly, as compared to the tessellation pipeline 300 shown in FIG. 3, throughput of graphic data shown in FIG. 16 may be reduced.

Figure 17:
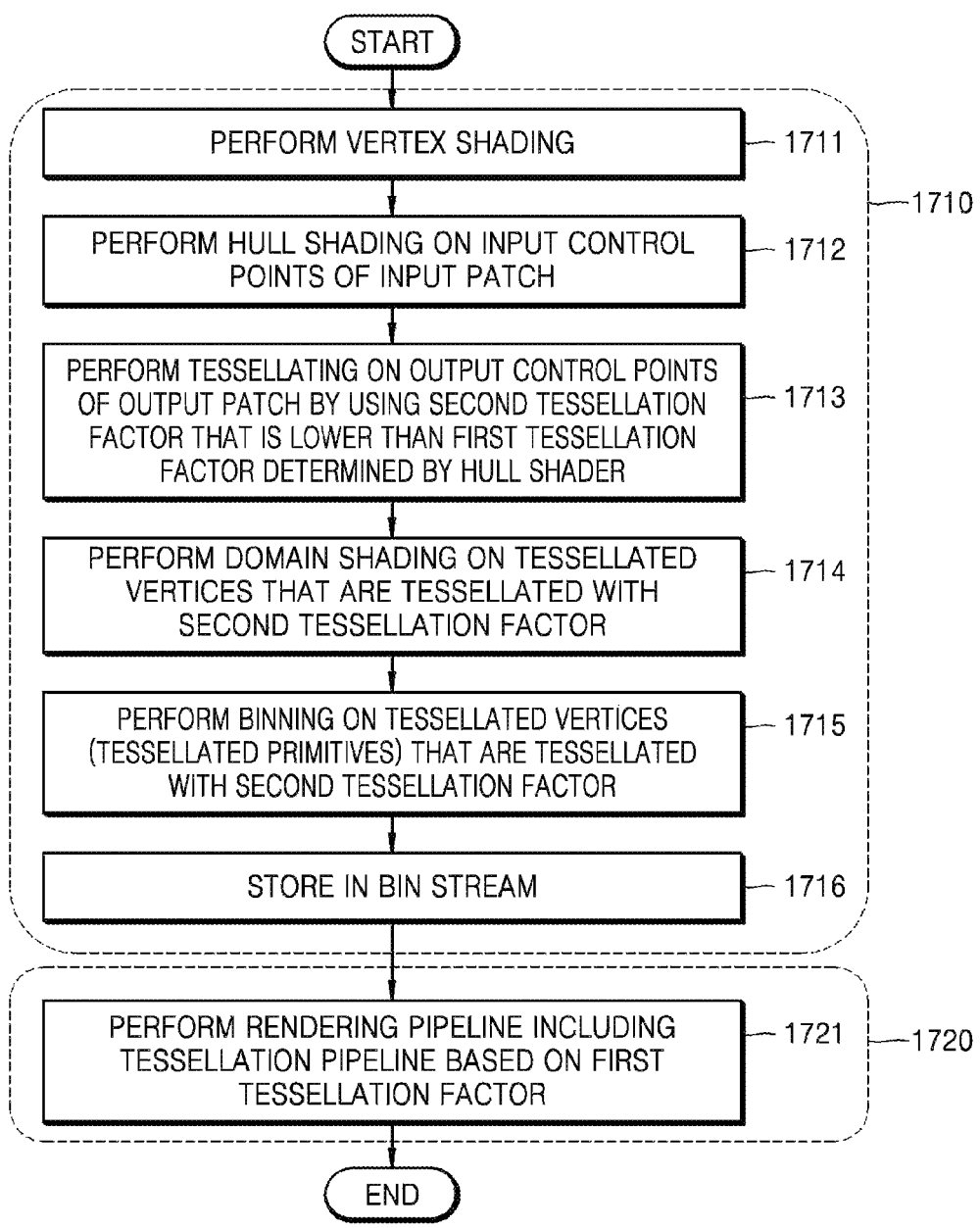
FIG. 17 is a flowchart showing an example of a method for a graphics pipeline performed in a GPU.

FIG. 17 is a flowchart of another example of a method of implementing a graphics pipeline performed in the GPU 10. The method shown in shown in FIG. 17 may be used to implement the graphics pipeline shown in FIG. 16, which includes the binning pipeline 101-4 and the rendering pipeline 102-1 operating according to the mode $\hat{4}$. Thus, descriptions shown in FIG. 16 may apply to those shown in FIG. 17, even if omitted.

A pipeline 1710 including operations 1711 through 1716 corresponds to the binning pipeline 101-4, and a pipeline 1720 including operation 1712 corresponds to the rendering pipeline 102-1.

In operation 1711, the vertex shader 115 performs the vertex shading 1611 using the vertices 1601 stored in the memory 30.

In operation 1712, the hull shader 121 performs the hull shading 1612 to convert input control points to output control points and form an output patch.

In operation 1713, the tessellator 123 performs the tessellating 1613 on the output control points using a second tessellation factor that is lower than a first tessellation factor determined by the hull shader 121.

In operation 1714, the domain shader 125 performs the domain shading 1614 to produce tessellated vertices (or tessellated primitives) using information about the output control points, the second tessellation factor, uvw coordinates (of which the w coordinate is optional), and weights received from the tessellator 123.

In operation 1715, the binner 135 performs the binning 1616 or tiling using the tessellated primitives (the tessellated vertices) that are tessellated with the second tessellation factor.

In operation 1716, the binner 135 stores a tile list including information indicating the tiles to which output primitives of the output patch belong. The tile list is stored in the bin stream 1602 of the memory 30 as a visibility stream, based on a result of performing the binning 1616. Unlike the examples described above with reference to FIGS. 10 through 13, the binner 135 does not determine whether the output primitives of the output patch output from the hull shader 121 are included in one tile. In other words, the output primitives may be included in one or more tiles.

In operation 1721, the GPU 10 performs the rendering pipeline 102-1 per tile. The rendering pipeline 102-1 may include stages of the vertex shading 1621 performed by the vertex shader 115, the hull shading 1622 performed by the hull shader 121, the tessellating 1623 performed by the tessellator 123, the domain shading 1624 performed by the domain shader 125, the geometry shading 1625 optionally performed by the geometry shader 130, the rasterizing 1626 performed by the rasterizer 140, and the pixel shading 1627 performed by the pixel shader 150. Here, the tessellating 1623 and the domain shading 1624 may be performed using the first tessellation factor.

Figure 18:
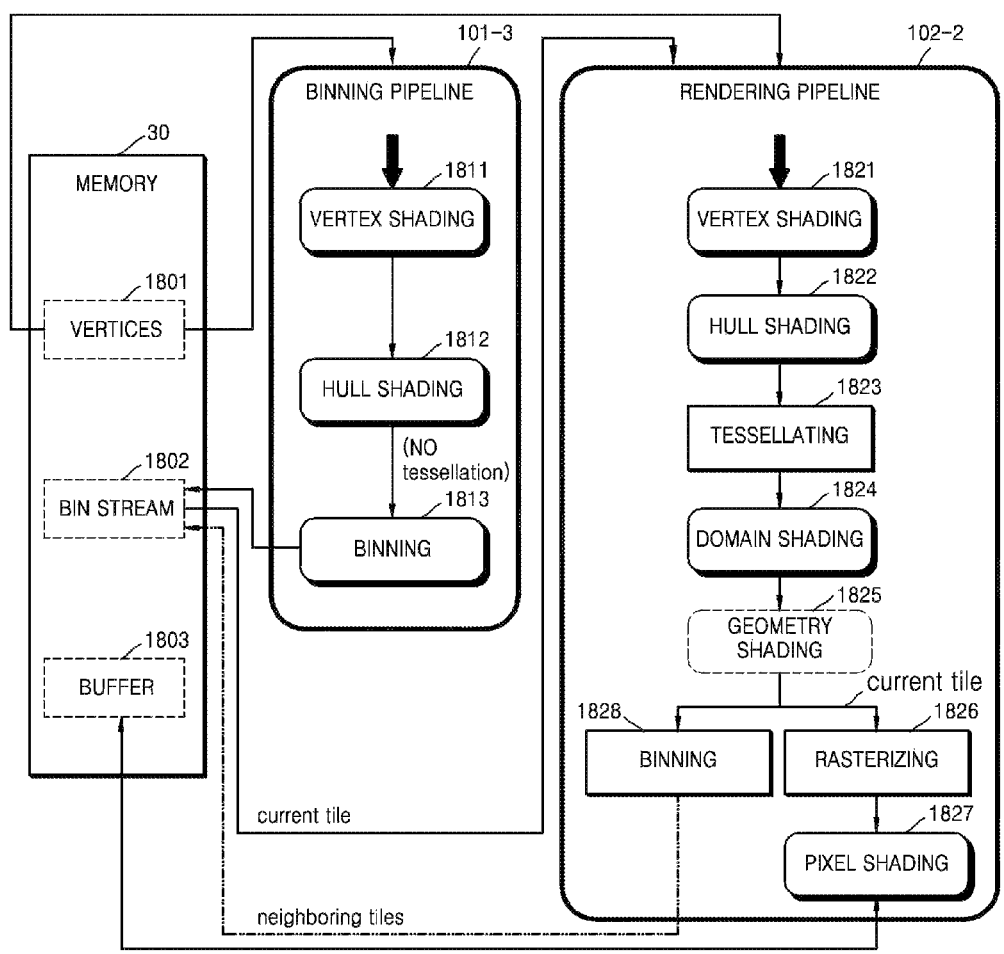
FIG. 18 is a diagram illustrating another example of a graphics pipeline performed in a GPU.

FIG. 18 is a diagram illustrating an example of a graphics pipeline performed in the GPU 10.

Referring to FIG. 18, the graphic pipeline, including the binning pipeline 101-3 and the rendering pipeline 102-2, operates in a mode $\hat{5}$, described above with reference to FIG. 7. The graphics pipeline shown in FIG. 18 is described in relation to hardware components of the GPU 10 shown in FIG. 6, wherein only the components and the pipeline stages related to this example are described in detail. Thus, one of ordinary skill in the art will appreciate that general-purpose components and pipeline stages other than those described in association with FIG. 18 may be included.

Figure 19:
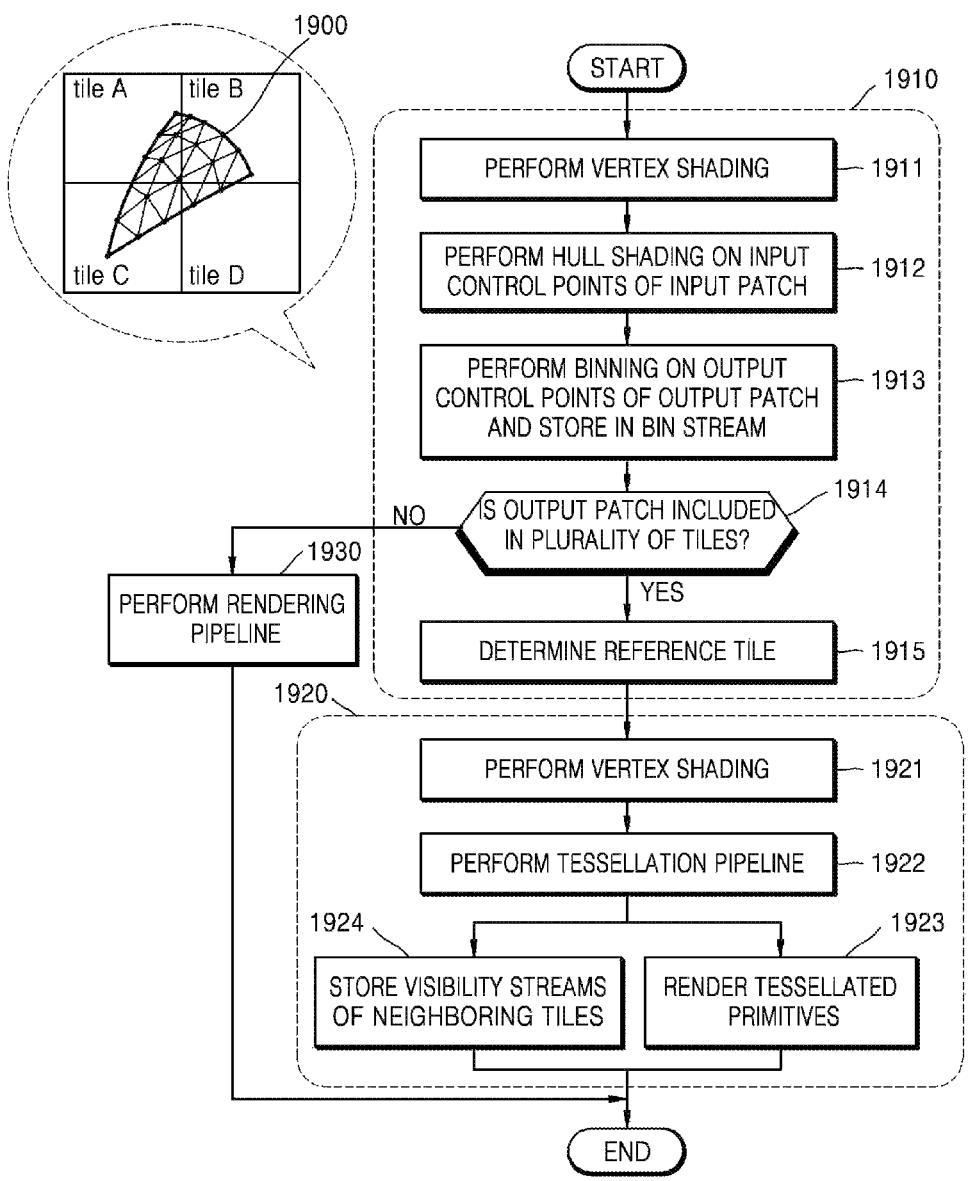
FIG. 19 is a flowchart showing an example of a method for a graphics pipeline performed in a GPU.

For convenience of description, it is assumed that the graphics pipeline shown in FIG. 18 is performed on an example 1900 of an output patch crossing a plurality of tiles A through D shown in FIG. 19.

The vertex shader 115 performs vertex shading 1811 using vertices 1801 stored in the memory 30. The vertex shader 115 converts the vertices 1801 and transmits the convert vertices 1801 to the hull shader 121 as input control points expressing a surface of a low order.

The hull shader 121 performs hull shading 1812 to convert the input control points to output control points to form the output patch 1900. The hull shader 121 transmits information about the output control points to the binner 135.

As described above with reference to FIG. 3, the tessellation pipeline 300 shown in FIG. 3 includes all stages of the hull shader 121, the tessellator 123, and the domain shader 125. Yet, according to FIG. 18, the stages of the tessellator 123 and the domain shader 125 may be skipped because, as described above with reference to FIG. 9, the binning result of the output patch 410 may be the same as the binning result of the tessellated primitives 425. However, even if the binning results are not the same, the final pixel rendering results may be the same since stages, such as curling, clipping, and HSR, are performed in the rendering pipeline 102-2.

The binner 135 performs binning 1813 or tiling using output primitives of the output patch 1900 output from the hull shader 121. In other words, the binner 135 performs a depth test (or a tile Z test) to predict a tile list indicating information about tiles to which the output primitives belong. Here, the binned tile list may be stored in a bin stream 1802 of the memory 30 as a visibility stream.

The binner 135 determines whether the output primitives of the output patch 1900 output from the hull shader 121 are included in a plurality of tiles, i.e., tiles A through D shown in FIG. 19, based on a result of performing the binning 1813. In other words, the binner 135 determines whether the output primitives of the output patch 1900 cross two or more tiles.

When it is determined that the output patch 1900 is tile-crossed (or when it is determined that the output patch 1900 is included in the plurality of tiles A through D), the binner 135 schedules an order in which tiles A through D are to be rendered. In this example, as a result of the scheduling, the binner 135 determines that tile A is a reference tile, since tile A is scheduled first in the rendering order from among tiles A through D. Here, it is assumed that the reference tile is disposed at an upper left location of the plurality of tiles, i.e., the location of tile A, but the location of the reference tile is not limited thereto. For example, the reference tile may be located as a lower left tile, an upper right tile, a lower right tile, or a center tile.

The binner 135 schedules a time of performing the rendering pipeline 102-2 on the reference tile, i.e., tile A, before any of the neighboring tiles, i.e., tiles B through D. The rendering pipeline 102-2 may be performed on tiles A through D sequentially by one processor unit (or one processor core) in the GPU 10, or in parallel by a plurality of processor units (or a plurality of processor cores) in the GPU 10. The determining of the reference tile and the scheduling of the performance timing may be executed by the controller 170, or another component in the GPU 10, instead of the binner 135. In other words, a component that determines the reference tile and schedules the performance timing is not limited to the binner 135.

When it is determined that the output patch 1900 is tile-crossed, the binner 135 stores the determined reference tile and the scheduled performance timing in the memory 30.

On the other hand, when it is determined that the output patch 1900 is not tile-crossed (or when it is determined that the output patch 1900 is included only in one tile), the binner 135 does not determine a reference tile and schedule a performance timing.

After the binning pipeline 101-3 is completed, the GPU 10 performs the rendering pipeline 102-2 per tile. Here, since it is determined that tile A is the reference tile in the binning pipeline 101-3, the GPU 10 performs the rendering pipeline 102-2 on tile A first.

The rendering pipeline 102-2 performed on tile A may include stages of vertex shading 1821 performed by the vertex shader 115, hull shading 1822 performed by the hull shader 121, tessellating 1823 performed by the tessellator 123, domain shading 1824 performed by the domain shader 125, geometry shading 1825 optionally performed by the geometry shader 130, rasterizing 1826 performed by the rasterizer 140, and pixel shading 1827 performed by the pixel shader 150. The result of performing the pixel shading 1827 by the pixel shader 150 may be stored in a buffer 1803.

Meanwhile, the rendering pipeline 102-2 performed on tile A additionally performs binning 1828 using the binner 135. In detail, the binner 135 performs the binning 1828 to generate visibility streams indicating whether the output patch 1900 is visible in each of the neighboring tiles adjacent to tile A, i.e., tiles B through D. Here, the visibility stream may include any type of visibility stream described herein. Accordingly, the GPU 10 may process only visible vertices, visible primitives, or visible patches when the rendering pipeline 102-2 is independently performed on tiles B through D using the visibility streams of tiles B through D. The visibility streams of tiles B through D are generated when the rendering pipeline 102-2 is performed on tile A. As a result, data throughput in the rendering pipeline 102-2 performed on tiles B through D may be reduced.

Since the graphics pipeline shown in FIG. 18, operating according to mode $\hat{5}$ described above, may skip tessellating performed by the tessellator 123 in the binning pipeline 101-3, tessellated vertices (or tessellated primitives) may not be produced. Accordingly, throughput of graphic data may be lowered in the graphics pipeline shown in FIG. 18 as compared to the tessellation pipeline 300 shown in FIG. 3 because the tessellator 123 of pipeline 300 has to perform the tessellating 1015.

FIG. 19 is a flowchart of another example of a method for implementing a graphics pipeline performed in the GPU 10. The method shown in FIG. 19 may be used to implement the graphics pipeline shown in FIG. 18, which includes the binning pipeline 101-3 and the rendering pipeline 102-2 operating according to mode $\hat{5}$. Thus, descriptions associated with FIG. 18 may apply to FIG. 19, even if omitted.

A pipeline 1910 including operations 1911 through 1915 corresponds to the binning pipeline 101-3, and a pipeline 1920 including operations 1921 through 1924 corresponds to the rendering pipeline 102-2 performed on a reference tile, i.e., tile A.

In operation 1911, the vertex shader 115 performs the vertex shading 1811 using the vertices 1801 stored in the memory 30.

In operation 1912, the hull shader performs the hull shading 1812 to convert input control points to output control points that form the output patch 1900.

In operation 1913, the binner 135 performs the binning 1813 or tiling on the output control points of the output patch 1900. Then, the binner 135 creates a tile list including information indicating tiles to which output primitives of the output patch 1900 belong based on a result of performing the binning 1813. The binner 135 stores the tile list in the bin stream 1802 of the memory 30.

In operation 1914, the binner 135 determines whether the output primitives of the output patch 1900 output from the hull shader 121 are included in the plurality of tiles, for example, tiles A through D. In other words, the binner 135 determines whether there is tile-crossing of the output primitives of the output patch 1900. If the binner 135 determines that the output patch 1900 is tile-crossed, operation 1915 is performed, and if the binner 135 determines that the output patch 1900 is not tile-crossed, operation 1930 is performed.

In operation 1915, the binner 135 schedules a rendering order of tiles A through D. Based on a result of the scheduling, the binner 135 may determine that tile A is a reference tile, since tile A is scheduled as the first tile in rendering order from among tiles A through D.

In operation 1921, the vertex shader 115 performs the vertex shading 1821 on tile A using the vertices 1801 stored in the vertex shader 115.

In operation 1922, the GPU 10 performs a tessellation pipeline on tile A including the hull shading 1822 performed by the hull shader 121, the tessellating 1823 performed by the tessellator 123, and the domain shading 1824 performed by the domain shader 125.

In operation 1923, the GPU 10 renders tessellated primitives of tile A that are produced in the tessellation pipeline. In other words, the GPU 10 performs the rasterizing 1826 and the pixel shading 1827 on tile A.

In operation 1924, the binner 135 performs the binning 1828 to generate visibility streams indicating whether the output patch 1900 is visible in each of neighboring tiles, i.e., tiles B through D, and the binner 135 stores the visibility stream of tiles B through D. Although not shown in FIG. 19, the GPU 10 performs the rendering pipeline 102-2 on tiles B through D using the stored visibility streams. Here, when the rendering pipeline 102-2 is performed on tiles B through D, only visible vertices, visible primitives, or visible patches are processed according to the visibility streams of tiles B through D.

If it is determined that the output patch 1900 is not tile-crossed (if it is determined that the output patch 1900 is included in only one tile), the GPU 10 performs the rendering pipeline 102-2 on the tile including the output patch 1900.

Figure 20:
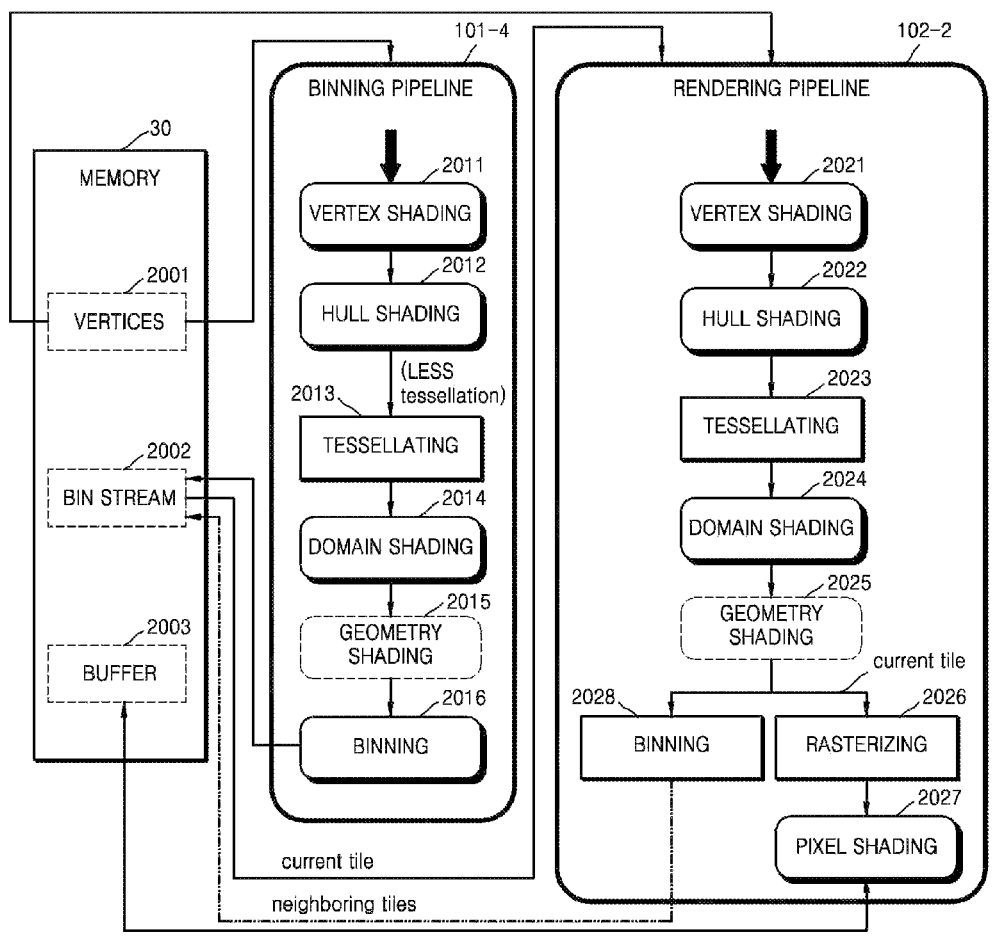
FIG. 20 is a diagram illustrating another example of a graphics pipeline performed in a GPU.

FIG. 20 is a diagram illustrating an example of a graphics pipeline performed in the GPU 10.

Referring to FIG. 20, the graphic pipeline including the binning pipeline 101-4 and the rendering pipeline 102-2 operates in mode 6, as described above with reference to FIG. 7. The graphics pipeline shown in FIG. 20 is described in relation to the hardware components of the GPU 10 shown in FIG. 6, wherein only the components and the pipeline stages related to this example are described. Thus, one of ordinary skill in the art will appreciate that general-purpose components and pipeline stages other than those described in FIG. 20 may be included.

Figure 21:
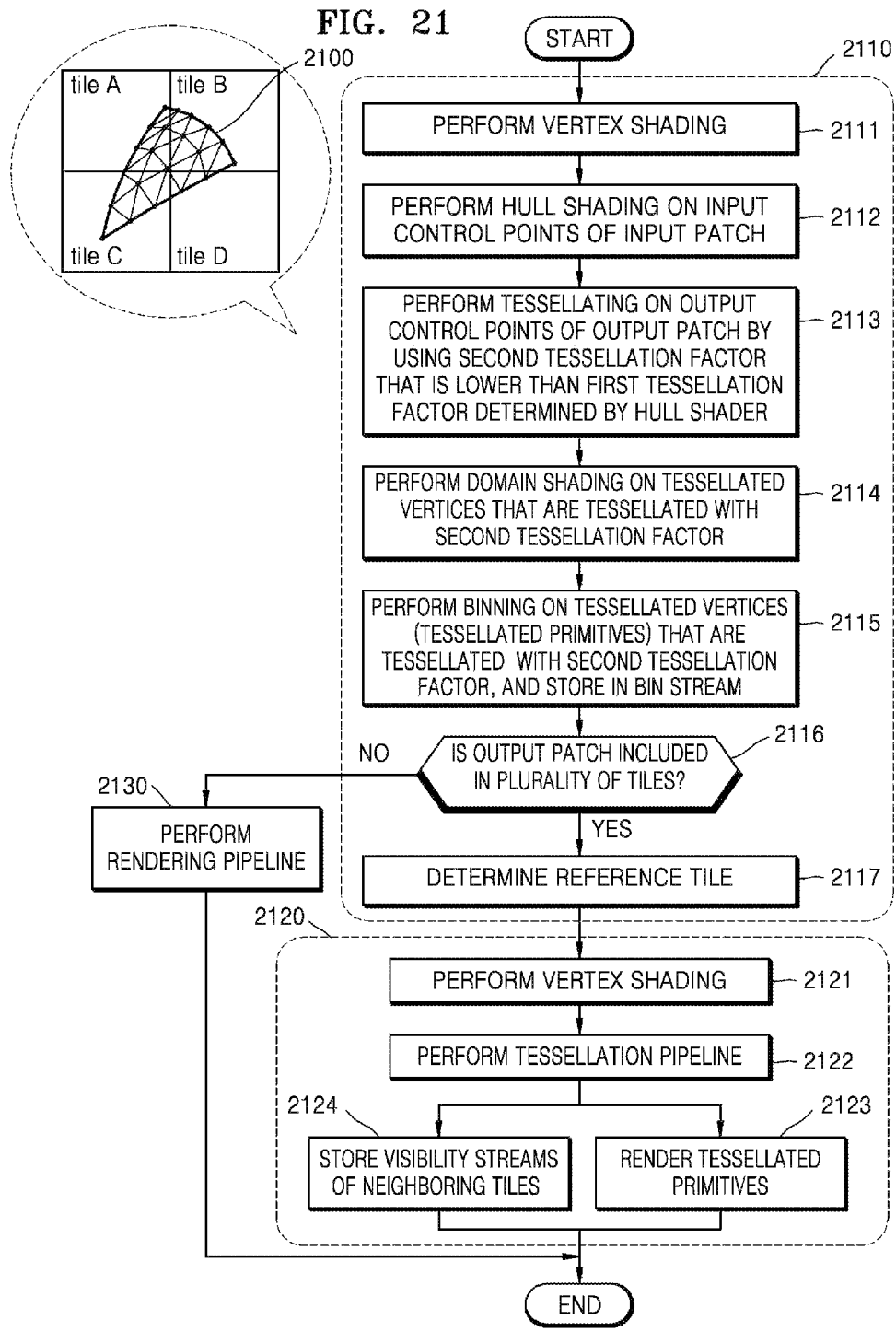
FIG. 21 is a flowchart showing an example of a method for a graphics pipeline performed in a GPU.

For convenience of description, it is assumed that the graphics pipeline shown in FIG. 20 is performed on an output patch 2100 crossing a plurality of tiles A through D, as shown in FIG. 21.

The vertex shader 115 performs vertex shading 2011 using vertices 2001 stored in the memory 30. The vertex shader 115 converts the vertices 2001 and transmits the converted vertices 2001 to the hull shader 212 as input control points expressing a surface of a low order.

The hull shader 121 performs hull shading 2012 to convert the input control points to output control points that form the output patch 2100. The hull shader 212 generates the output control points forming the output patch 2100 and determines a first tessellation factor at the same time.

The tessellator 123 receives the first tessellation factor from the hull shader 212, and sets a new, second tessellation factor that is lower than the first tessellation factor. Then, the tessellator 123 performs tessellating 2013 that calculates uvw coordinates and weights of the output control points in barycentric coordinates using the newly set second tessellation factor.

The domain shader 125 performs domain shading 2014 to produce tessellated vertices (or tessellated primitives) using information about the output control points of the output patch 2100, the second tessellation factor, the uvw coordinates (of which the w coordinate is optional), and the weights received from the tessellator 123.

The geometry shader 130 is an optional component that may be used to perform geometry shading 2015 to produce additional vertices (or primitives) from the tessellated vertices (or the tessellated primitives) received from the domain shader 125. Accordingly, the geometry shading 2015 may be skipped.

The binner 135 performs binning 2016 or tiling using the tessellated primitives (or tessellated vertices) that are tessellated with the second tessellation factor. In other words, the binner 135 performs a depth test (or a tile Z test) to predict a tile list including information indicating tiles to which the tessellated primitives (tessellated vertices) that are tessellated with the second tessellation factor belong. Here, the binned tile list may be stored in a bin stream 2002 of the memory as a visibility stream.

The binner 135 determines whether the tessellated primitives (the tessellated vertices) that are tessellated with the second tessellation factor are included in a plurality of tiles, for example, tiles A through D shown in FIG. 21. In other words, the binner 135 determines tile-crossing of the tessellated primitives (the tessellated vertices) that are tessellated with the second tessellation factor.

If it is determined that the tessellated primitives (the tessellated vertices) that are tessellated with the second tessellation factor are tile-crossed (or if it is determined that the output patch 2100 is included in the plurality of tiles A through D), the binner 135 schedules an order of the rendering of tiles A through D. Based on a result of the scheduling, the binner 135 may determine that tile A is a reference tile, since tile A is scheduled as the first tile in the rendering order from among tiles A through D. Here, it is assumed that the reference tile, i.e., tile A, is disposed at an upper left location from among a plurality of tiles. However, the location of the reference tile is not limited thereto, and the reference tile may be a lower left tile, an upper right tile, a lower right tile, or a center tile.

The binner 135 schedules a time of performing the rendering pipeline 102-2 on the reference tile, i.e., tile A, before any of the neighboring tiles, i.e., tiles B through D. The rendering pipeline 102-2 may be performed on tiles A through D sequentially by one processor unit (or one processor core) in the GPU 10, or in parallel by a plurality of processor units (or a plurality of processor cores) in the GPU 10. The determining of the reference tile and the scheduling of the performance timing may be performed by the controller 170, or another component in the GPU 10, instead of the binner 135. In other words, a component that determines the reference tile and schedules the performance timing is not limited to the binner 135.

When it is determined that the tessellated primitives (the tessellated vertices) that are tessellated with the second tessellation factor are tile-crossed, the binner 135 stores the determined reference tile and the scheduled performance timing in the memory 30.

On the other hand, when it is determined that the tessellated primitives (the tessellated vertices) that are tessellated with the second tessellation factor are not tile-crossed (or when it is determined that the output patch 2100 is included only in one tile), the binner 135 does not determine a reference tile and schedule a performance timing.

When the binning pipeline 101-4 is completed, the GPU 10 performs the rendering pipeline 102-2 per tile. Here, the GPU 10 first performs the rendering pipeline 102-2 on tile A, since tile A is determined as the reference tile in the binning pipeline 101-4.

The rendering pipeline 102-2 performed on tile A may include stages of vertex shading 2021 performed by the vertex shader 115, hull shading 2022 performed by the hull shader 121, tessellating 2023 performed by the tessellator 123, domain shading 2024 performed by the domain shader 125, geometry shading 2025 optionally performed by the geometry shader 130, rasterizing 2026 performed by the rasterizer 140, and pixel shading 2027 performed by the pixel shader 150. The result of performing the pixel shading 2027 by the pixel shader 150 may be stored in a buffer 2003.

Meanwhile, in the rendering pipeline 102-2 performed on the reference tile, i.e., tile A, binning 2028 is additionally performed by the binner 135. In detail, the binner 135 performs the binning 2028 that generates visibility streams indicating whether the output patch 2100 is visible in each of neighboring tiles adjacent to tile A, i.e., tiles B through D. Here, the visibility streams may include all the types of visibility streams described herein. Accordingly, the GPU 10 may process only visible vertices, visible primitives, or visible patches when the rendering pipeline 102-2 is independently performed on tiles B through D, using the visibility streams of tiles B through D. The visibility streams of tiles B through D are generated in the rendering pipeline 102-2 performed on tile A. As a result, data throughput in the rendering pipeline 102-2 performed on tiles B through D may be reduced.

The binning pipeline 101-4 shown in FIG. 20, operating according to mode $\hat{6}$ described above, produces fewer tessellated primitives using a lower tessellator factor. Thus, the throughput of graphic data for the graphics pipeline shown in FIG. 20 may be lowered as compared to the tessellation pipeline 300 shown in FIG. 3.

FIG. 21 is a flowchart of another example of a method implementing a graphics pipeline performed in the GPU 10. The method shown in FIG. 21 may be used to implement the graphics pipeline shown in FIG. 20, which includes the binning pipeline 101-4 and the rendering pipeline 102-2 operating according to mode $\hat{6}$. Thus, the descriptions associated with FIG. 20 may apply to those of FIG. 21, even if omitted.

A pipeline 2110 including operations 2111 through 2117 corresponds to the binning pipeline 101-4, and a pipeline 2120 including operations 2121 through 2124 corresponds to the rendering pipeline 102-2 performed on a reference tile, i.e., tile A.

In operation 2111, the vertex shader 115 performs the vertex shading 2011 using the vertices 2001 stored in the memory 30.

In operation 2112, the hull shader 121 performs the hull shading 2012 to convert input control points to output control points and forms the output patch 2100.

In operation 2113, the tessellator 123 performs the tessellating 2013 on the output control points using a second tessellation factor that is lower than a first tessellation factor determined by the hull shader 121.

In operation 2114, the domain shader 125 performs the domain shading 2014 to produce tessellated vertices (or tessellated primitives) using information about the output control points, the second tessellation factor, the uvw coordinates (of which the w coordinate is optional), and weights received from the tessellator 123.

In operation 2115, the binner 135 performs the binning 2016 or tiling using the tessellated primitives (the tessellated vertices) that are tessellated with the second tessellation factor. Then, the binner 135 stores a tile list including information indicating tiles to which the tessellated primitives (the tessellated vertices) that are tessellated with the second tessellation factor belong, based on a result of performing the binning 2016. The binner stores the tile list in the bin stream 2002 of the memory 30.

In operation 2116, the binner 135 determines whether the tessellated primitives (the tessellated vertices) that are tessellated with the second tessellation factor are included in a plurality of tiles, i.e., tiles A through D. In other words, the binner 135 determines tile-crossing of the tessellated primitives (the tessellated vertices) that are tessellated with the second tessellation factor. When the binner 135 determines that the tessellated primitives (the tessellated vertices) that are tessellated with the second tessellation factor are tile-crossed, operation 2117 is performed, and when the binner 135 determines that the tessellated primitives (the tessellated vertices) that are tessellated with the second tessellation factor are not tile-crossed, operation 2130 is performed.

In operation 2117, the binner 135 schedules a rendering order of tiles A through D. Based on a result of the scheduling, the binner 135 may determine that tile A is a reference tile, since tile A is scheduled first in the rendering order among tiles A through D.

In operation 2121, the vertex shader 115 performs the vertex shading 2021 on tile A using the vertices 2001 stored in the memory 30.

In operation 2122, the GPU 10 performs a tessellation pipeline on tile A including the hull shading 2022 performed by the hull shader 121, the tessellating 2023 performed by the tessellator 123, and the domain shading 2024 performed by the domain shader 125.

In operation 2123, the GPU 10 renders tessellation primitives of tile A, which are produced in the tessellation pipeline. In other words, the GPU 10 performs the rasterizing 2026 and the pixel shading 2027 on tile A.

In operation 2124, the binner 135 performs the binning 2028 to generate visibility streams indicating whether the output patch 2100 is visible in each of the neighboring tiles, i.e., tiles B through D. The binner 135 stores the visibility streams of tiles B through D. Although not shown in FIG. 21, the GPU 10 performs the rendering pipeline 102-2 on tiles B through D using the stored visibility streams. Here, the rendering pipeline 102-2 performed on tiles B through D processes only visible vertices, visible primitives, or visible patches using the visibility streams of tiles B through D.

In operation 2130, the GPU 10 performs the rendering pipeline 102-2 on tile including the tessellated primitives (the tessellated vertices) that are tessellated with the second tessellation factor when it is determined in operation 2116 that the tessellated primitives (the tessellated vertices) that are tessellated with the second tessellation factor are not tile-crossed (i.e., are included in one tile).

FIG. 22 is a diagram illustrating an example of a case when a tile list to which a patch belongs and a tile list to which tessellated primitives belong are different based on a result of tessellating the patch.

Generally, in the tessellation pipeline 300 shown in FIG. 3, the hull shader 121 and the domain shader 125 are programmable, but the tessellator 123 is not programmable. Thus, a developer who codes the tessellation pipeline 300 may program the hull shader 121 and the domain shader 125 such that an output patch 2213 is included in one tile, i.e., tile 0, but tessellated primitives 2225 are included in two tiles, i.e., tile 0 and tile 1. In other words, primitives 2230 may be mispredicted and exist in the tessellated primitives 2225. A graphics pipeline in which a mispredicted tile list occurs in a binning pipeline during a rendering pipeline is described below with reference to FIGS. 23 and 24.

Figure 23:
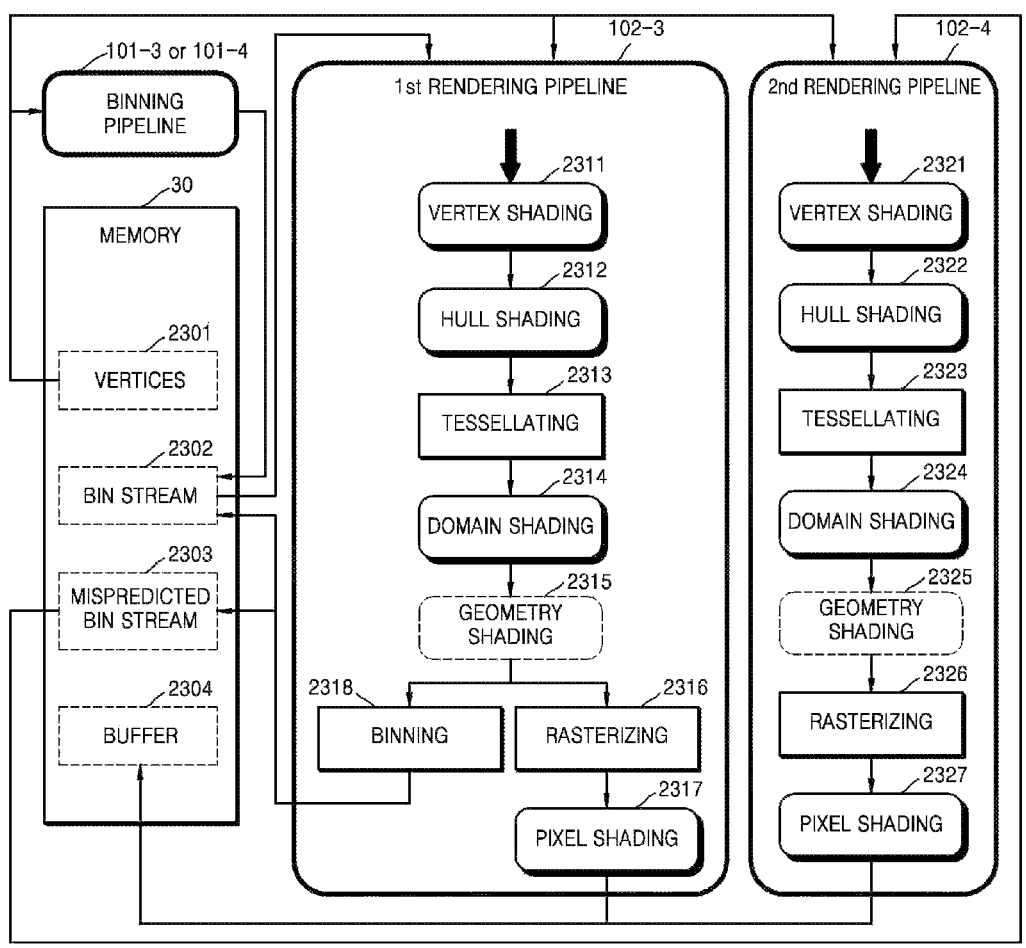
FIG. 23 is a diagram illustrating an example of a graphics pipeline performed in a GPU.

FIG. 23 is a diagram illustrating another example of a graphics pipeline performed in the GPU 10.

Referring to FIG. 23, the graphics pipeline including the binning pipeline 101-3 and the first and second rendering pipelines 102-3 and 102-4 operates in mode $\hat{7}$, described above with reference to FIG. 7, and the graphics pipeline including the binning pipeline 101-4 and the first and second rendering pipelines 102-3 and 102-4 operates in mode $\hat{8}$, also described above with reference to FIG. 7. The graphics pipeline shown in FIG. 23 is described in relation to hardware components of the GPU 10 shown in FIG. 6, wherein only the components and the pipeline stages related to this example are described. Thus, one of ordinary skill in the art will appreciate that general-purpose components and pipeline stages other than those described in FIG. 23 may be included.

The GPU 10 performs the binning pipeline 101-3 or 101-4 described above. A binning result of the binning pipeline 101-3 or 101-4 may be stored as a visibility stream in a bin stream 2302 of the memory 30. Then, the GPU 10 performs the first rendering pipeline 102-3. The first rendering pipeline 102-3 is performed per tile. As shown in FIG. 23, it is assumed that tile X is the current tile on which the first rendering pipeline 102-3 is performed.

The vertex shader 115 performs vertex shading 2311 using vertices 2301 of tile X based on the binning result stored in the bin stream 2302. The vertex shader 115 converts the vertices 2301 and transmits the converted vertices 2301 to the hull shader 121 as input control points expressing a surface of a low order.

The hull shader 121 performs hull shading 2312 that converts the input control points to output control points forming an output patch. The hull shader 121 generates the output control points determines a tessellation factor TF at the same time.

The tessellator 123 performs tessellating 2313 to calculate uvw coordinates and weights of the output control points in barycentric coordinates using the tessellation factor TF received from the hull shader 121.

The domain shader 125 performs domain shading 2314 to produce tessellated vertices (or tessellated primitives) using information about the output control points, the tessellation factor TF, the uvw coordinates (of which the w coordinate is optional), and the weights received from the tessellator 123.

The geometry shader 130 is an optional component that may be used to perform geometry shading 2315 to produce additional vertices (or primitives) from the tessellated vertices (or the tessellated primitives) received from the domain shader 125. Accordingly, as the geometry shader 130 is optional, the geometry shading 2315 may be skipped.

The rasterizer 140 performs rasterizing 2316 on the tessellated vertices (or the tessellated primitives) included in the current tile, i.e., tile X, and the pixel shader 150 performs pixel shading 2317 on pixels corresponding to the rasterized primitives. The result of performing the pixel shading 2317 is stored in a buffer 2304.

The buffer 135 performs binning 2318 or tiling on the tessellated primitives (the tessellated primitives) included in tile X. The buffer 135 determines whether there is a mispredicted tile from among tile locations of the tessellated primitives (the tessellated vertices) included in tile X by comparing the result of performing the binning 2318 with a tile list stored in the bin stream 2302 from the binning pipeline 101-3 or 101-4. When it is determined that there is no mispredicted tile, the GPU 10 performs the first rendering pipeline 102-3 on a tile following tile X. On the other hand, when it is determined that there is a mispredicted tile, the binner 135 updates the tile list of the mispredicted tile in the bin stream 2302 or stores the tile list of the mispredicted tile in a mispredicted bin stream 2303. Here, the tile list of the mispredicted tile is updated in the bin stream 2302 when rendering has not been started on the mispredicted tile; however, when rendering has already been completed on the mispredicted tile, the tile list of mispredicted tile is stored in the mispredicted bin stream 2303.

After the first rendering pipeline 102-3 is performed per tile on all tiles, the GPU 10 determines whether there is a mispredicted tile in the mispredicted bin stream 2303. When there is a mispredicted tile list in the mispredicted bin stream 2303, the GPU 10 performs the second rendering pipeline 102-4 on tiles included in the mispredicted tile list. In this example, the tiles included in the mispredicted tile list are referred to as super tiles. The second rendering pipeline 102-4 is performed per super tile on the tiles included in the mispredicted tile list. In other words, the GPU 10 performs the second rendering pipeline 102-4 per super tile including stages of vertex shading 2321 performed by the vertex shader 115, hull shading 2322 performed by the hull shader 121, tessellating 2323 performed by the tessellator 123, domain shading 2324 performed by the domain shader 125, geometry shading 2325 optionally performed by the geometry shader 130, rasterizing 2326 performed by the rasterizer 140, and pixel shading 2327 performed by the pixel shader 150 per tile or. Results of performing the pixel shading 2327 on the super tiles are stored in the buffer 2304, and thus the graphics pipeline is completed.

Figure 24:
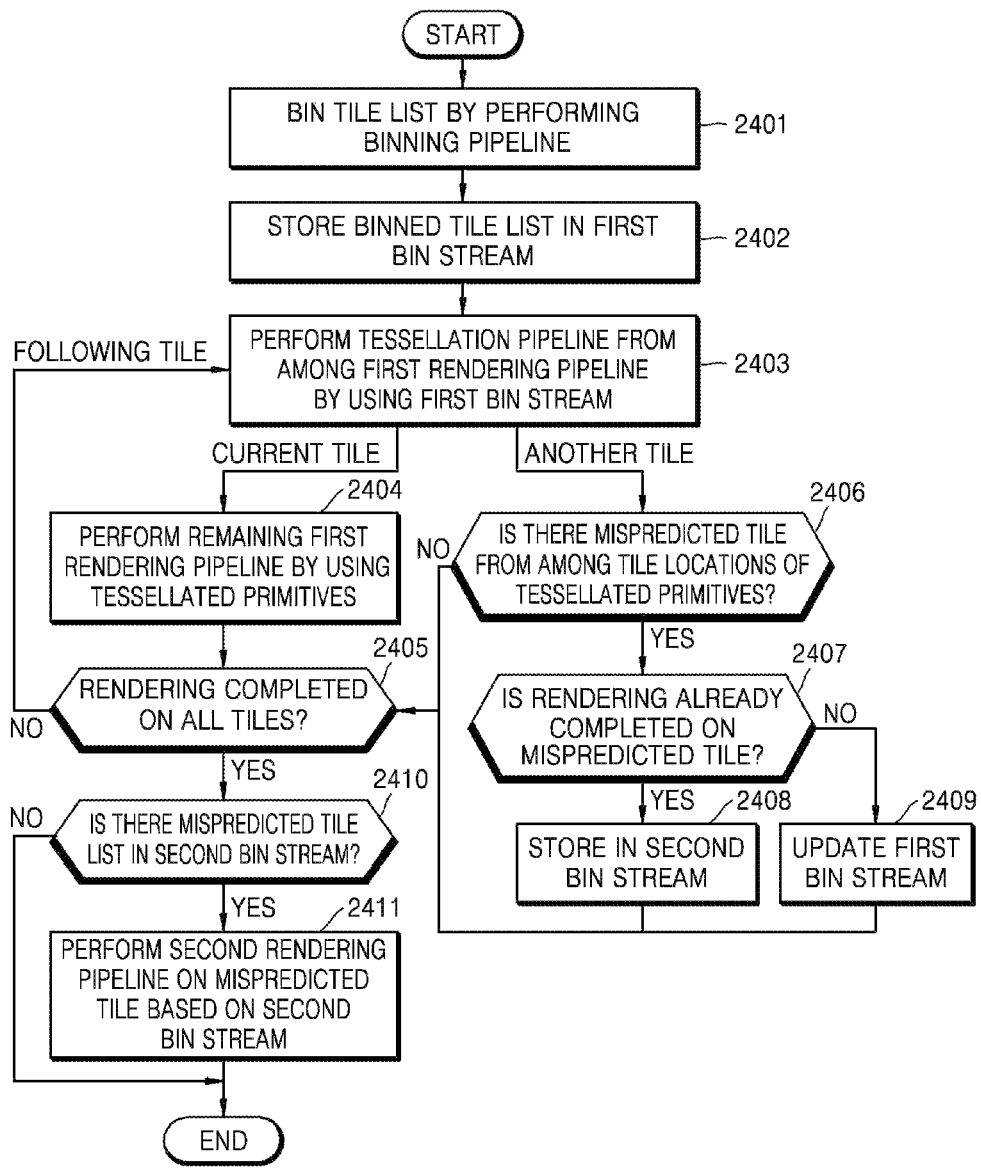
FIG. 24 is a flowchart showing an example of a method for a graphics pipeline performed in a GPU.

FIG. 24 is a flowchart of another example of a method for implementing a graphics pipeline performed in the GPU 10. The method shown in FIG. 24 may be used to implement the graphics pipeline shown in FIG. 23, which includes the binning pipeline 101-3 or 101-4, the first rendering pipeline 102-3, and the second rendering pipeline 102-4 operating according to modes $\hat{7}$ or $\hat{8}$. Thus, the descriptions associated with FIG. 23 may apply to those of FIG. 24, even if omitted.

In operation 2401, the GPU 10 bins a tile list by performing the binning pipeline 101-3 or 101-4.

In operation 2402, the GPU 10 stores the binned tile list in a first bin stream, i.e., the bin stream 2302 shown in FIG. 23.

In operation 2403, the GPU 10 performs a tessellation pipeline shown in FIG. 23 on a current tile, i.e., a tile X, including the hull shading 2312, the tessellating 2313, and the domain shading 2314 from the first rendering pipeline 102-3 using the first bin stream 2302.

In operation 2404, the GPU 10 performs a remaining pipeline on tile X including the rasterizing 2316 and the pixel shading 2317 using tessellation primitives output from the tessellation pipeline.

In operation 2405, the GPU 10 determines whether rendering of all tiles is completed. When it is determined that the rendering of all tiles is completed, operation 2410 is performed. When it is determined that the rendering of all tiles is not completed, operation 2403 is performed on a tile following tile X.

In operation 2406, the GPU 10 performs the binning 2318 or tiling on tessellated primitives (tessellated vertices) included in the current tile, i.e., tile X. The GPU 10 determines whether there is a mispredicted tile from among tile locations of the tessellated primitives (the tessellated vertices) included in tile X by comparing the result of the binning 2318 and the tile list stored in the bin stream 2302 in the binning pipeline 101-3 or 101-4. When it is determined that there is no mispredicted tile, operation 2405 is performed. When it is determined that there is a mispredicted tile, operation 2407 is performed.

In operation 2407, the GPU 10 determines whether rendering on the mispredicted tile has already been completed. When it is determined that the rendering on the mispredicted tile has already been completed, operation 2408 is performed. When it is determined that the rendering on the mispredicted tile has not already been completed, operation 2409 is performed.

In operation 2408, the GPU 10 stores a tile list of the mispredicted tile in a second bin stream, i.e., the mispredicted bin stream 2303 shown in FIG. 23.

In operation 2409, the GPU 10 updates the tile list of the mispredicted tile in the first bin stream, i.e., the bin stream 2302 shown in FIG. 23.

In operation 2410, the GPU 10 determines whether there is a mispredicted tile list in the second bin stream. When it is determined that there is no mispredicted tile list, the graphics pipeline ends. When it is determined that there is a mispredicted tile list, operation 2411 is performed.

In operation 2411, the GPU 10 performs the second rendering pipeline 102-4 shown in FIG. 23 on the mispredicted tile (i.e., a super tile) based on the second bin stream.

Figure 25:
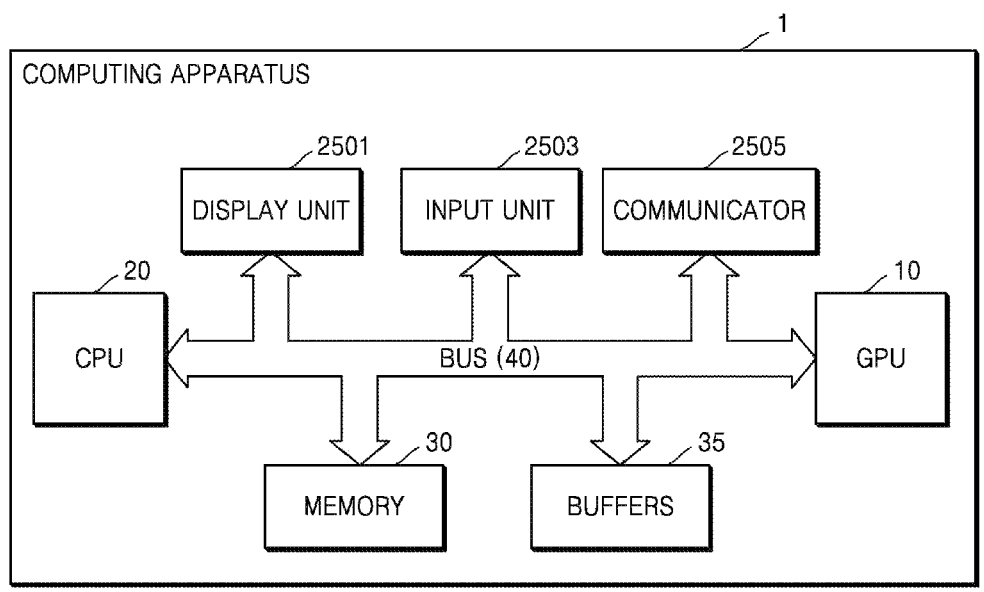
FIG. 25 is a block diagram illustrating an example of a detailed hardware structure of a computing device.

FIG. 25 is a block diagram of an example of a detailed hardware structure of the computing device 1.

Referring to FIG. 25, the computing apparatus 1 includes the GPU 10, the CPU 20, the memory 30, buffers 35, the bus 40, a display unit 2501, an input unit 2503, and a communicator 2505. Components of the computing apparatus 1 shown in FIG. 25 are exemplary, and one of ordinary skill in the art will appreciate that the computing apparatus 1 may include general-purpose components other than those shown in FIG. 25.

The GPU 10, the CPU 20, and the memory 30 may perform operations and functions described above.

For example, the hardware components of the GPU 10 and the CPU 20 may be implemented by one or more processors or processing units. A processor or processing unit is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or a processing unit includes, or is connected to, one or more memories storing instructions or software that are executed by the processor or the processing unit. Hardware components implemented by a processor or a processing unit execute instructions or software, such as an operating system (OS) and one or more software applications that run on the OS, to perform the operations described herein with respect to FIGS. 3, 7, 10-21, 23, 24, 28, 29, and 32-35. The hardware components also access, manipulate, process, create, and store data in response to execution of the instructions or software. For simplicity, the singular term "processor" or "processing unit" may be used in the description of the examples described herein, but in other examples multiple processors or processing units are used, or a processor or processing unit includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods perform the operations described herein with respect to FIGS. 3, 7, 10-21, 23, 24, 28, 29, and 32-35 are performed by a processor or a computer as described above executing instructions or software to perform the operations described herein.

Instructions or software to control a processor or processing unit to implement the hardware components and perform the methods as described above are written as computer programs, code segments, instructions or any combination thereof, for individually or collectively instructing or configuring the processor or processing unit to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or processing to implement the hardware components and perform the methods as described above, and any associated data, data files, and data structures, are recorded, stored, or fixed in or on one or more non-transitory computer-readable storage media, such as for example, memory 30. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magnetooptical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

The buffers 35 store tile information output via a tile-based graphics pipeline or tile-based rendering. For example, the buffers 35 may store a result of performing a depth test on a tile or a result of rendering a tile. In FIG. 25, the buffers 35 included in the computing apparatus 1 are separate from the GPU 10, the CPU 20, and the memory 30; however, alternatively, the buffers 35 may be included in the GPU 10, the CPU 20, or the memory 30.

The display unit 2501 is a display interfacing unit used to display various types of information to a user, such as information processed or to be processed by the computing apparatus 1. The display unit 2501 may display a graphical user interface (GUI) to visually and intuitively provide information processed by the computing apparatus 1 to the user. For example, the display unit 2501 may display graphic data processed by the GPU 10. The display unit 2501 may include any one of various displays, such as a liquid crystal display (LCD), a light-emitting diode (LED) display, and a plasma display panel (PDP).

The input unit 2503 is an input interfacing unit for receiving information from the user. The input unit 2503 may be realized as a touch pad, a trackball, a mouse, a keyboard, or a game controller. Alternatively, the display unit 2501 and the input unit 2503 may be realized as hardware of an integrated touch screen.

The communicator 2505 may include a mobile communication module or a wired/wireless local area network (LAN) module for mobile communication, or a Wi-Fi module, a Bluetooth module, or a near-field communication (NFC) module for NFC.

FIGS. 26A and B are diagrams illustrating examples of conditions used for selecting a type of a graphics pipeline to be processed in the GPU 10.

As described above in FIG. 7, any one of mode $\hat{1}$ through mode $\hat{8}$ may be selected according to a user input or a graphic processing environment. According to the examples shown in FIG. 26A or 26B, the GPU 10 may select any one of mode $\hat{1}$ through mode $\hat{8}$ based on a ratio of the size of an object 2615 or 2625 (or a size of a patch forming the object 2615 or 2625) with respect to the size of one tile 2610 or 2620. For example, the ratios of the sizes of the objects 2615 and 2625 (or the sizes of the patches forming the objects 2615 and 2625) with respect to the sizes of the tiles 2610 and 2620 are different in FIGS. 26A and 26B. Thus, the GPU 10 may set a certain threshold range in each of mode $\hat{1}$ through mode $\hat{8}$ and control a graphics pipeline to be performed in an efficient mode corresponding to a range to which the ratio belongs.

FIGS. 27A and 27B are diagrams illustrating examples of conditions used for selecting a type of graphics pipeline to be processed in the GPU 10.

According to FIG. 27A or 27B, the GPU 10 may select any one of mode $\hat{1}$ through mode $\hat{8}$ based on a location of an object 2715 or 2725 (or a patch forming the object 2715 or 2725) in one tile 2710 or 2720. For example, the distance (a) and the distance (b) are the distance between the boundaries of the tiles 2710 and 2720 and the boundaries of the objects 2715 and 2725 (or the patches forming the objects 2715 and 2725). The distance (a) and the distance (b) are different in FIGS. 27A and 27B. Thus, the GPU 10 may set a certain threshold range in each of mode $\hat{1}$ through mode $\hat{8}$ and efficiently control a graphics pipeline to be performed in a mode corresponding to the range to which a distance belongs.

Figure 28:
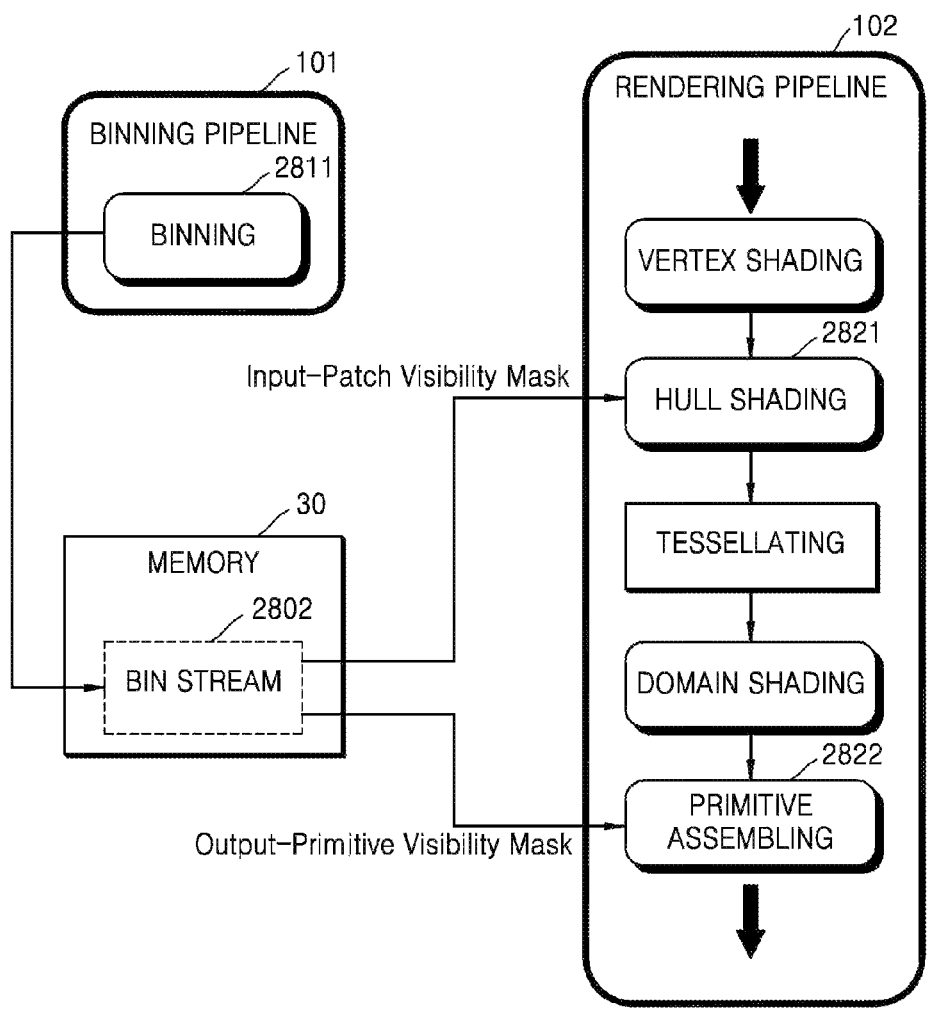
FIG. 28 is a diagram illustrating an example of an example of applying a visibility stream stored in a bin stream of a memory in a graphics pipeline.

FIG. 28 is a flow diagram illustrating an example of applying a visibility stream stored in a bin stream of the memory in a graphics pipeline.

Referring to FIG. 28, if the binning pipeline 101 is performed, when the GPU 10 executes binning 2811, an input-patch visibility stream may be stored in the bin stream 2802 of the memory 30. Also, when the binning 2811 of the binning pipeline 101 is performed, an output-primitive visibility stream may be stored in the bin stream 2802 of the memory 30. In this example, the binning 2811 may correspond to any one of the binning stages included in the various graphics pipelines described above.

The input-patch visibility stream may include information about an input-patch visibility mask indicating visibility of an input patch to be input to the hull shader 121 which performs hull shading 2821 of during the rendering pipeline 102. For example, the input-patch visibility mask may be in a bit of 0 or 1 indicating whether the input patch is visible in a tile. Thus, using the input-patch visibility stream, the hull shader 121 is able to perform the hull shading 2821 only on visible input patches during the rendering pipeline 102. As a result, throughput may be reduced in the rendering pipeline 102.

Similarly, the output-primitive visibility stream may include information about an output-primitive visibility mask indicating visibility of output primitives. The information about an output-primitive visibility mask is input to perform primitive assembling 2822 during the rendering pipeline 102. For example, the output-primitive visibility mask may include a bit of 0 or 1 indicating whether an output primitive is visible in a tile. Thus, using the output-primitive visibility stream, the GPU 10 may perform the primitive assembling 2822 only on visible output primitives during the rendering pipeline 102. As a result, throughput may be reduced in the rendering pipeline 102.

Figure 29:
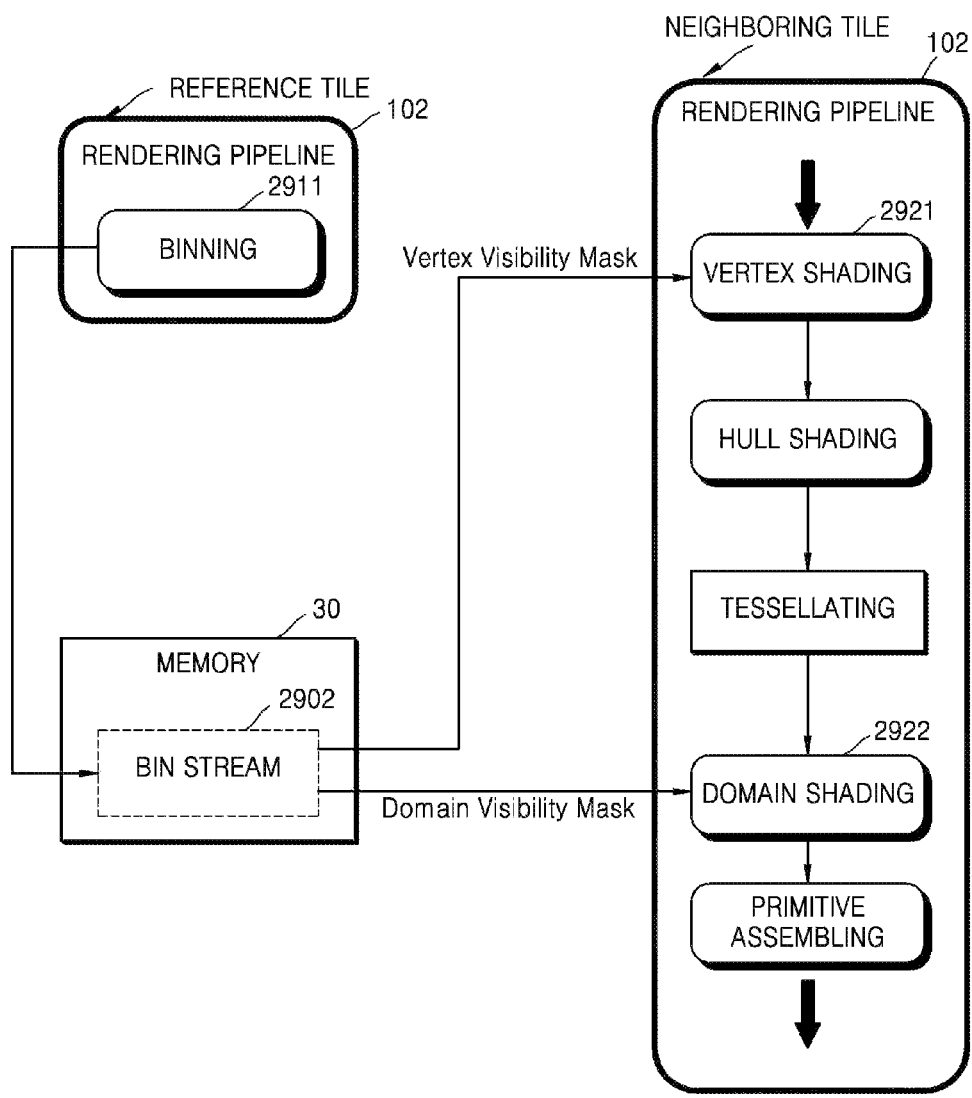
FIG. 29 is a diagram illustrating an example of an example of applying a visibility stream stored in a bin stream of a memory in a graphics pipeline.

FIG. 29 is a diagram of an example of applying a visibility stream stored in a bin stream of the memory in a graphics pipeline.

Referring to FIG. 29, as described above with reference to FIGS. 18 through 21, when binning 2911 of the rendering pipeline 102 is performed on a reference tile, for example, tile A of FIGS. 19 and 21, a vertex visibility stream may be stored in the bin stream 2902 of the memory 30. Also, when the binning 2811 of the rendering pipeline 102 is performed, a domain visibility stream may be stored in the bin stream 2902 of the memory 30. In this example, the binning 2911 may correspond to any one of the binning stages included in the various graphics pipelines described above, such as, for example the graphics pipelines in FIGS. 19 and 21.

The vertex visibility stream may include information about a vertex visibility mask indicating visibility of a vertex input to the vertex shader 115 which performs vertex shading 2921 of during the rendering pipeline 102 on neighboring tiles, for example, tiles B through D that are adjacent to the reference tile, for example, tile A as shown in FIGS. 19 and 21. For example, the vertex visibility mask may include a bit of 0 or 1 indicating whether a vertex is viewable in a tile. Accordingly, using the vertex visibility stream, the vertex shader 115 may perform the vertex shading 2921 only on visible vertices during the rendering pipeline 102. As a result, throughput in the rendering pipeline 102 may be reduced.

Similarly, the domain visibility stream may include information about a domain visibility stream indicating visibility of output patches, which is input to the domain shader 125, which performs domain shading 2922 during the rendering pipeline 102. For example, the domain visibility mask may include a bit of 0 or 1 indicating whether an output primitive is viewable in a tile. Accordingly, using the domain visibility stream, the domain shader 125 performs the domain shading 2922 only on visible output patches during the rendering pipeline 102. As a result, throughput in the rendering pipeline 102 may be reduced.

Meanwhile, a visibility stream described herein may include an input-patch visibility stream, an output-primitive visibility stream, a vertex visibility mask, or a domain visibility stream, but is not limited thereto.

Figure 30:
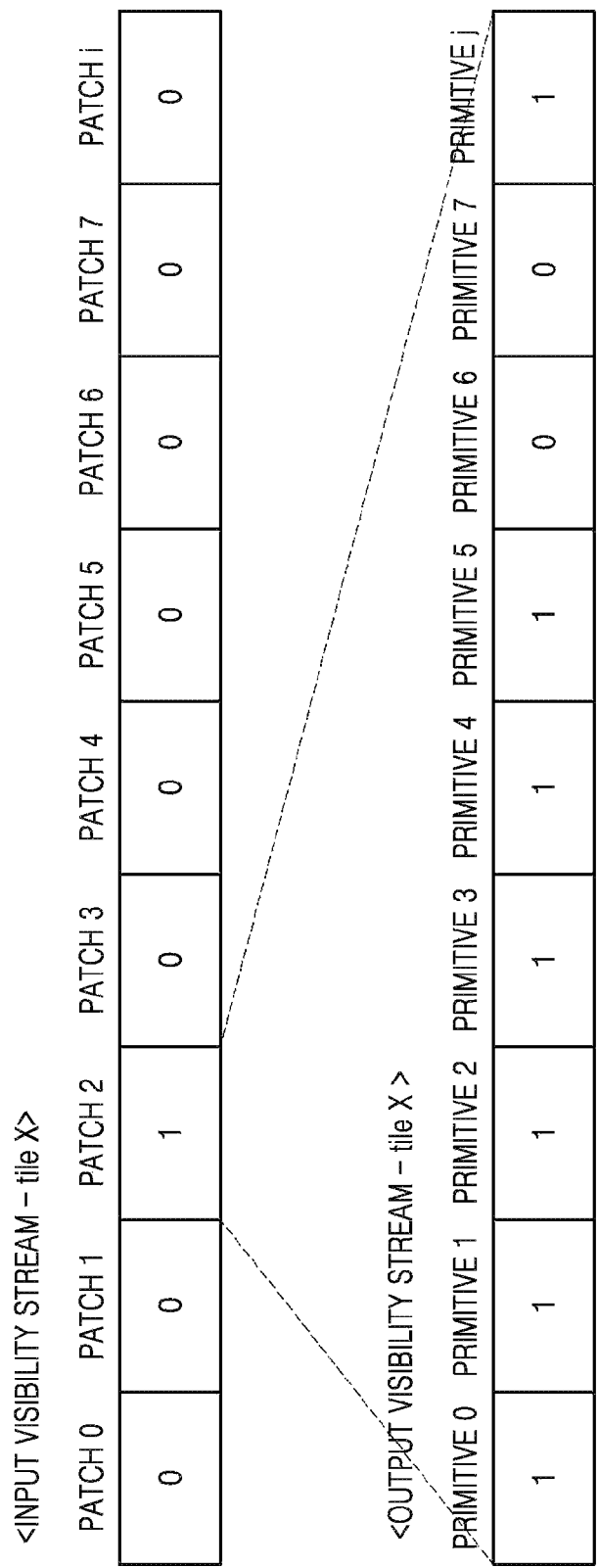
FIG. 30 is a diagram illustrating an example of a visibility stream stored in a bin stream after binning pipeline is completed.

FIG. 30 is a diagram illustrating an example of a visibility stream stored in a bin stream after binning pipeline is completed.

As described above, when the binning pipeline 101 is completed, the GPU 10 stores a visibility stream in the memory 30. Referring to FIG. 30, the visibility stream may include an input visibility stream and an output visibility stream.

The input visibility stream may include a stream of 1s and 0s with respect to each patch. Each bit denotes whether at least a part of the patch is viewable from a final frame. For example, a bit having a value of 1 in a patch 2 indicates that the patch 2 is viewable in the final frame, and bits having values of 0 in other patches indicate that the other patches are not viewable in the final frame. The output visibility stream may include a stream of 1s and 0s with respect to each primitive, wherein a bit having a value of 1 indicates that a primitive contributes to a pixel that is viewable in a final scene (for example, a bit having a value of 1 in a primitive 0), and a bit having a value of 0 indicates that a primitive does not contribute to a pixel that is viewable in a final scene (for example, a bit having a value of 0 in a primitive 6).

The output visibility streams may be generated per patch. In other words, one output visibility stream may exist per patch of each tile. Alternatively, each tile may have one output visibility stream that connects output primitives produced from the input primitives.

Figure 31:
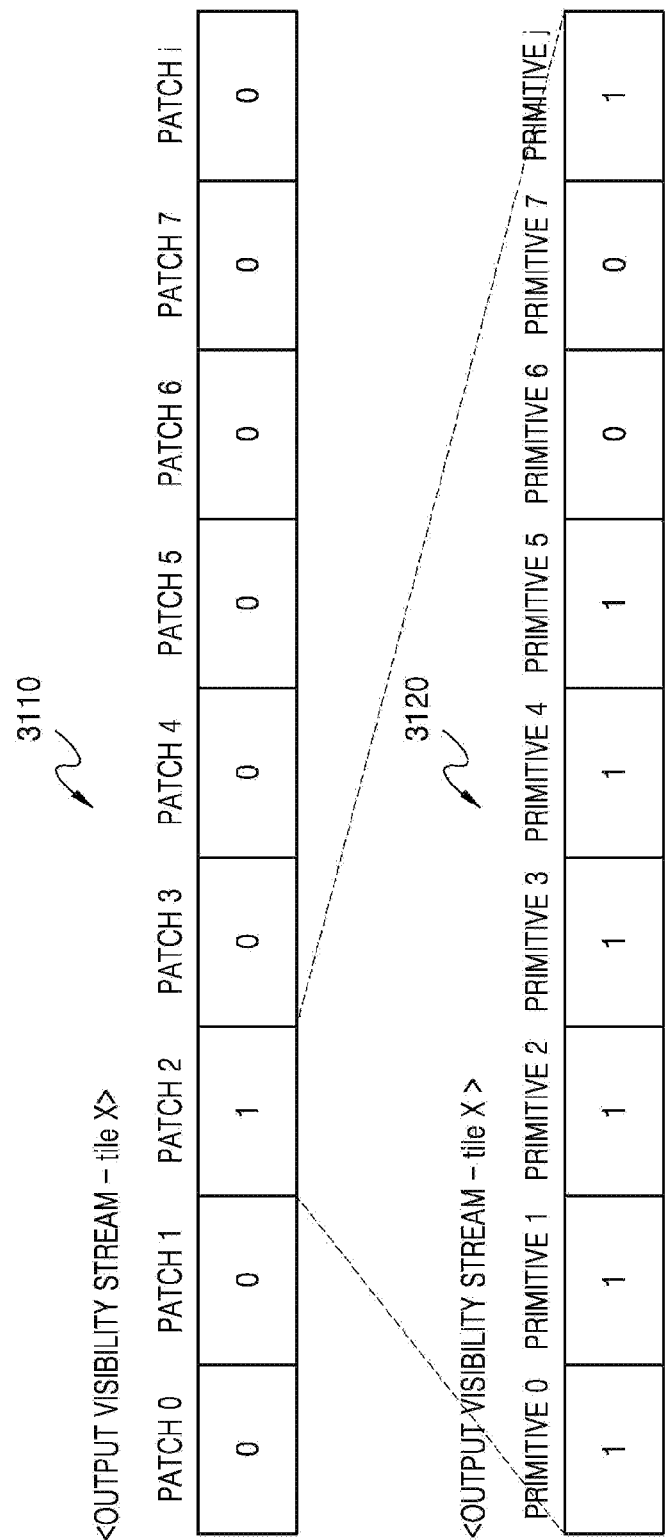
FIG. 31 is a diagram illustrating an example of a visibility stream stored in a bin stream after binning pipeline is completed.

FIG. 31 is a diagram illustrating an example of a visibility stream stored in a bin stream after binning pipeline is completed.

Referring to FIG. 31, an output visibility stream 3110 may be generated with respect to an output patch output from the hull shader 121, and an output visibility stream 3120 may be generated with respect to tessellated primitives output from the domain shader 125, but output visibility streams are not limited thereto.

Figure 32:
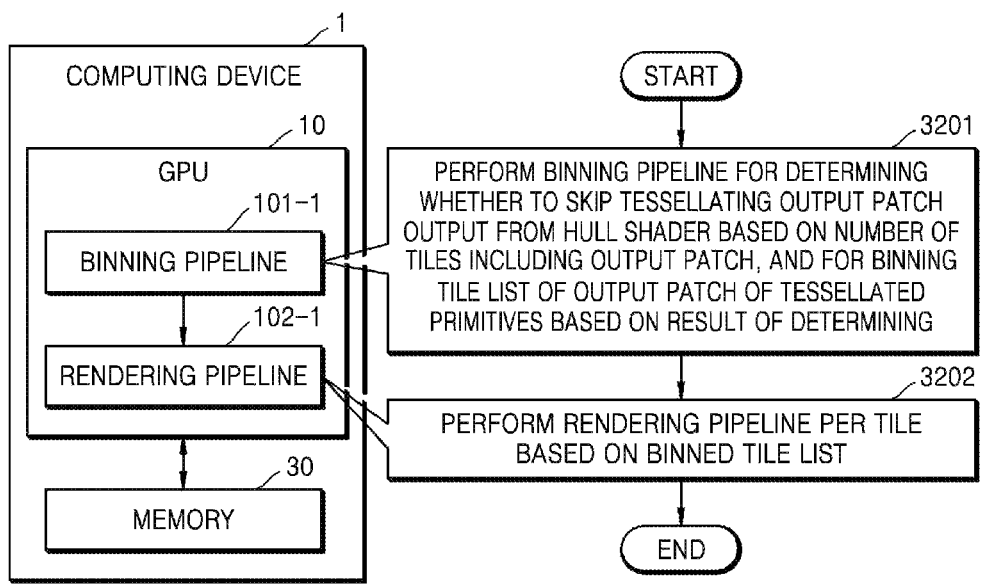
FIG. 32 is a combined flow diagram and flowchart showing an example of a method of performing, by a computing apparatus, a graphics pipeline.

FIG. 32 is a combined flow block diagram and flowchart of an example of a method of performing, by the computing apparatus 1, a graphics pipeline. The method shown in FIG. 32 is related to the examples of operation according to mode 1 described above with reference to FIGS. 10 and 11. Thus, the descriptions of FIGS. 10 and 11 may apply to the method shown in FIG. 32, even if omitted.

In operation 3201, the GPU 10 of the computing apparatus 1 performs the binning pipeline 101-1 in which it determines whether to skip tessellating an output patch output from the hull shader 121 based on the number of tiles including the output patch and binning a tile list of the output patch or tessellated primitives based on the result of the determination.

In operation 3202, the GPU 10 of the computing apparatus 1 performs the rendering pipeline 102-1 per tile based on the binned tile list.

In detail, in operation 3201, when the number of tiles that include the output patch is one, the tessellating performed by the tessellator 123 on the output patch may be skipped. In operation 3201, the output patch is generated by the hull shader 121 which performs hull shading on an input patch, the tile list of the output patch is binned, and it is determined whether the output patch is included in one tile. If it is determined that the output patch is included in one tile, rasterizing may be performed using the binned tile list of the output patch in operation 3202. Here, the rasterizing corresponds to a partial stage performed in the rendering pipeline 102-1. The rendering pipeline 102-1 may include various stages, such as a pixel shading stage in addition to a rasterizing stage. When the tessellating is skipped in the binning pipeline 101-1, a tessellation pipeline may be performed in operation 3202 using a bin stream stored with respect to the output patch from the binning pipeline 101-1. Meanwhile, in operation 3201, the tessellating may be programmed such that a boundary of the output patch includes boundaries formed by the tessellated primitives.

If it is determined that the output patch is included in at least two tiles (or if it is determined that the output patch is not included in one tile), tessellated primitives may be produced by performing tessellating, by the tessellator 123, and domain shading, by the domain shader 125, on the output patch, in operation 3201. Here, rasterizing may be performed using a binned tile list of the tessellated primitives, in operation 3202.

Meanwhile, the memory 30 of the computing apparatus 1 stores the tile list generated in the binning pipeline 101-1 and provides the stored tile list to the rendering pipeline 102-1. In operation 3201, if it is determined that the output patch is included in one tile, a visibility stream of the output patch may be stored in the memory 30, and if it is determined that the output patch is included in at least two tiles, a visibility stream of the tessellated primitives may be stored in the memory 30.

Figure 33:
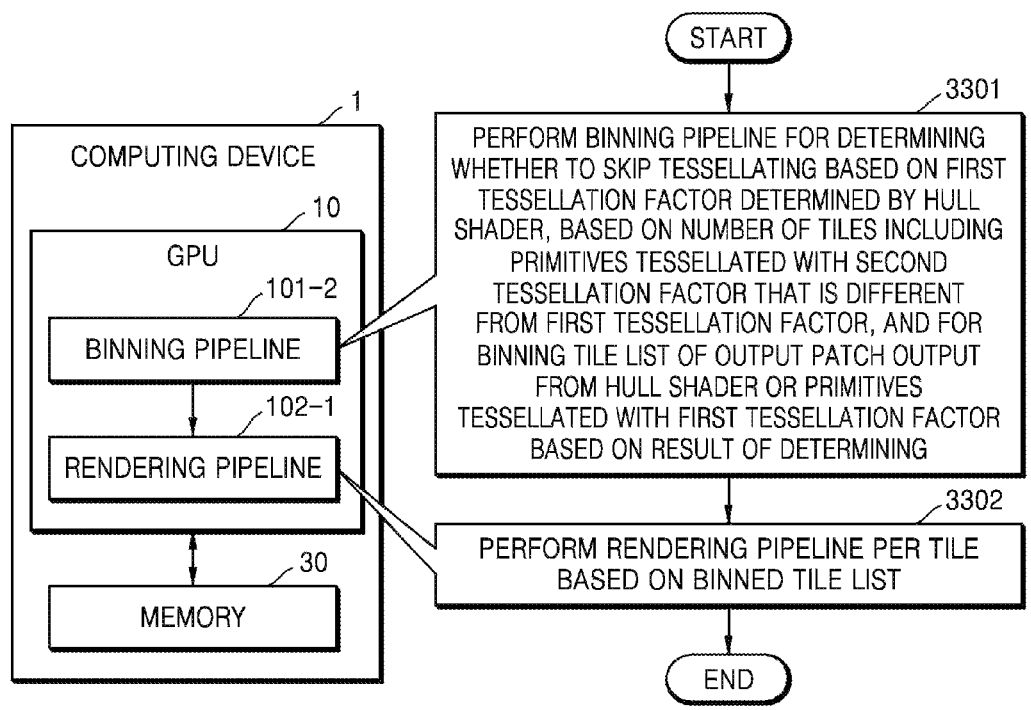
FIG. 33 is a combined flow diagram and flowchart showing an example of a method of performing, by a computing apparatus, a graphics pipeline.

FIG. 33 is a combined flow block diagram and flowchart showing an example of a method of performing, by the computing apparatus 1, a graphics pipeline. The method shown in FIG. 33 is related to the example of operation in mode 2, described above with reference to FIGS. 12 and 13. Thus, descriptions associated with FIGS. 12 and 13 may apply to the method shown in FIG. 33, even if omitted.

In operation 3301, the GPU 10 of the computing apparatus 1 performs the binning pipeline 101-2 by determining whether to skip tessellating based on a first tessellation factor determined by the hull shader 121 and the number of tiles including primitives tessellated with a second tessellation factor that is different from the first tessellation factor, and binning a tile list of an output patch output from the hull shader 121 or primitives tessellated with the first tessellation factor, based on the result of the determination.

In operation 3302, the GPU 10 of the computing apparatus 1 performs the rendering pipeline 102-1 per tile based on the binned tile list.

In detail, when the number of tiles that include the primitives tessellated with the second tessellation factor is one, the tessellating based on the first tessellation factor, which is to be performed by the tessellator 123, is skipped in operation 3301. Here, the second tessellation factor may be lower than the first tessellation factor. In operation 3301, the hull shader 121 performs hull shading to generate the output patch and determine the first tessellation factor. The tessellator 123 tessellates the output patch based on the second tessellation factor that is lower than the first tessellation factor to produce the primitives tessellated with the second tessellation factor. The domain shader 125 performs domain shading tessellated primitives, and it is determined whether the primitives tessellated with the second tessellation factor are included in one tile. Here, when it is determined that the primitives tessellated with the second tessellation factor are included in one tile, rasterizing may be performed using the binned tile list of the output patch in operation 3302. Here, the rasterizing corresponds to a partial stage performed in the rendering pipeline 102-1. The rendering pipeline 102-1 may include various stages, such as a pixel shading stage in addition to a rasterizing stage. Meanwhile, in operation 3301, the tessellating may be programmed such that a boundary formed by the primitives tessellated with the first tessellation factor includes a boundary formed by the primitives tessellated with the second tessellation factor.

When it is determined that the primitives tessellated with the second tessellation factor are included in at least two tiles (or when it is determined that the primitives tessellated with the second tessellation factor are not included in one tile), the primitives tessellated with the first tessellation factor may be produced in operation 3301 by performing tessellating using the tessellator 123 and domain shading using the domain shader 125 on the output patch based on the first tessellation factor. Here, rasterizing and pixel shading may be performed in operation 3302 using the binned tile list of the primitives tessellated with the first tessellation factor.

Meanwhile, the memory 30 of the computing apparatus 1 stores the tile list generated in the binning pipeline 101-2 and provides the stored tile list to the rendering pipeline 102-1. In operation 3301, when it is determined that the primitives tessellated with the second tessellation factor are included in one tile, a visibility stream of the output patch is stored in the memory 30, and when it is determined that the primitives tessellated with the second tessellation factor are included in at least two tiles, a visibility stream of the primitives tessellated with the first tessellation factor is stored in the memory 30.

Figure 34:
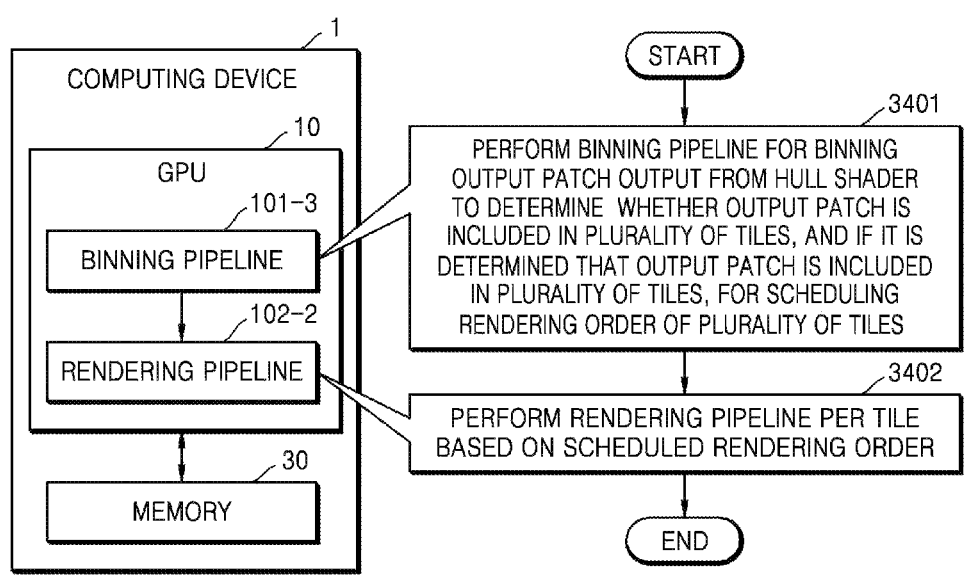
FIG. 34 is a combined flow diagram and flowchart showing an example of a method of performing, by a computing apparatus, a graphics pipeline.

FIG. 34 is a combined flow block diagram and flowchart of another example of a method of performing, by the computing apparatus 1, a graphics pipeline. The method shown in FIG. 34 is related to the examples of operating in mode $\hat{5}$ described above with reference to FIGS. 18 and 19. Thus, the descriptions associated with FIGS. 18 and 19 may apply to the method shown in FIG. 34, even if omitted.

In operation 3401, the GPU 10 of the computing apparatus 1 performs the binning pipeline 101-3 by binning an output patch output from the hull shader 121 to determine whether the output patch is included in a plurality of tiles, and if it is determined that the output patch is included in the tiles, scheduling a rendering order of the tiles.

In operation 3402, the GPU 10 of the computing apparatus 1 performs the rendering pipeline 102-2 per tile based on the scheduled rendering order.

In detail, in operation 3401, tessellating on the output patch, which is to be performed by the tessellator 123, may be skipped. In operation 3401, the hull shader 121 performs hull shading on an input patch to generate the output patch, a tile list of the output patch is binned, it is determined whether the output patch is included in the plurality of tiles, and if it is determined that the output patch is included in the plurality of tiles, a first tile (a reference tile, for example, tile A shown in FIG. 19) corresponding to a first rendering order from among the plurality of tiles is determined.

In operation 3402, a first rendering pipeline is performed on the first tile, and a second rendering pipeline is performed on a neighboring tile (for example, tiles B, C, or D shown in FIG. 19). The second rendering pipeline performs rendering on at least one of a visible vertex, a visible primitive, and a visible patch of the neighboring tile based on a visibility stream generated in the first rendering pipeline. The first and second rendering pipelines shown in FIG. 34 are parts of the rendering pipeline 102-2, and are different from the first and second rendering pipelines 102-3 and 102-4 shown in FIG. 7.

The memory 30 of the computing apparatus 1 stores a visibility stream generated in the rendering pipeline 102-2 performed on the first tile, and provides the stored visibility stream to the rendering pipeline 102-2 performed on the neighboring tile. In other words, in operation 3401, a visibility stream generated in the rendering pipeline 102-2 performed on the first tile may be stored in the memory 30.

Figure 35:
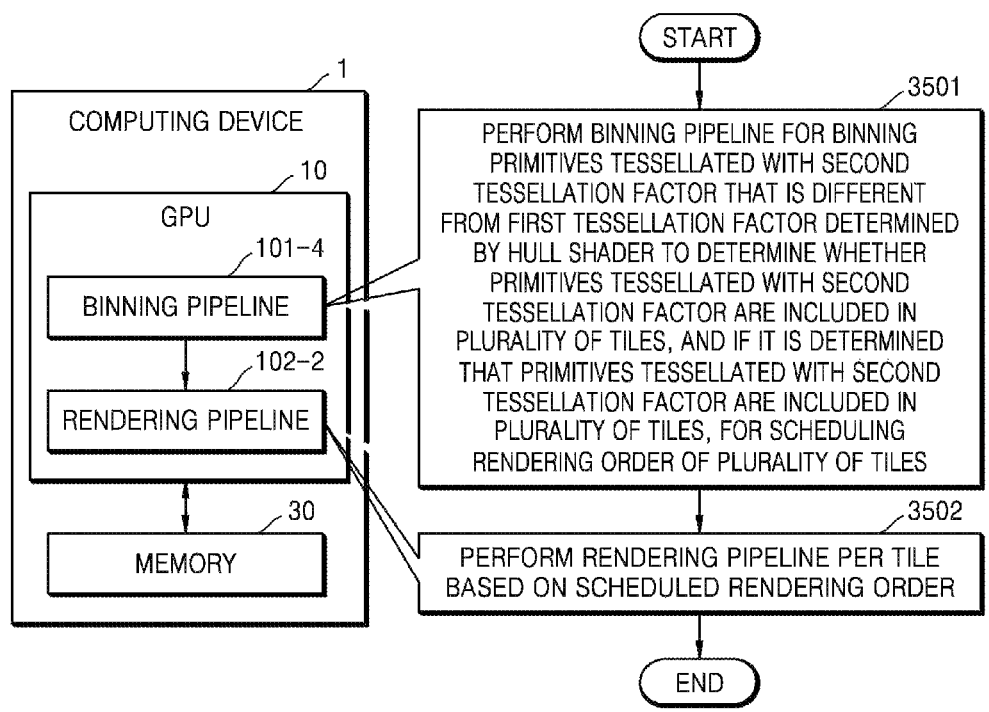
FIG. 35 is a combined flow diagram and flowchart of a showing an example method of performing, by a computing apparatus, a graphics pipeline.

FIG. 35 is a combined flow block diagram and flowchart of another example of a method of performing, by the computing apparatus 1, a graphics pipeline. The method shown in FIG. 35 is related to the examples of operation in mode $\hat{6}$, described above with reference to FIGS. 20 and 21. Thus, the descriptions associated with FIGS. 20 and 21 may apply to the method shown in FIG. 35, even if omitted.

In operation 3501, the GPU 10 of the computing apparatus 1 bins primitives tessellated with a second tessellation factor that is different from a first tessellation factor determined by the hull shader 121, to determine whether the primitives tessellated with the second tessellation factor are included in a plurality of tiles. When it is determined that the primitives tessellated with the second tessellation factor are included in the plurality of tiles, the GPU 10 schedules a rendering order of the plurality of tiles.

In operation 3502, the GPU 10 of the computing apparatus 1 performs the rendering pipeline 102-2 per tile based on the scheduled rendering order.

In detail, in operation 3501, tessellating based on the first tessellation factor, which is to be performed by the tessellator 123, may be skipped. Here, the second tessellation factor has a lower value than the first tessellation factor. In operation 3501, the hull shader 121 performs hull shading to generate an output patch and determines the first tessellation factor. The tessellator 123 performs tessellating on the output patch based on the second tessellation factor that is lower than the first tessellation factor to produce the primitives tessellated with the second tessellation factor. The domain shader 125 performs domain shading on the primitives tessellated with the second tessellation factor. A tile list of the primitives tessellated with the second tessellation factor is binned, it is determined whether the primitives tessellated with the second tessellation factor are included in the plurality of tiles, and when it is determined that the primitives tessellated with the second tessellation factor are included in the plurality of tiles, a first tile (a reference tile, for example, tile A shown in FIG. 21) corresponding to a first rendering order is determined.

In operation 3502, a first rendering pipeline is performed on the first tile, and a second rendering pipeline is performed on a neighboring tile (for example, tiles B, C, or D shown in FIG. 21). In the second rendering pipeline, rendering is performed on at least one of a visible vertex, a visible primitive, and a visible patch of the neighboring tile based on a visibility stream generated in the first rendering pipeline. The first and second rendering pipelines shown in FIG. 35 are parts of the rendering pipeline 102-2, and are different from the first and second rendering pipelines 102-3 and 102-4 shown in FIG. 7.

The memory 30 of the computing apparatus 1 stores a visibility stream generated in the rendering pipeline 102-2 performed on the first tile, and provides the stored visibility stream to the rendering pipeline 102-2 performed on the neighboring tile. In other words, in operation 3501, a visibility stream generated in the rendering pipeline 102-2 performed on the first tile may be stored in the memory 30.

As described above, according to one or more exemplary embodiments, throughput of a GPU may be reduced and a processing speed may be increased in a tessellation pipeline that is a part of a graphics pipeline processed by the GPU, since a tessellator skips tessellating or performs tessellating using a lower tessellation factor.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method performing a graphics pipeline, by a graphics processing unit, on a frame including an object partitioned into one or more tiles, the method comprising:
   performing a binning pipeline including,
      generating an output patch,
      determining a number of tiles that include the output patch,
      determining whether to perform tessellating on the output patch based on the determined number of tiles, and
      binning a tile list of one of the output patch or tessellated primitives of the output patch based on whether tessellating is performed or not; and
   performing a rendering pipeline per tile based on the binned tile list,
   wherein the performing of the binning pipeline includes determining not to perform tessellation on the output patch when the number of tiles that include the output patch is one.

2. The method of claim 1, wherein the performing of the binning pipeline further comprises:
   generating the output patch by a hull shader performing hull shading on an input patch;
   binning the tile list of the output patch; and
   determining whether the output patch is included in one tile.

3. The method of claim 2, wherein the performing of the rendering pipeline further comprises performing rasterizing using the binned tile list of the output patch when the output patch is included in one tile.

4. The method of claim 2, wherein the performing of the binning pipeline further comprises:
   tessellating, by a tessellator, the output patch to generate tessellating primitives when it is determined that the output patch is included in at least two tiles;
   domain shading, by a domain shader, the tessellated primitives;
   binning a tile list of the tessellated primitives; and
   the performing of the rendering pipeline further comprises:
   rasterizing using the binned tile list of the tessellated primitives.

5. The method of claim 1, wherein the performing of the binning pipeline comprises:
   storing a visibility stream of the output patch when the output patch is included in one tile; and
   storing a visibility stream of the tessellated primitives when the output patch is included in at least two tiles.

6. A non-transitory computer-readable recording medium having recorded thereon a program, which when executed by a computer, performs the method of claim 1.

7. A computing apparatus that performs a graphics pipeline on a frame including an object partitioned into one or more tiles, the computing apparatus comprising:
   a graphics processing unit (GPU) configured to,
      perform a binning pipeline including,
         generating an output patch,
         determining a number of tiles that include the output patch,
         determining whether to perform tessellating on the output patch based on the determined number of tiles,
         binning a tile list of one of the output patch or of tessellated primitives of the output patch based on whether tessellating is performed or not,
         store the binned tile list, and
         access the stored binned tile list; and
      perform a rendering pipeline per tile based on the binned tile list; and
   wherein the computing apparatus further includes,
      a memory configured to store the binned tile list, and
   wherein the binning pipeline performed by the GPU further comprises determining not to perform the tessellation on the output patch when the number of tiles that include the output patch is one.

8. The computing apparatus of claim 7, wherein the GPU further includes a hull shader; and
   the binning pipeline performed by the GPU further comprises,
      generating the output patch performing hull shading on an input patch,
      binning the tile list of the output patch, and
      determining whether the output patch is included in one tile.

9. The computing apparatus of claim 8, wherein the rendering pipeline performed by the GPU further comprises performing rasterizing using the binned tile list of the output patch when GPU determines the output patch is included in one tile.

10. The computing apparatus of claim 8, wherein,
   the GPU further includes a domain shader and a tessellator; and the binning pipeline performed by the GPU further comprises,
tessellating the output patch to generate tessellating primitives when the GPU determines that the output patch is included in at least two tiles,
domain shading the tessellated primitives,
binning a tile list of the tessellated primitives; and
the rendering pipeline performed by the GPU further comprises,
rasterizing using the binned tile list of the tessellated primitives.

11. The computing apparatus of claim 7, wherein
the binning pipeline performed by the GPU comprises,
storing a visibility stream of the output patch when the GPU determines the output patch is included in one tile, and
storing a visibility stream of the tessellated primitives when the GPU determines the output patch is included in at least two tiles; and
the memory is further configured to store the visibility stream.

12. A method of performing a graphics pipeline, by a graphics processing unit (GPU), on a frame including an object partitioned into one or more tiles, the method comprising:
performing a binning pipeline including,
generating an output patch by a hull shader;
tessellating the output patch with a second tessellation factor that is lower than a first tessellation factor determined by the hull shader;
determining by the GPU whether to perform tessellating with the first tessellation factor, based on a number of tiles including primitives tessellated with the second tessellation factor; and
binning a tile list of one of primitives tessellated with the first tessellation factor or the output patch output from the hull shader based on a result of the determining whether to perform tessellation with the first tessellation factor; and
performing a rendering pipeline per tile based on the binned tile list,
wherein the binning pipeline comprises binning the tile list of the output patch when the primitives tessellated with the second tessellation factor are included in one tile.

13. The method of claim 12, wherein the performing of the binning pipeline comprises:
performing hull shading that generates the output patch by the hull shader;
determining the first tessellation factor;
generating the primitives tessellated with the second tessellation factor by performing, on the output patch, tessellating using the second tessellation factor that is lower than the first tessellation factor by a tessellator and domain shading by a domain shader; and
determining by the GPU whether the primitives tessellated with the second tessellation factor are included in one tile; and
the performing of the rendering pipeline further comprises performing rasterizing using the binned tile list of the output patch when the primitives tessellated with the second tessellation factor are included in one tile.

14. The method of claim 13, wherein
the performing of the binning pipeline further comprises,
generating the primitives tessellated with the first tessellation factor by performing, on the output patch, tessellating using the first tessellation factor by the tessellator and the domain shading by the domain shader when the primitives tessellated with the second tessellation factor are included in at least two tiles; and
the performing of the rendering pipeline further comprises performing the rasterizing by using the binned tile list of the primitives tessellated with the first tessellation factor.

15. The method of claim 12, wherein the performing of the binning pipeline further comprises:
storing a visibility stream of the output patch when the primitives tessellated with the second tessellation factor are included in one tile; and
storing a visibility stream of the primitives tessellated with the first tessellation factor when the primitives tessellated with the second tessellation factor are included in at least two tiles.

16. A computing apparatus that performs a graphics pipeline on a frame including an object partitioned into one or more tiles, the computing apparatus comprising:
a graphics processing unit (GPU) including a hull shader, the GPU configured to perform a binning pipeline including,
generating an output patch by the hull shader;
tessellating the output patch with a second tessellation factor that is lower than a first tessellation factor determined by the hull shader;
determining whether to perform tessellating with the first tessellation factor based on a number of tiles including primitives tessellated with the second tessellation factor; and
binning a tile list of one of primitives tessellated with the first tessellation factor or the output patch output from the hull shader based on a result of the determining whether to perform tessellation with the first tessellation factor; and
perform a rendering pipeline per tile based on the binned tile list; and wherein
the GPU further includes a memory configured to store the binned tile list, and
the binning pipeline comprises binning the tile list of the output patch when the primitives tessellated with the second tessellation factor are included in one tile.

* * * * *